(12) United States Patent
Enomoto

(10) Patent No.: US 7,178,148 B2
(45) Date of Patent: *Feb. 13, 2007

(54) INFORMATION PROCESSING APPARATUS

(75) Inventor: Hajime Enomoto, Funabashi (JP)

(73) Assignee: Fujitsu Limited, Kawasaki (JP)

( * ) Notice: Subject to any disclaimer, the term of this patent is extended or adjusted under 35 U.S.C. 154(b) by 953 days.

This patent is subject to a terminal disclaimer.

(21) Appl. No.: 09/804,143

(22) Filed: Mar. 13, 2001

(65) Prior Publication Data

US 2002/0019889 A1    Feb. 14, 2002

(30) Foreign Application Priority Data

Aug. 9, 2000   (JP)  ............... 2000-240581

(51) Int. Cl.
*G06F 9/00*    (2006.01)
(52) U.S. Cl. ............... 719/310; 707/103 R; 707/103 Y; 707/103 X; 707/103 Z; 707/104.1
(58) Field of Classification Search ............ 707/103 X, 707/103 R–104; 345/8; 719/310
See application file for complete search history.

(56) References Cited

U.S. PATENT DOCUMENTS

| | | | |
|---|---|---|---|
| 5,682,542 A | 10/1997 | Enomoto et al. .......... 395/778 |
| 5,895,459 A | 4/1999 | Enomoto et al. ............ 706/10 |
| 5,937,402 A * | 8/1999 | Pandit ......................... 707/4 |
| 6,067,548 A * | 5/2000 | Cheng .................. 707/103 R |
| 6,574,617 B1 * | 6/2003 | Immerman et al. ........... 707/1 |

FOREIGN PATENT DOCUMENTS

| | | |
|---|---|---|
| JP | A-5-233690 | 9/1993 |
| JP | A-7-295929 | 11/1995 |
| JP | A-9-297684 | 11/1997 |

* cited by examiner

Primary Examiner—William Thomson
Assistant Examiner—Phuong N. Hoang
(74) Attorney, Agent, or Firm—Staas & Halsey LLP

(57) ABSTRACT

An object model has a hierarchical structure composed of a data model representing an attribute structure as a template, an object model as a higher model than the data model, a role model as a higher model than the object model, the role model representing the content of a process to be executed in the environment as a set of a plurality of object models, and a process model as the highest model, the process model defining a dynamic process cooperatively executed by a plurality of role models as one process. In addition, a reference model that is orthogonal to the hierarchical structure and that accomplishes a basic service is used.

9 Claims, 49 Drawing Sheets

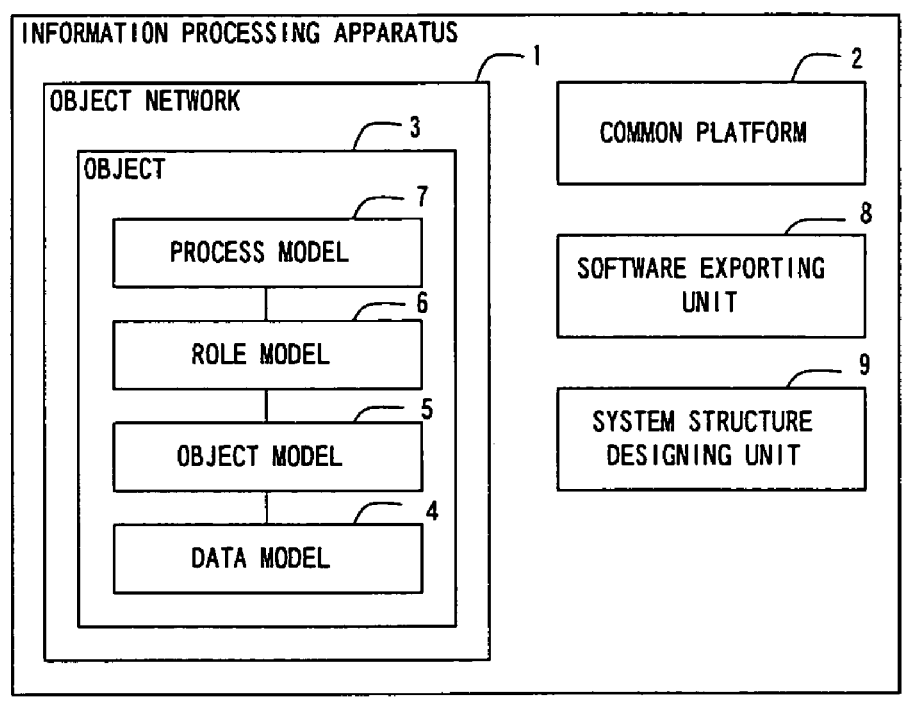
F I G. 1

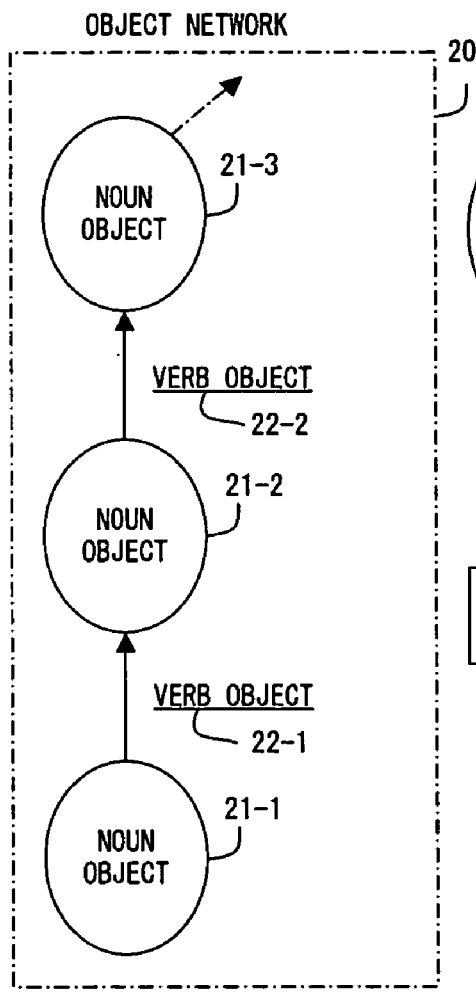
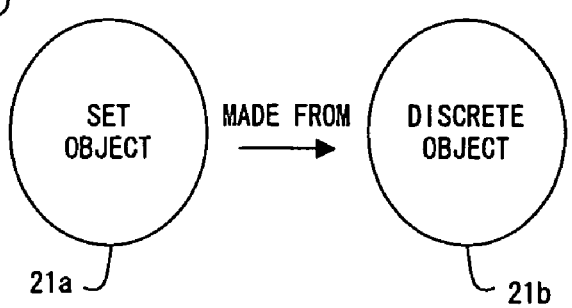
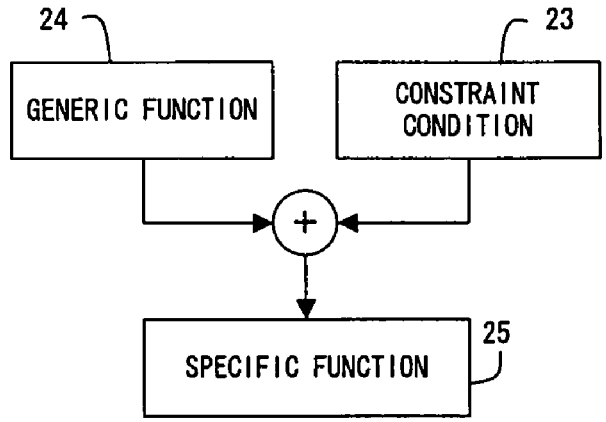
FIG. 3A
FIG. 3B
FIG. 3C

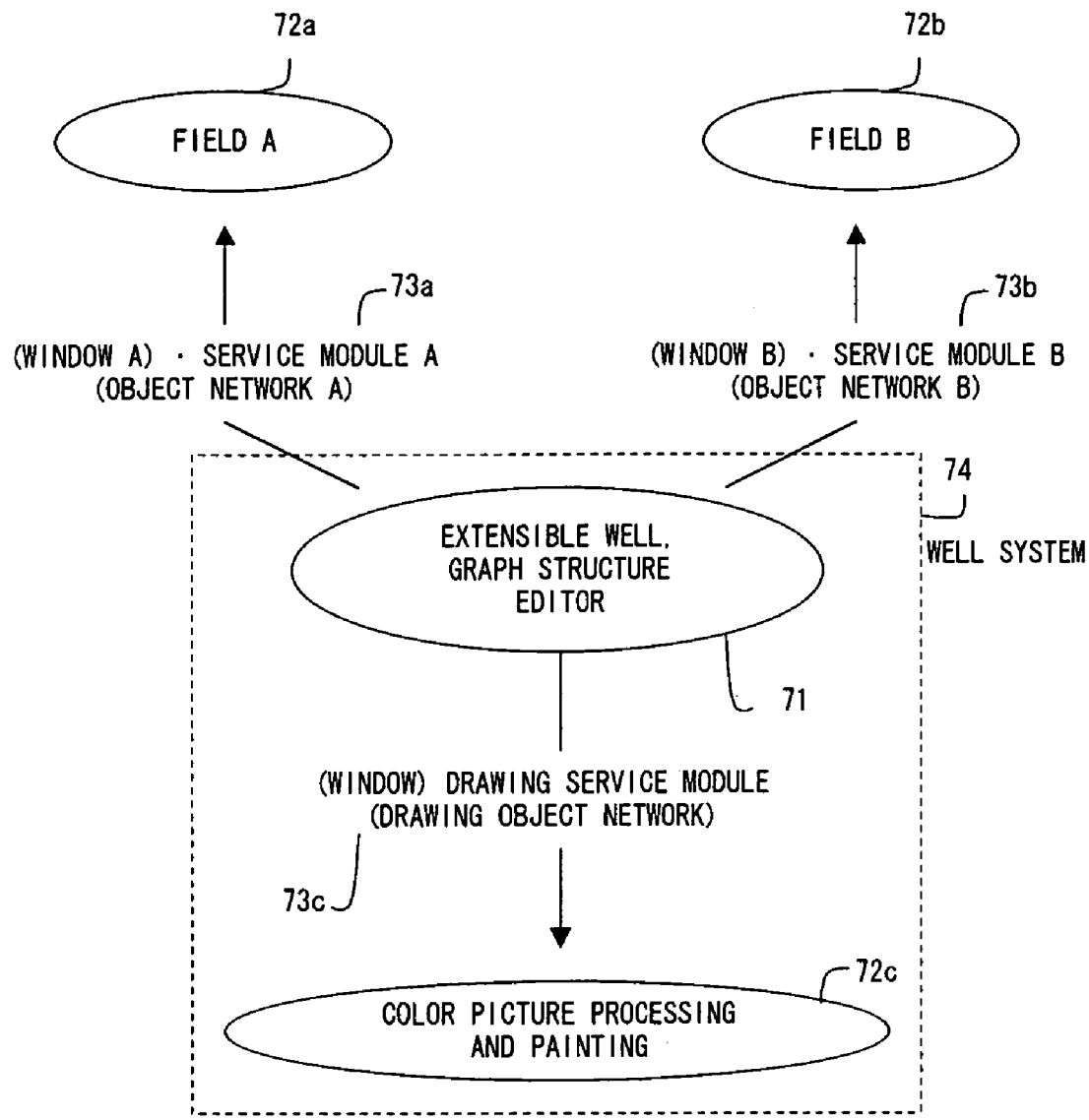
F I G. 8

| index | X | Y | attributes for Point(X, Y) |

F I G. 1 2

TEMPLATE FOR MAJOR POINT NO. 1

| INDEX | X | Y | LUMINANCE | CHROMATICITY VECTOR | POINTER |
|---|---|---|---|---|---|

TEMPLATE FOR MAJOR POINT NO. 2

| INDEX | X | Y | LUMINANCE | CHROMATICITY VECTOR | POINTER |
|---|---|---|---|---|---|

TEMPLATE FOR MAJOR POINT NO. 3

| INDEX | X | Y | LUMINANCE | CHROMATICITY VECTOR | POINTER |
|---|---|---|---|---|---|

TEMPLATE FOR MAJOR POINT NO. n

| INDEX | X | Y | LUMINANCE | CHROMATICITY VECTOR | POINTER |
|---|---|---|---|---|---|

F I G. 1 3

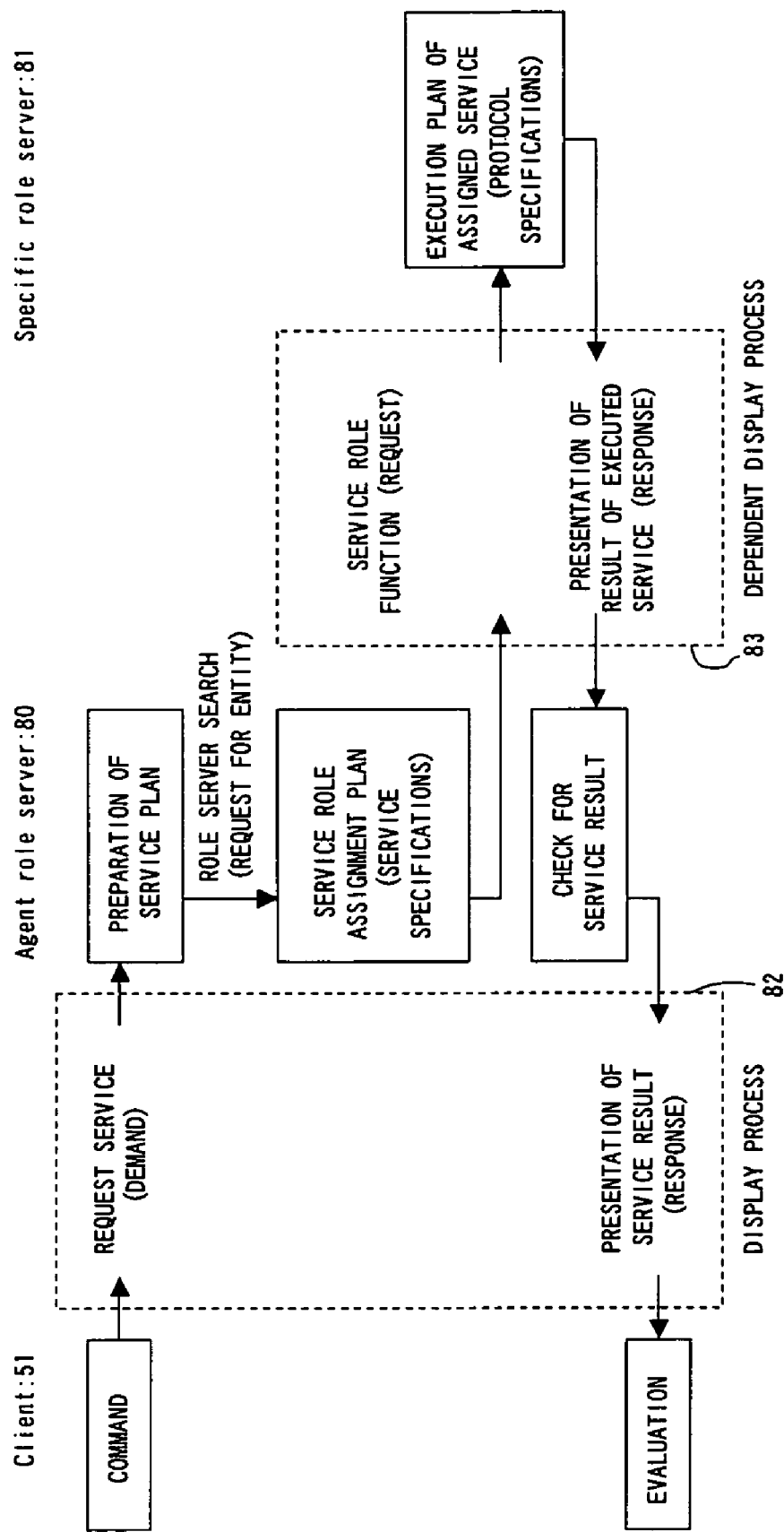
F I G. 15

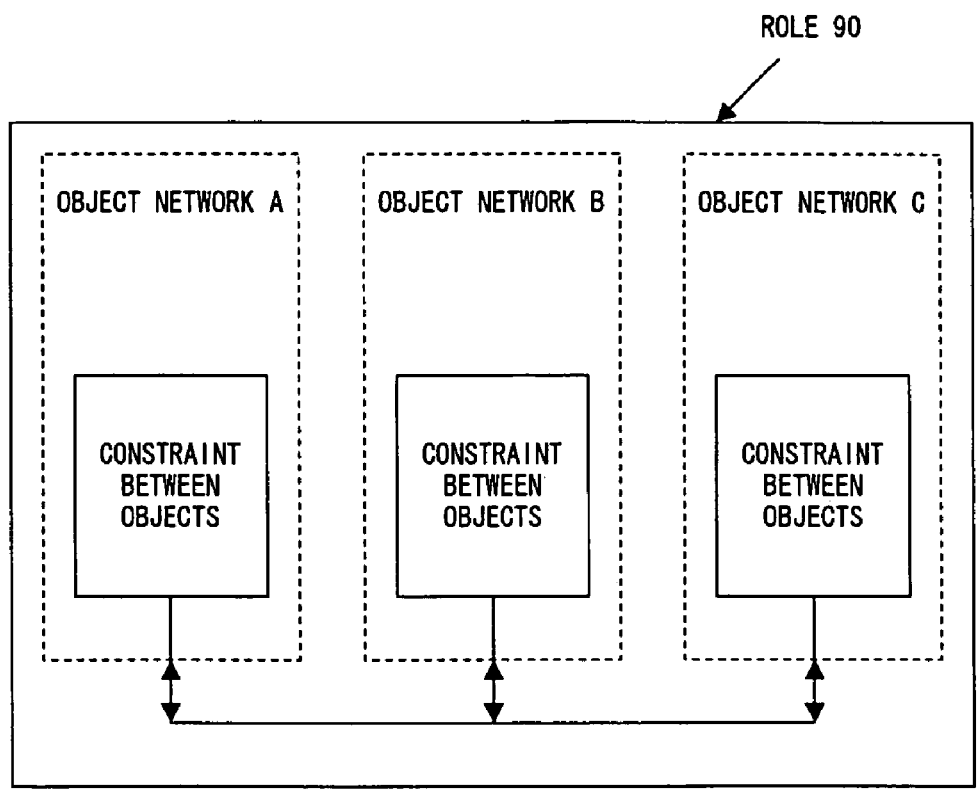
F I G. 1 7

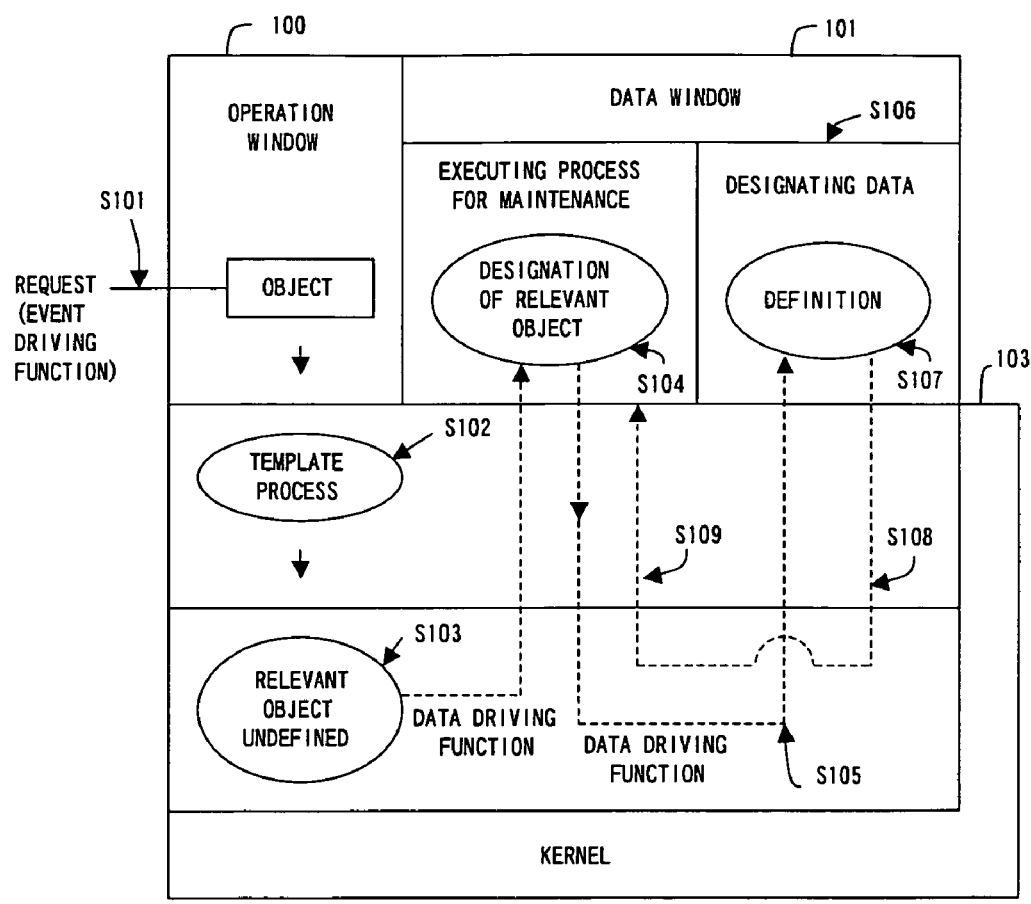
F I G. 1 8

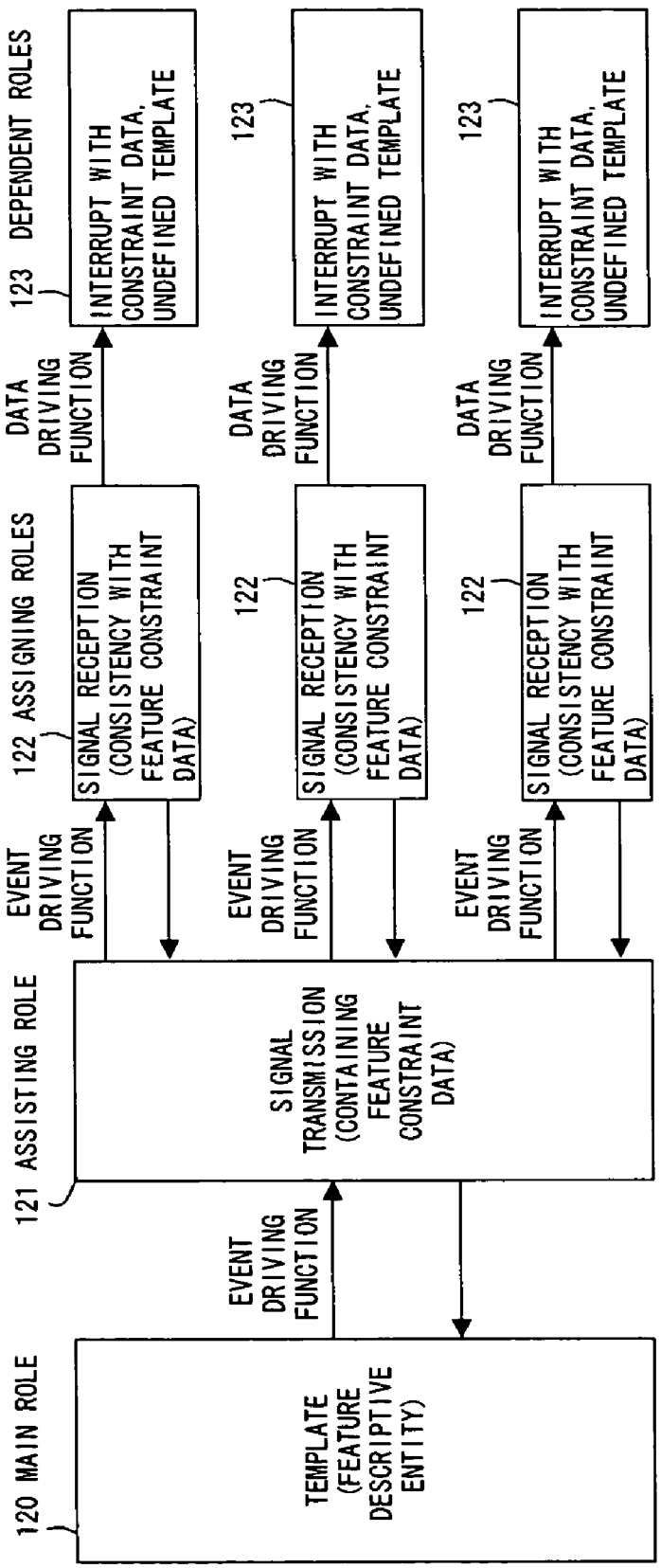
F I G. 21

FIG. 27

| | |
|---|---|
| OBJECTIVE AREA NAME<br>ATTRIBUTE STRUCTURE OF OBJECTIVE AREA | GENERIC INTENTION ⟶ SPECIFIC INTENTION |
| CHARACTERISTIC STRUCTURE OF INTENTION<br>(INDEPENDENT / COMMON / DIFFERENCE)<br>OPERATION AVAILABLE STRUCTURE OF INTENTION<br>PURPOSE OF INTENTION (OBJECT FUNCTION) | DEFINITION PREPARING PROCESS<br>FOR ASSISTING (DESIGNATING TEMPLATE) |
| ASSISTING STRUCTURE FOR ACCOMPLISHING<br>INTENTION (ENVIRONMENT)<br>SPECIFICATIONS OF RECOGNIZING FUNCTION | EXTRACTING ENVIRONMENT DATA FROM OBJECT |
| STRATEGY: CONSTRAINTS OF ENVIRONMENTAL /<br>PHYSICAL OPERATIONS, OPERATIONAL /<br>PRIORITY CONSTRAINTS FOR<br>ACCOMPLISHING GOAL | GENERIC TERM OF OPERATION FOR<br>ACCOMPLISHING INTENTION |
| TACTICS: OPERATIONAL DEFINITION OF USER AS DATA<br>DRIVING FUNCTION, CONVERSION FROM GENERAL DATA<br>TO SPECIFIC DATA | REALIZATION OF GENERALITY OF OPERATION |

(The last three rows on the right — EXTRACTING ENVIRONMENT DATA FROM OBJECT, GENERIC TERM OF OPERATION FOR ACCOMPLISHING INTENTION, REALIZATION OF GENERALITY OF OPERATION — are grouped as: SUCCESSIVE DEFINING OPERATION OF INTENTION DATA)

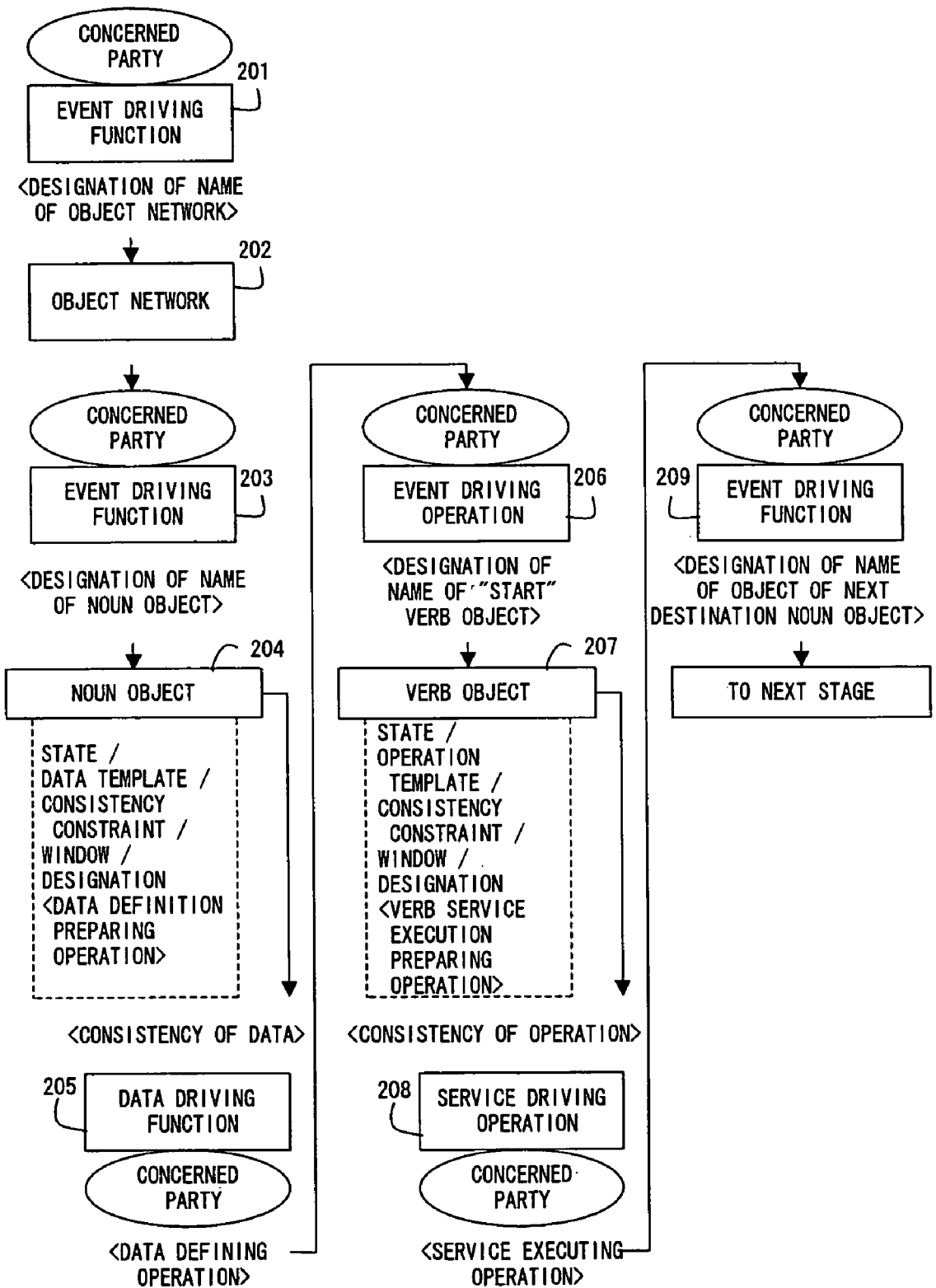
F I G. 28

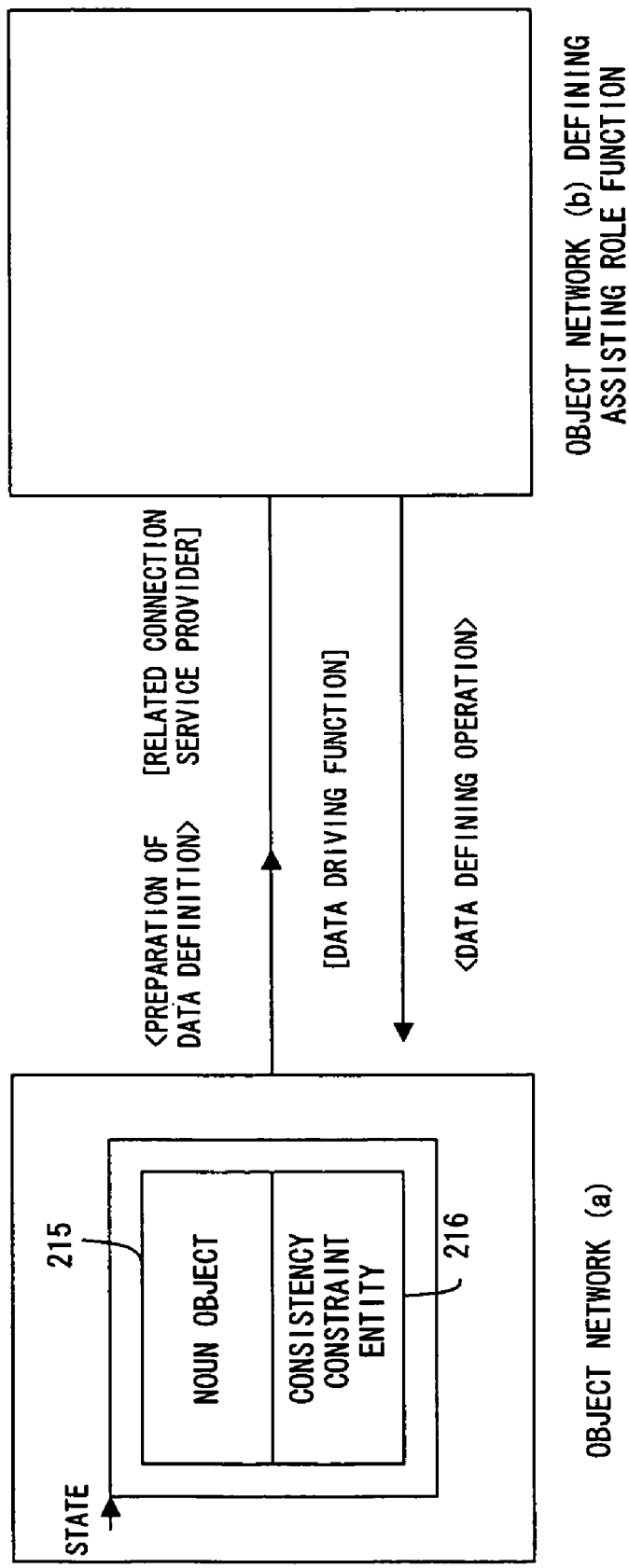
F I G. 30

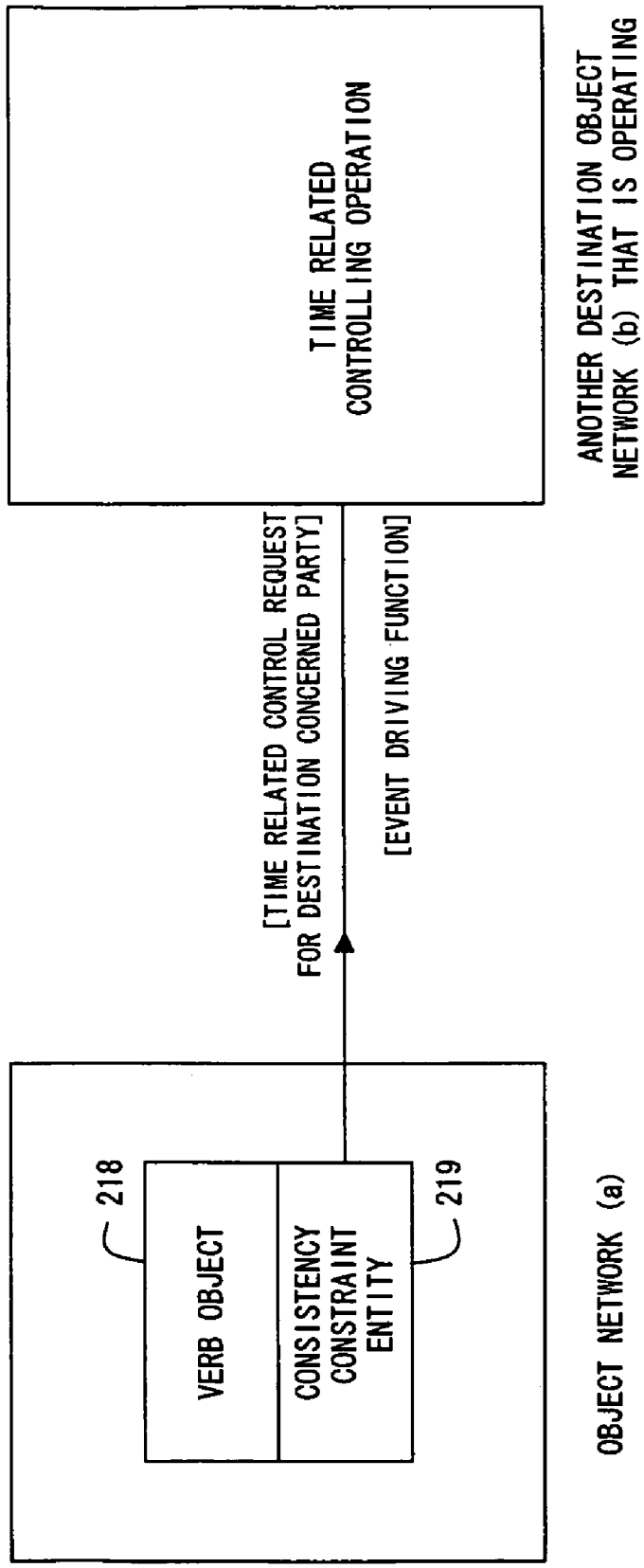
F I G. 3 2

| STRUCTURE SERVICE | | CONTROL PROCESS SERVICE | | DATA STRUCTURE SERVICE | | COMMUNI-CATION SERVICE | SIMULATION SERVICE |
|---|---|---|---|---|---|---|---|
| (I) REQUEST FROM CONCERNED PARTY | (II) REQUEST FROM SYSTEM | (III) CONTROLLING PROCESS (PROCESS) | (IV) CONSISTENCY PROCESS | (V) SEARCH | (VI) DATA-INTENSIVE | (VII) COMMUNI-CATION (BROADCAST, TRANS-MISSION) | (VIII) PARAMETER DETERMINATION |
| EVENT DRIVING FUNCTION | DATA DRIVING FUNCTION | STATE, TIME RELATED CONTROL | CONSISTENCY CONSTRAINT | NAME MANAGE-MENT | DATA MANAGEMENT, GRAPH STRUCTURE, EDITOR | NOTIFICA-TION BETWEEN CONCERNED PARTIES | EVALUATION |

FIG. 35

| STATIC ADAPTATION | DYNAMIC ADAPTATION | | |
|---|---|---|---|
| CHANGE OF TACTIC / STRATEGY PARAMETERS | CHANGE OF TACTIC / STRATEGY NET STRUCTURE | DUTIES OF CONCERNED PARTIES / FORMATION OF TEAM, CHANGE OF INTENTION, AND CHANGE OF STATE | |
| SYSTEM REQUEST SERVICE | CONSISTENCY PROCESS SERVICE | STRUCTURE SERVICE | |
| COMMUNICATION SERVICE, SIMULATION SERVICE | | | |

F I G. 3 7

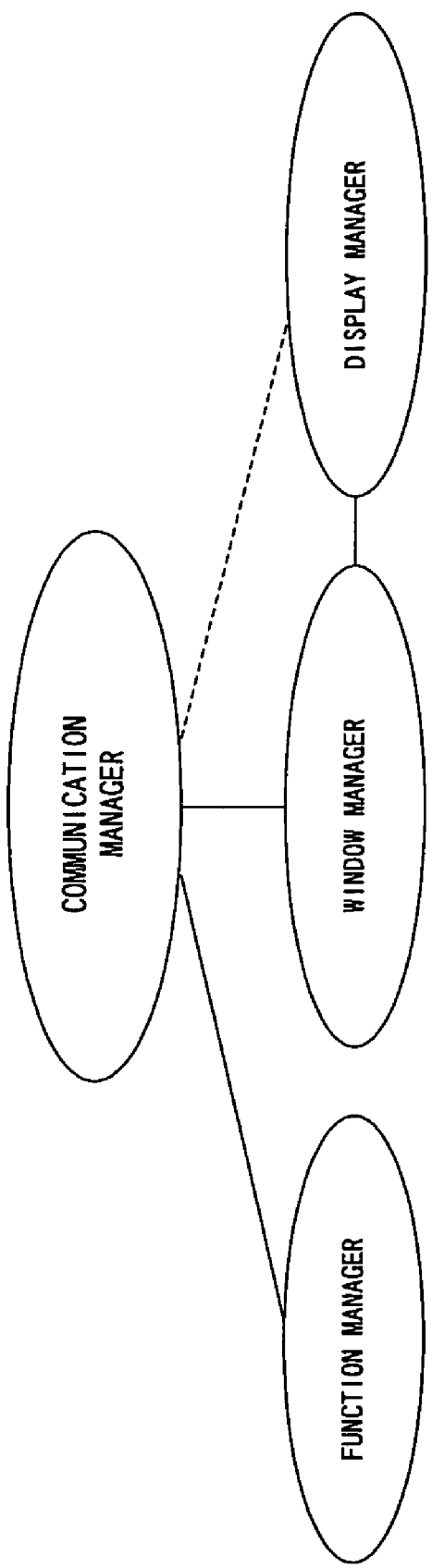
F I G. 38

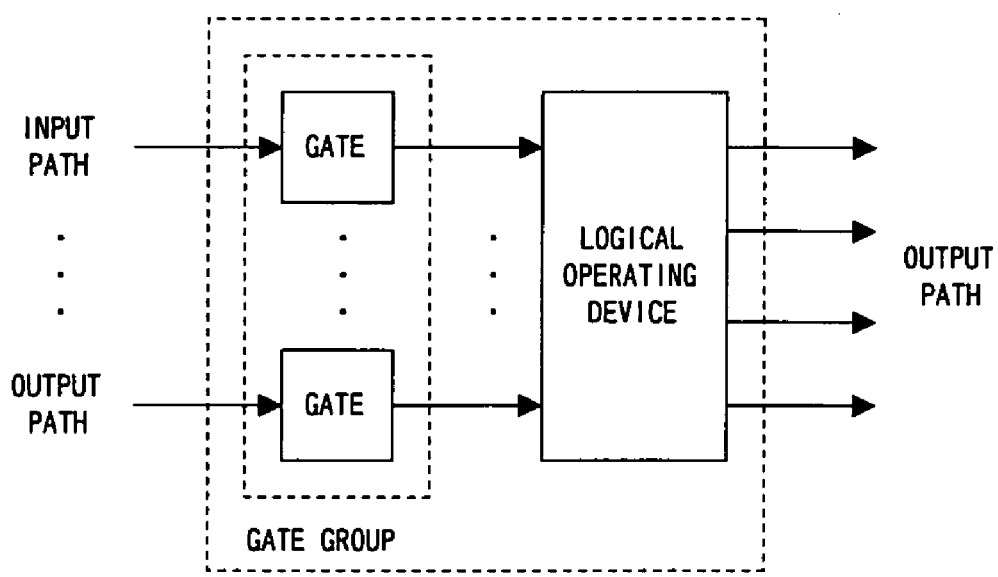
F I G. 4 6

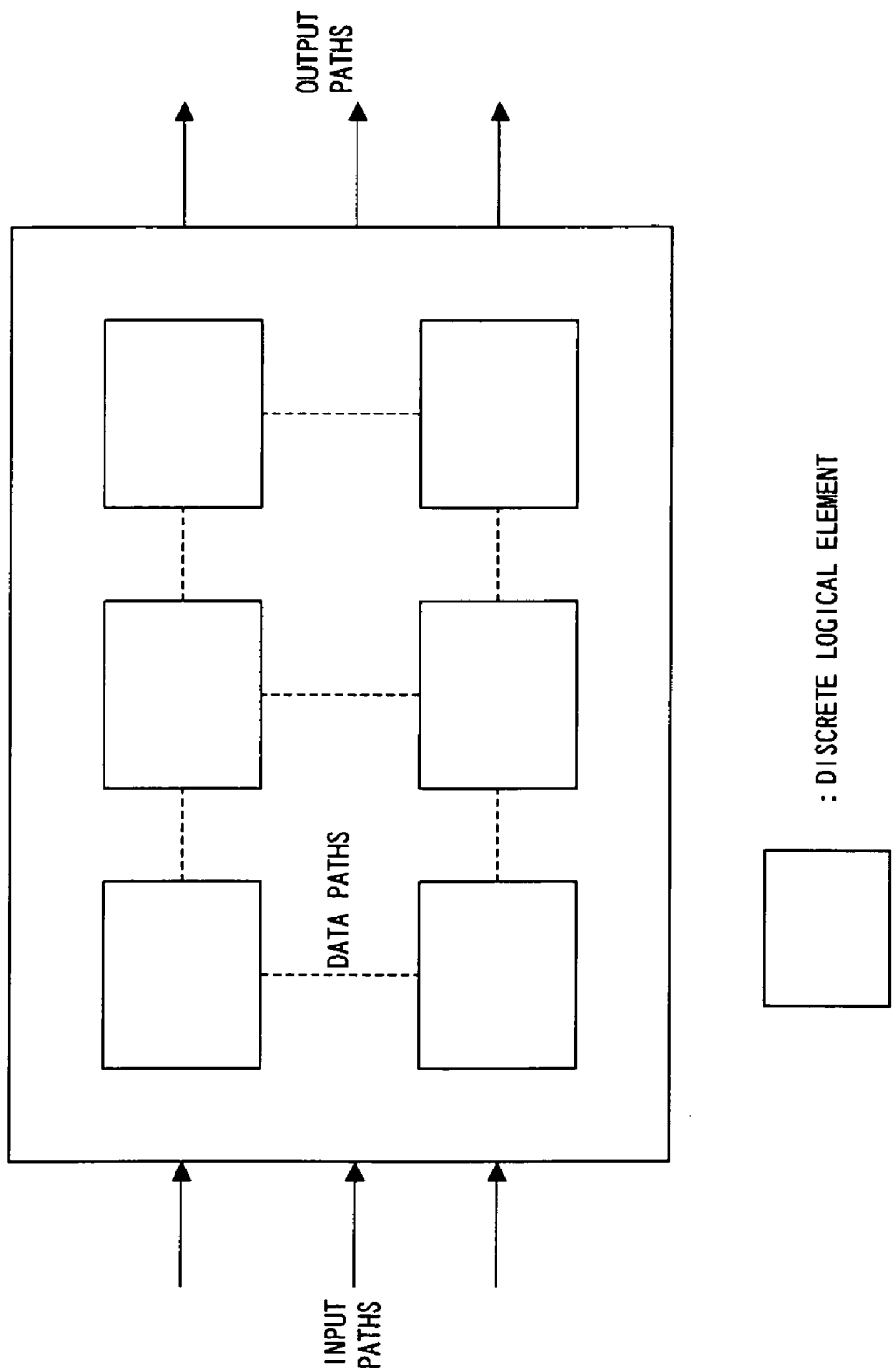
F I G. 47

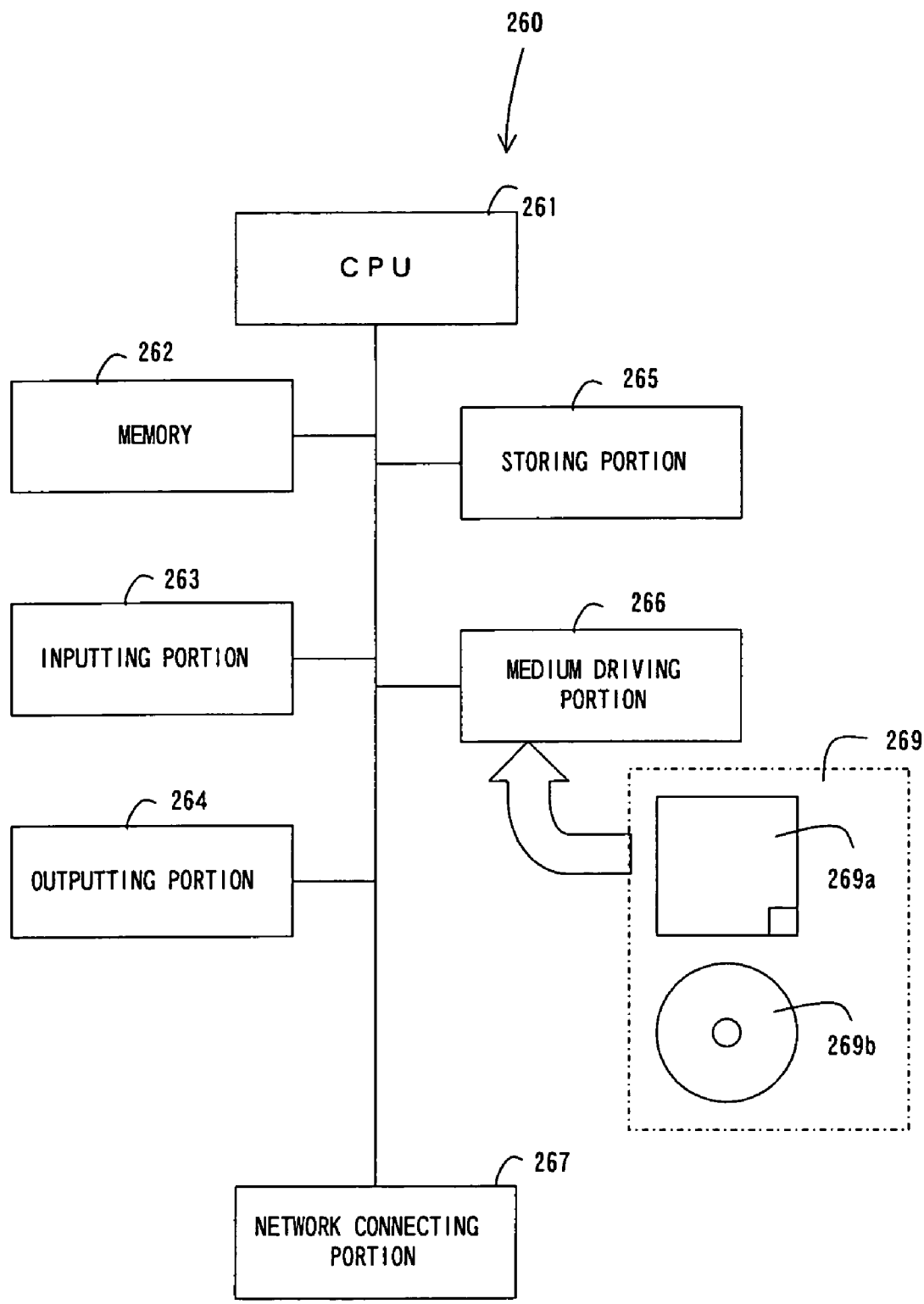
F I G. 49

INFORMATION PROCESSING APPARATUS

BACKGROUND OF THE INVENTION

1. Field of the Invention

The present invention relates to an information processing apparatus, in particular, to an information processing apparatus having an object network as a language processing function and a common platform as an interface function with a client, an object of the object network having a hierarchical structure composed of a data model, an object model, a role model, and a process model. In addition, the present invention relates to an information processing apparatus that allows a WELL system as software using an object network and a common platform to be exported to another software. Moreover, the present invention relates to an information processing apparatus that allows a system structure to be designed in such a manner that objects correlate with data paths.

2. Description of the Related Art

In recent years, in the field of virtual reality system, a variety of software architectures have been widely and actively used, studied, and developed. However, when an animation movie is created, much labor and time and many resources are required. In other words, it is difficult for a small group to create a animation movie. Thus, it has been desired to accomplish a user-friendly computer graphics work creation assisting system that allows the user to easily create a more reality animation movie.

A technology that satisfies such needs is disclosed in for example Japanese Patent Laid Open Publication No. 5-233690 titled "Language Processing System using Object Network". In the technology as a first related art reference, data as drawing objects and various operations thereof are modeled as an object network.

As a second related art reference, an information processing apparatus having a common platform as an interface having various windows with which the user inputs commands and data and see executed results of a computer is disclosed in Japanese Patent Laid Open Publication No. 7-295929 titled "Interactive Information Processing Apparatus using Common Platform Function".

As a third related art reference, a technology for accomplishing a system that allows the user to easily develop an application having visibility, interactivity, and harmonization using the object network and common platform is disclosed in Japanese Patent Laid Open Publication No. 9-297684 titled "Information Processing Apparatus using Object Network".

As software having such object network and common platform, a WELL system using a functional language referred to as WELL (Window based Elaboration language) is known. With the WELL system, various processes can be executed using relevant object networks, and is not limited to a particular processing field, for instance animation movie creating processes such as a color picture creating process and a painting process.

However, in an information process using such object network and common platform, since a functional language referred to as WELL is used, a transporting technology for transporting the WELL system to another software architecture has not been completely accomplished. Thus, it is not easy to use such an information process on another software.

Moreover, in the WELL system, a process of a particular field can be performed using a relevant object network.

However, it is difficult to design a system structure using the WELL system in relation to a system such as a large scale integration circuit (LSI).

SUMMARY OF THE INVENTION

The present invention is made from the above-described point of view. An object of the present invention is to transport a WELL system as a software architecture to another software through accomplishing a hierarchical structure of an object, and using a reference model having an orthogonal relation to the hierarchical structure. Another object of the present invention is to allow a system such as an LSI to be designated corresponding to an object structure in consideration of the similarity of the object structure and the system structure of an LSI. The present invention is an information processing apparatus, having an object network as a language processing function and a common platform as an interface function with a client, for executing a process using an interface with a concerned party of the process and/or an environment, the object model having a hierarchical structure composed of a data model representing an attribute structure as a template, an object model as a higher model than the data model, a role model as a higher model than the object model, the role model representing the content of a process to be executed in the environment as a set of a plurality of object models, and a process model as the highest model, the process model defining a dynamic process cooperatively executed by a plurality of role models as one process.

Thus, when an information processing apparatus as the prerequisite of the present invention is used as the WELL system, since the information processing apparatus has the above-described hierarchical structure, the WELL system (software thereof) can be exported to another system.

Alternatively, the WELL system can be applied for designing a system structure such as an LSI.

These and other objects, features and advantages of the present invention will become more apparent in light of the following detailed description of a best mode embodiment thereof, as illustrated in the accompanying drawings.

BRIEF DESCRIPTION OF DRAWINGS

FIG. 1 is a block diagram showing the theoretical structure of the present invention;

FIGS. 3A, 3B, and 3C are schematic diagrams for explaining a conventional object network;

FIG. 8 is a schematic diagram for explaining a WELL system corresponding to the field of a color picture creating and painting processes;

FIG. 12 is a schematic diagram showing an example of the structure of a template;

FIG. 13 is a schematic diagram showing an example of the structure of a template corresponding to a line segment;

FIG. 15 is a block diagram showing the structure of an information processing apparatus having an agent;

FIG. 17 is a schematic diagram for explaining a definition of a role function;

FIG. 18 is a schematic diagram for explaining the flow of a process in a WELL system for accomplishing an interactive function;

FIG. 21 is a schematic diagram for explaining a one-to-many broadcast from a main role function to dependent role functions;

FIG. 27 is a schematic diagram for explaining a defining process of an intention;

FIG. 28 is a schematic diagram for explaining a user's process in relation to an object network;

FIG. 30 is a schematic diagram for explaining operations of individual object networks of a role function;

FIG. 32 is a schematic diagram for explaining a time related controlling operation control of a plurality of object networks of a role function;

FIG. 35 is a schematic diagram for explaining services of a reference model;

FIG. 37 is a schematic diagram for explaining adapting services;

FIG. 38 is a schematic diagram showing the relation between three managers and a communication manager;

FIG. 46 is a schematic diagram showing the structure of a discrete logical element of an LSI;

FIG. 47 is a schematic diagram showing the structure of an integrated device composed of a plurality of discrete logical elements;

FIG. 49 is a schematic diagram showing an example of the hardware structure of an information processing apparatus.

DESCRIPTION OF PREFERRED EMBODIMENT

Figure 1:
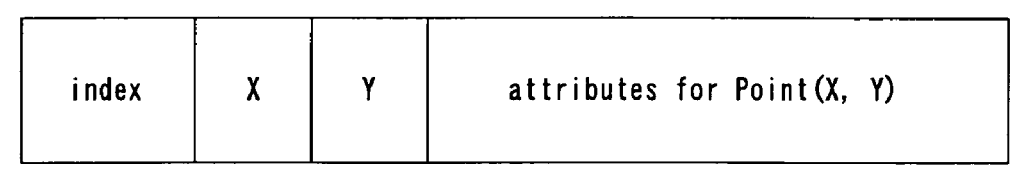
Figure 2:
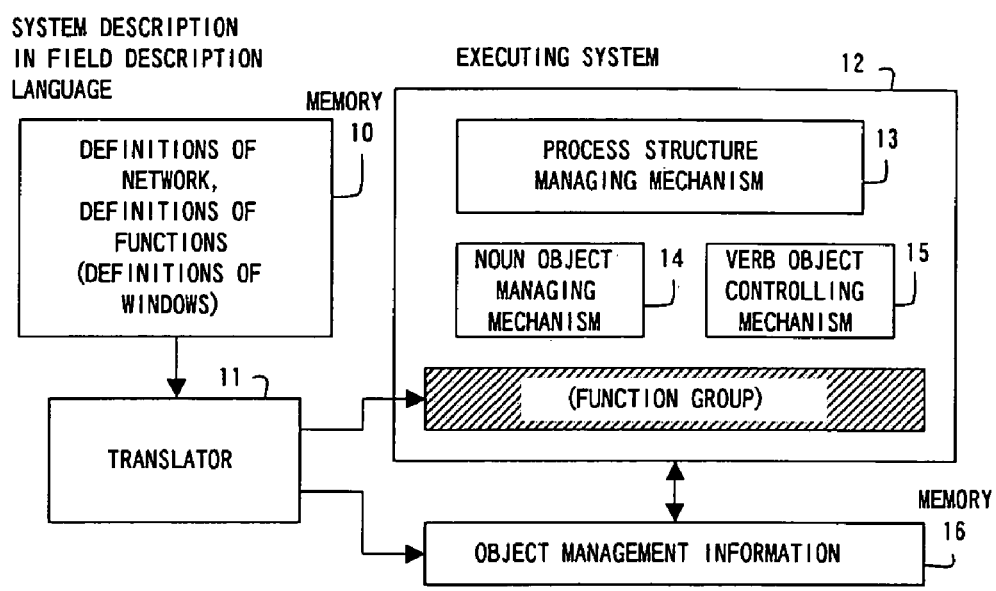
FIG. 2 is a block diagram showing the basic structure of an information processing apparatus using an object network.

FIG. 1 is a block diagram showing the theoretical structure of an information processing apparatus according to the present invention. The information processing apparatus comprises an object network 1 and a common platform 2. The object network 1 operates as a language processing function. The common platform 2 operates as an interface function with a client. The information processing apparatus executes a process using an interface with a concerned party of the process and/or an environment.

In FIG. 1, an object 3 of the object network 1 has a hierarchical structure composed of four models. In the hierarchical structure, the lowest model is a data model 4. The data model 4 is a model representing an attribute structure as a template.

The immediately higher model of the data model 4 is an object model 5. The immediately higher model of the object model 5 is a role model 6. The role model 6 represents the content of a process executed in the environment as a set of a plurality of object models. The highest model of the object 3 is a process model 7 that defines a dynamic process cooperatively executed by a plurality of role models 6.

The object model 5 can contain for example a format model, a feature model, and an object network model. The format model represents the format of a pattern of a noun object and a verb object. The feature model represents a feature corresponding to an attribute value of an object. In addition, the feature model has a constraint condition corresponding to the environment. The object network model has a node as the name of a noun model and a branch as the name of a verb model structured as a graph.

The information processing apparatus may further comprise a process function kernel portion for executing a controlling process performed with an intervention of a user of the information processing apparatus using the name of a concerned party for the process of the object network and the name of a work performed by the concerned party.

In addition, the specifications of the data model, the object model, and the role model may be statically defined. The specifications of the process model may be dynamically defined so that the validity of the process performed in the set of the plurality of object modes is assured corresponding to a consistency constraint entity defined as an attribute of an object.

At that point, an inconsistent constraint entity corresponding to the process model may describe a validity predicate about the validity of the process and a control state for executing the process.

In addition, the hierarchical structure may be further composed of a reference model for accomplishing a basic service to be executed in the process of the object network, the reference model being orthogonal to the hierarchical structure of the data model, the object model, the role model, and the process model.

At that point, the concerned party of the process and the process function kernel portion of the information processing apparatus may use a reference driving function so as to accomplish a service of the reference model.

In addition, the specifications corresponding to a change of the environment may be separately described as static adaptation specifications and dynamic adaptation specifications as a service accomplished with the reference model.

In addition, the information processing apparatus may further comprise a WELL system as software using the object network and the common platform, and a software exporting means for exposing the WELL system to another software.

In addition, the information processing apparatus may further comprise a system structure designing means for designing a system structure in such a manner that noun objects and verb objects that compose the object network correlate with data paths as keywords of the system structure.

As described above, according to the present invention, an object has a hierarchical structure composed of a data model, an object model, a role model, and a process model. In addition, an object may have a reference model that is orthogonal to the hierarchical structure and that accomplishes a basic service executed in a process of an object network.

According to the present invention, in an information processing system referred to as extensible WELL featuring an object network as a language processing function and a common platform as an interface function between a client and a server, a hierarchical structure of an object is accomplished. In addition, a reference model that is orthogonal to the hierarchical structure is used.

In consideration of the similarity of such an object structure and a system structure of for example an large scale integration circuit (LSI), there are two important points of which a system such as an LSI is designed corresponding to an object structure and of which extensible WELL software as a software architecture is exported to another software. For easy understanding to the present invention, before explaining those two points, an object network and a common platform as their prerequisite technologies will be described.

FIG. 2 is a block diagram showing the basic structure of an information processing apparatus using an object network. Referring to FIG. 2, information processing system comprises a memory 10, a translator 11, an executing system 12, and a memory 16. The memory 10 stores a system description in a field description language. The translator 11 analyzes the syntax of the input system description and generates data for the executing system 12. The memory 16 stores management information of the object network out of the data generated by the translator 11.

The memory 10, which stores the system description in the field description language described above, stores definitions of the object network, required functions, windows, and so forth. Windows will be described later along with the common platform.

The executing system 12 comprises a process structure managing mechanism 13, a noun object managing mechanism 14, and a verb object controlling mechanism 15. The process structure managing mechanism 13 controls parallel processes. The noun object managing mechanism 14 manages only noun objects of objects that compose the object network. The verb object controlling mechanism 15 manages only verb objects of objects that compose the object network.

FIGS. 3A, 3B, and 3C are schematic diagrams for explaining a conventional object network. The object network is used to manage data of an information processing apparatus and an operating means for the data as objects. The objects are roughly categorized as noun objects and verb objects. As shown in FIG. 3A, an object network 20 is structured in such a manner that noun objects and verb objects are represented as nodes and branches. In the object network, when a noun object as a node is operated to the content of a function equivalent to a verb object as a branch, the noun object at the edge of the branch corresponding to the verb object is obtained as an object (target).

As shown in FIG. 3B, noun objects 21 are categorized as set objects 21a that are common nouns and discrete objects 21b that are proper nouns. A discrete object 21b is made from a set object 21a.

As shown in FIG. 3C, verb objects are categorized as generic functions 24 and specific functions 25. A specific function 25 is a function for executing a noun object. A specific function 25 is obtained by adding a constraint condition to a generic function 24. The conversion from a generic function 24 into a specific function 25 is controlled by the verb object controlling mechanism 15.

Figure 4A:
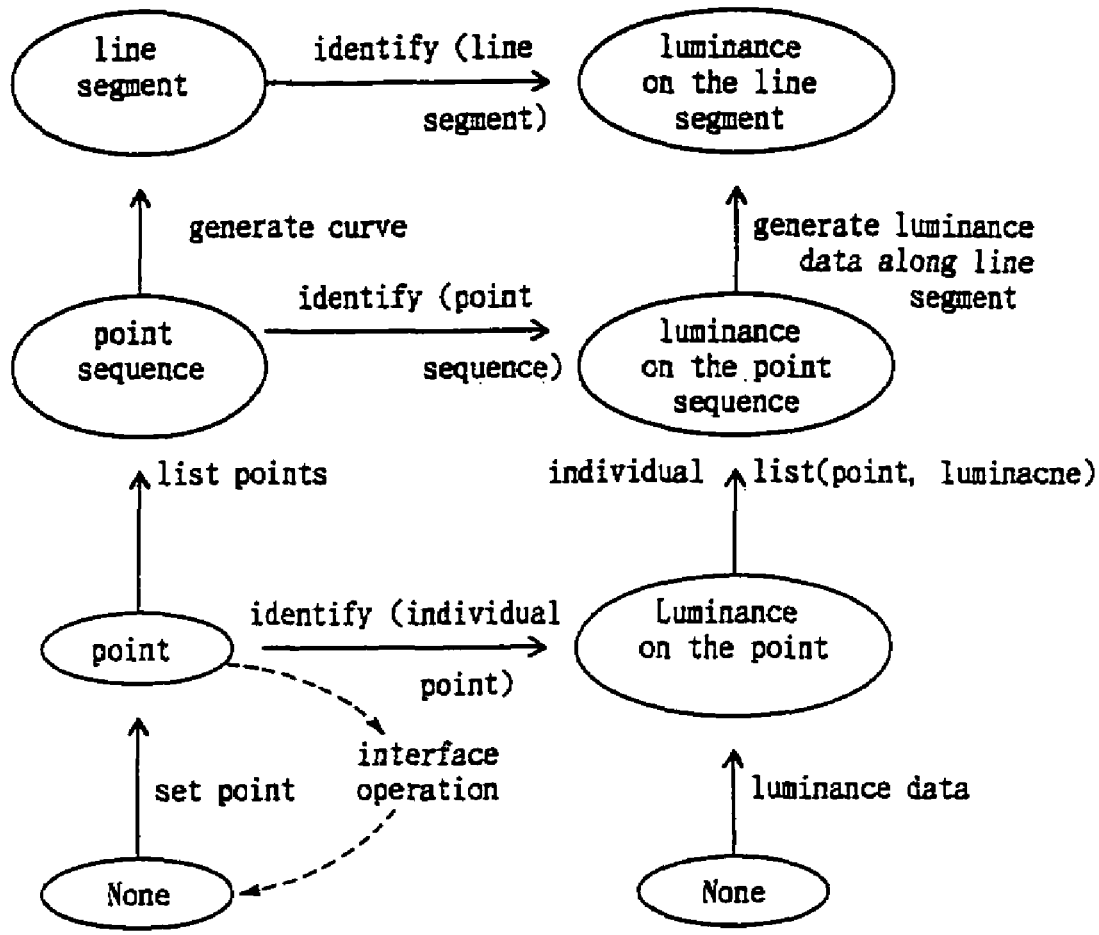
FIGS. 4A and 4B are schematic diagrams for explaining a real example of an object network.
Figure 4B:
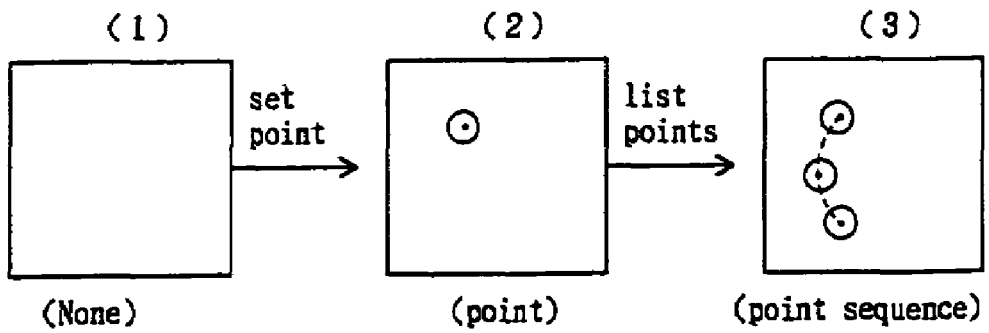

FIG. 4A is a real example of an object network. FIG. 4B is an example of an object network that is displayed. In the object network, a picture is drawn as the field of the system description in the field description language stored in the memory 10 shown in FIG. 2. The left portion and the right portion of FIG. 4A represent an entity network and an attribute network, respectively. With those two networks, an object network is structured.

First of all, the entity network as the right portion of FIG. 4A will be described. As shown in FIG. 4B, before a picture is drawn, this is nothing as none state (1). When a particular point is designated on the display with a mouse or the like, an operation corresponding to a verb object "set point" is performed. As a result, a noun object "point" is obtained. With an interface operation with the user, a plurality of points corresponding to "set point" are drawn. When an operation corresponding to a verb object "list point" is executed for those points, a noun object "point sequence" (3) is obtained. When a verb object "generate curve" is operated for the noun object "point sequence", a noun object "line segment" equivalent to a line segment is obtained.

The attribute network of the right portion shown in FIG. 4A is used to paint a picture corresponding to the entity network of the left portion. Each noun object of the attribute network is identified by a relevant noun object of the entity network. In the attribute network, in the none state, when a verb object "luminance data" is operated, a noun object "luminance on the point" for designating the luminance of each point is obtained. When a verb object "individual list" for listing points and a verb object for designating the luminance of the point are operated to the noun object "luminance on the point", a noun object "luminance on the point sequence" is obtained. In addition, when a verb object "generate luminance data along line segment" is operated to the noun object "luminance on the point sequence", a noun object "luminance on the line segment" is obtained. As a result, a color picture is finally obtained.

Figure 5:
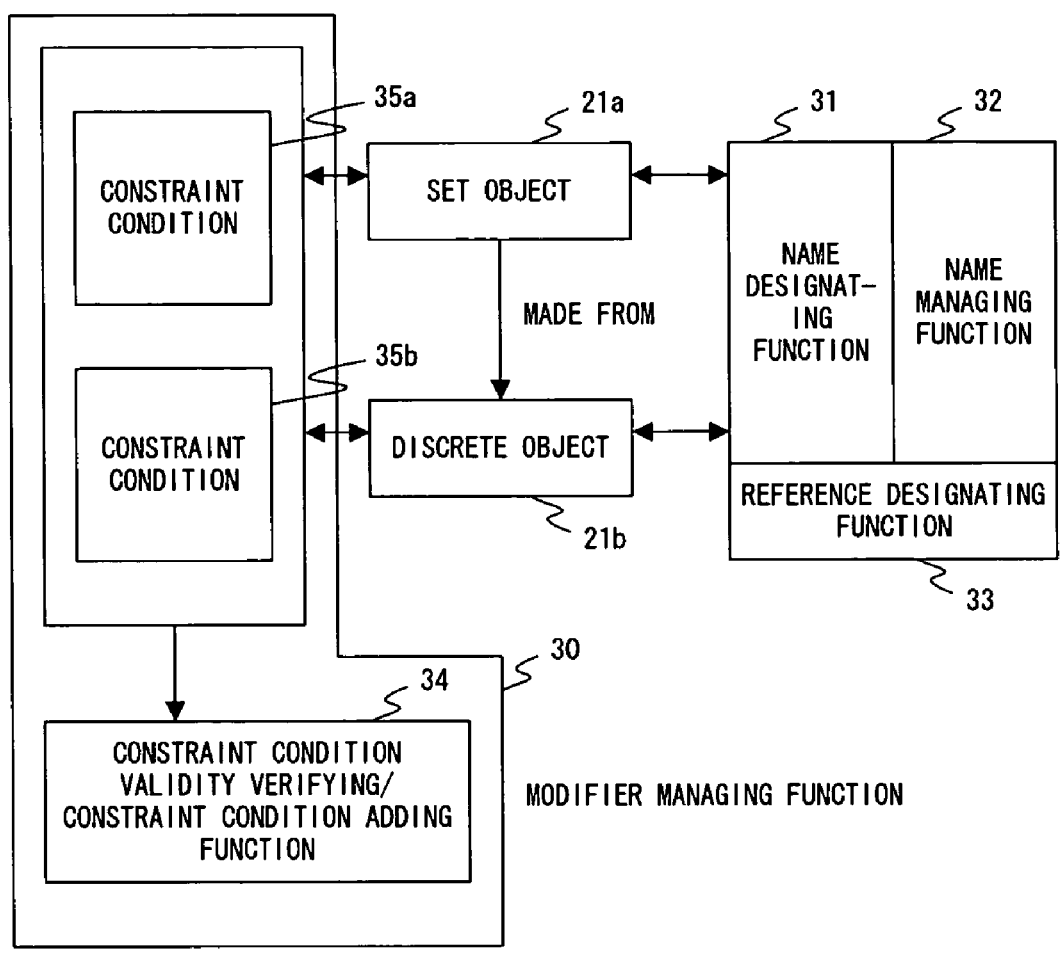
FIG. 5 is a block diagram showing the detailed structure of a noun object managing mechanism.

FIG. 5 is a block diagram showing the detailed structure of the noun object managing mechanism 14 shown in FIG. 2. Referring to FIG. 5, the noun object managing mechanism 14 comprises a modifier managing function 30, a name designating function 31, a name managing function 32, and a reference designating function 33. The noun object managing mechanism 14 manages set objects 21a and discrete objects 21b.

The modifier managing function 30 contains constraint conditions 35a and 35b and a constraint condition validity verifying/constraint condition adding function 34. The constraint conditions 35a and 35b are those for set objects 21a and discrete objects 21b as adjectives that modify noun objects. The constraint condition validity verifying/constraint condition adding function 34 determines the validity of those constraint conditions.

The name designating function 31 allows the user or the system to designate the name of for example a discrete object 21b. The name managing function 32 manages the name designated by the name designating function 31. The reference designating function 33 allows for example a particular discrete object 21b to be distinguished from another object and referenced.

Figure 6:
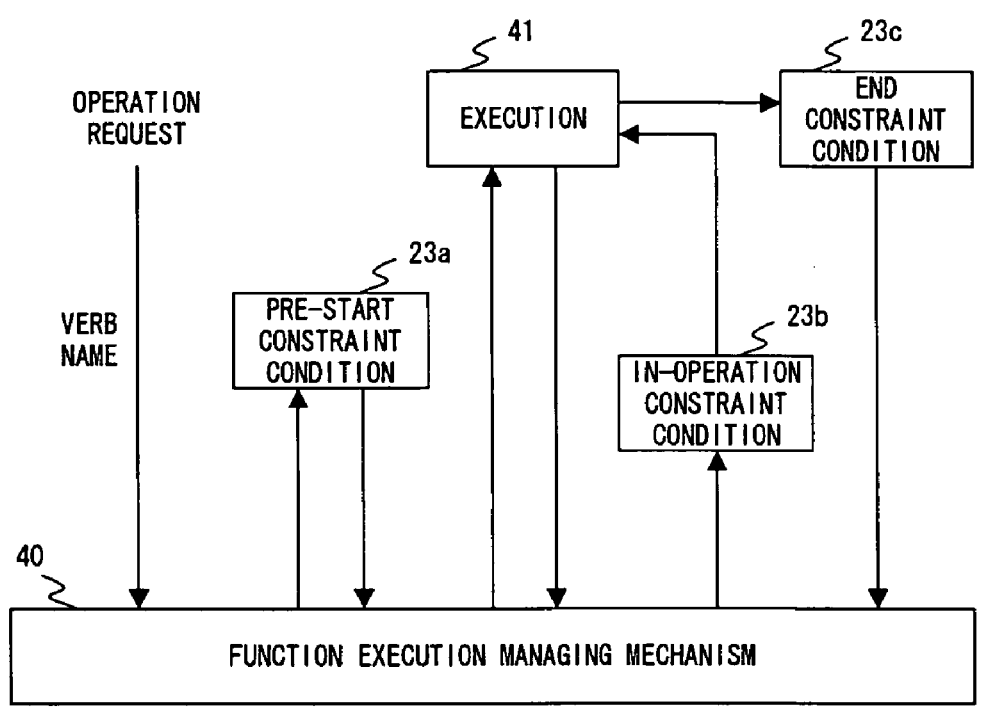
FIG. 6 is a schematic diagram for explaining a specific function execution managing mechanism corresponding to a verb object.

FIG. 6 is a schematic diagram for explaining an execution management of a specific function corresponding to a verb object. The execution management of a function is performed by a function execution managing mechanism 40 that is not shown in FIG. 2.

The function execution managing mechanism 40 manages an execution 41 of a specific function as a designated verb object corresponding to a pre-start constraint condition 23a, an in-operation constraint condition 23b, and an end constraint condition 23c. In other words, corresponding to a function operation request, the function execution managing mechanism 40 verifies the pre-start constraint condition 23a along with other constraint conditions, performs the execution 41 of the specific function, verifies the in-operation constraint condition 23b during the execution of a function, and then, when the function execution is finished, verifies the end constraint condition 23c.

For example, when an arc is drawn, coordinate values of at least three points should be pre-designated. When coordinate values of only two points are pre-designated, a function for drawing an arc cannot be executed. However, when the function execution managing mechanism 40 verifies the pre-start constraint condition 23a, the function execution managing mechanism 40 can pre-verify such a condition. When necessary, the function execution managing mechanism 40 can automatically activate a function for prompting the user for the coordinate values of the third point.

Figure 7:
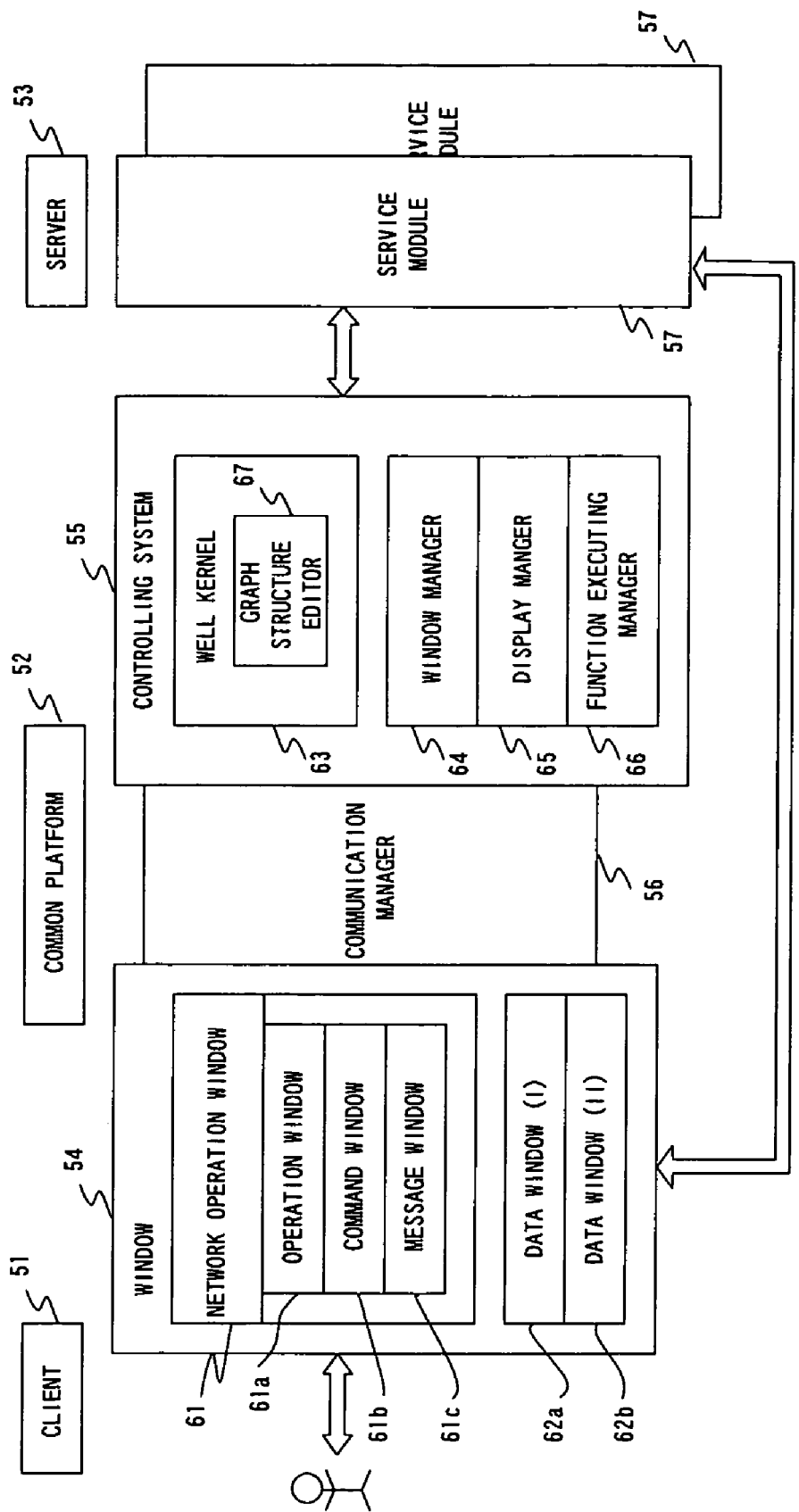
FIG. 7 is a block diagram showing the basic structure of an information processing apparatus having a common platform as an interface to a user.

Next, the above-mentioned common platform will be described. FIG. 7 is a block diagram showing the basic structure of an information processing apparatus. Referring to FIG. 7, the information processing apparatus has a common platform 52 as an interface between a client 51 and a server 53. The server 53 executes a process designated by the client 51. Referring to FIG. 7, the common platform 52 comprises a window 54, a controlling system 55, and a communication manager 56. The window 54 is used to input and output data with the client 51. The communication manager 56 matches the data display format between the window 54 and the controlling system 55. The server 53 is generally composed of a plurality of service modules 57.

The window 54 is composed of a network operation window 61 and a data window 62. The network operation window 61 is composed of an operation window 61a, a command window 61b, and a message window 61c. The operation window 61a displays pictures and characters that allow for example the client 51 side to input various commands for various operations. The command window 61b displays pictures and characters that allow the client side to input various commands. The message window 61c displays messages issued from the system side to the client side. The data window 62 is composed of a data window (I) 62a and a data window (II) 62b. The data window (I) 62a displays processed results. The data window (II) 62b displays constraint data necessary for a process.

The communication manager 56 converts the data display format exchanged between the client 51 and the server 53 through the window 54. The display format conversion will be described later.

The controlling system 55 is a part of the WELL system that will be described later. The controlling system 55 comprises a WELL kernel 63, a window manager 64, a display manager 65, and a function executing manager 66. The WELL kernel 63 controls a process corresponding to an object network. The window manager 64 controls the selection of a window from the window 54. The display manager 65 controls the data display of the window. The function executing manager 66 controls the execution of a function corresponding to a verb object of the object network. The WELL kernel 63 has a graph structure editor 67 that processes a graph structure of the network, and considers an object network as a kind of data.

In FIG. 7, when the client 51 designates a process object, the server 53 calls an object network that represents the process object area. The graph structure editor 67 stores the object network in the work area of the WELL kernel 63. Corresponding to the result, the object network is displayed on the operation window 61a under the control of the window manager 64 and with an intervention of the communication manager 56.

The client 51 identifies all or a part of the nodes of the object network displayed on the operation window 61a, and designates them to the system (to the communication manager 56). The communication manager 56 interprets the designated content and causes the server 53 to call a template corresponding to a designated noun object. The template will be described later.

Constraint data corresponding to for example a noun object is displayed on the data window (II) 62b. The client 51 selects the constraint data. The server 53 executes a process corresponding to the selected result of the client 51. The executed result is displayed on the data window (I) 62a. The client 51 evaluate the executed result and issues the next command.

In the information processing apparatus using the common platform shown in FIG. 7, a data display format that is most suitable for the user as the client 51 is used on the window 54. The common platform 52 converts the data into the internal data format of the data processing apparatus so that the user can easily use the data.

A human as the client 51 can more easily understand a figure such as a graph and a picture than a text. In addition, with a figure such as a graph and a picture, he or she can more easily issue a command than with a text. It is preferred to issue a command for a point and a line directly onto the data window 62 or using a mouse.

On the other hand, a computer as the server 53 can effectively process a point as (x, y) coordinate values and a line as a list of pixels from the start point to the end point.

In other words, between the common platform 52 and the client 51, it is desirable that a user can issue a command by visually designating a point and a line. On the other hand, between the common platform 52 and the server 53, it is preferred to designate data in an index format, transfer designated data of the client 51 as a batch, or process it in combination.

Between the common platform 52 and the client 51, data of a figure and a picture is displayed as it is. Thus, the client 51 can issue a command using a figure or a picture. Between the common platform 52 and the server 53, data is designated in a list structure or a raster structure.

Between the common platform 52 and the client 51, a data element can be designated with the name thereof. Between the common platform 52 and the server 53, a data element is designated with the name header thereof.

In the example, in the information processing apparatus having the common platform 52 and the server 53 shown in FIG. 7, a WELL system described in a functional language referred to as WELL (Window based Elaboration Language) in which an information process is executed with an object network of which data and a process thereof are treated as objects and represented as a graph is used.

FIG. 8 is a schematic diagram for explaining the relation between a WELL system and an object network. In FIG. 8, reference numerals 72a, 72b, and 72c represent respective process fields. In particular, reference numeral 72c represents a color picture creating-painting process field. Reference numerals 73a, 73b, and 73c are object networks corresponding to the fields 72a, 72b, and 72c, respectively. In particular, reference numeral 73c represents a drawing object network combined with a drawing service module. A graph structure editor 71 is a graph structure editor of an extensible WELL system, which can correspond to various object networks.

When an object network corresponding to a particular field is given to a functional language referred to as WELL, the object network is processed without a program. The language is a window-oriented language. When a window as an interface with the client is used, a client server model is accomplished.

In FIG. 8, corresponding to the color picture creating-painting process field 72c, by combining a required window and an object network 73c for a service module that performs a relevant process, a WELL system 74 corresponding to the color picture creating-painting process field 72c is accomplished. Likewise, when the object network 73a or 73b of the other field is combined, a system corresponding to the field 72a or 72b is created.

Figure 9:
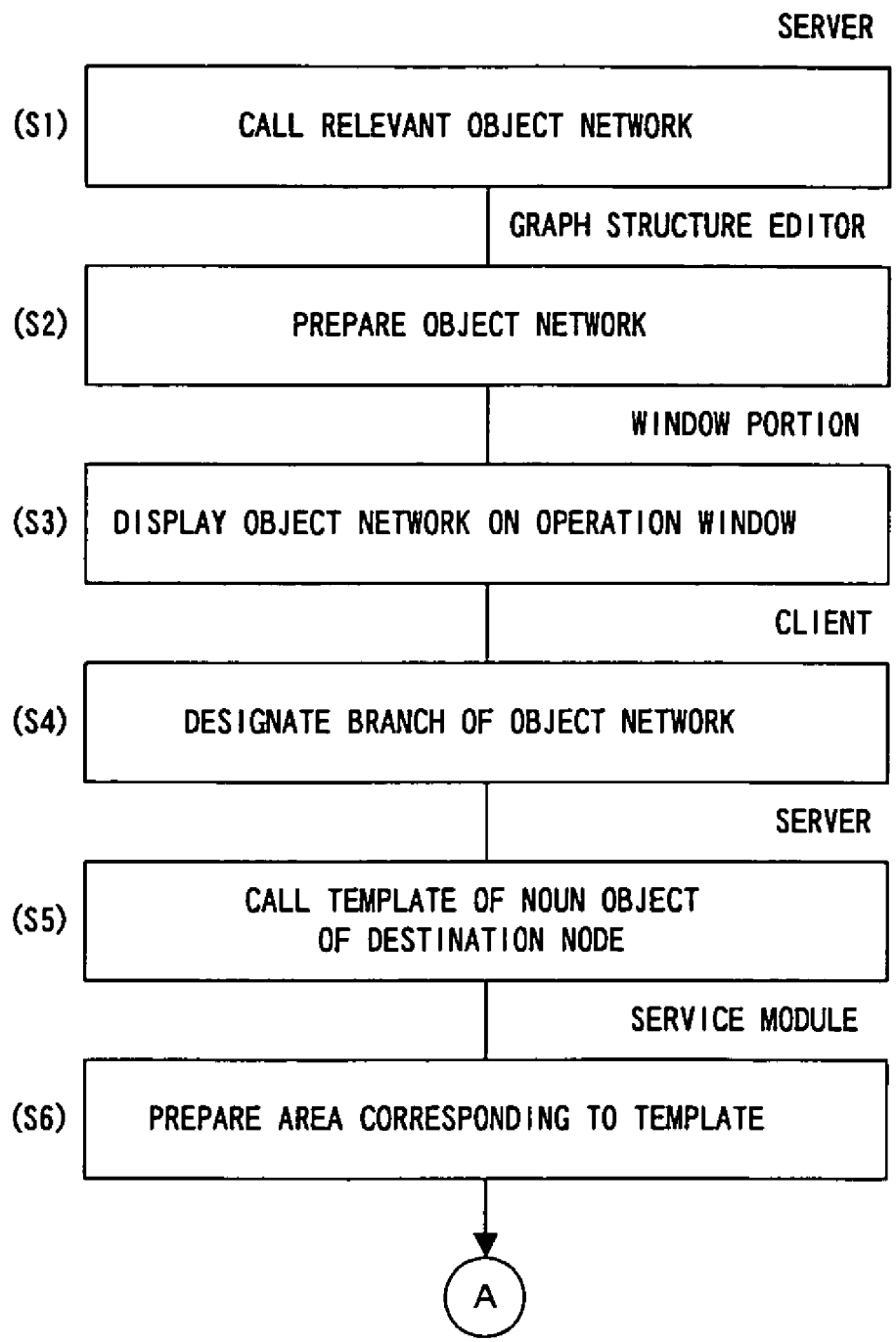
FIG. 9 is a first part of a flow chart showing a data process using an object network (No. 1)
Figure 10:
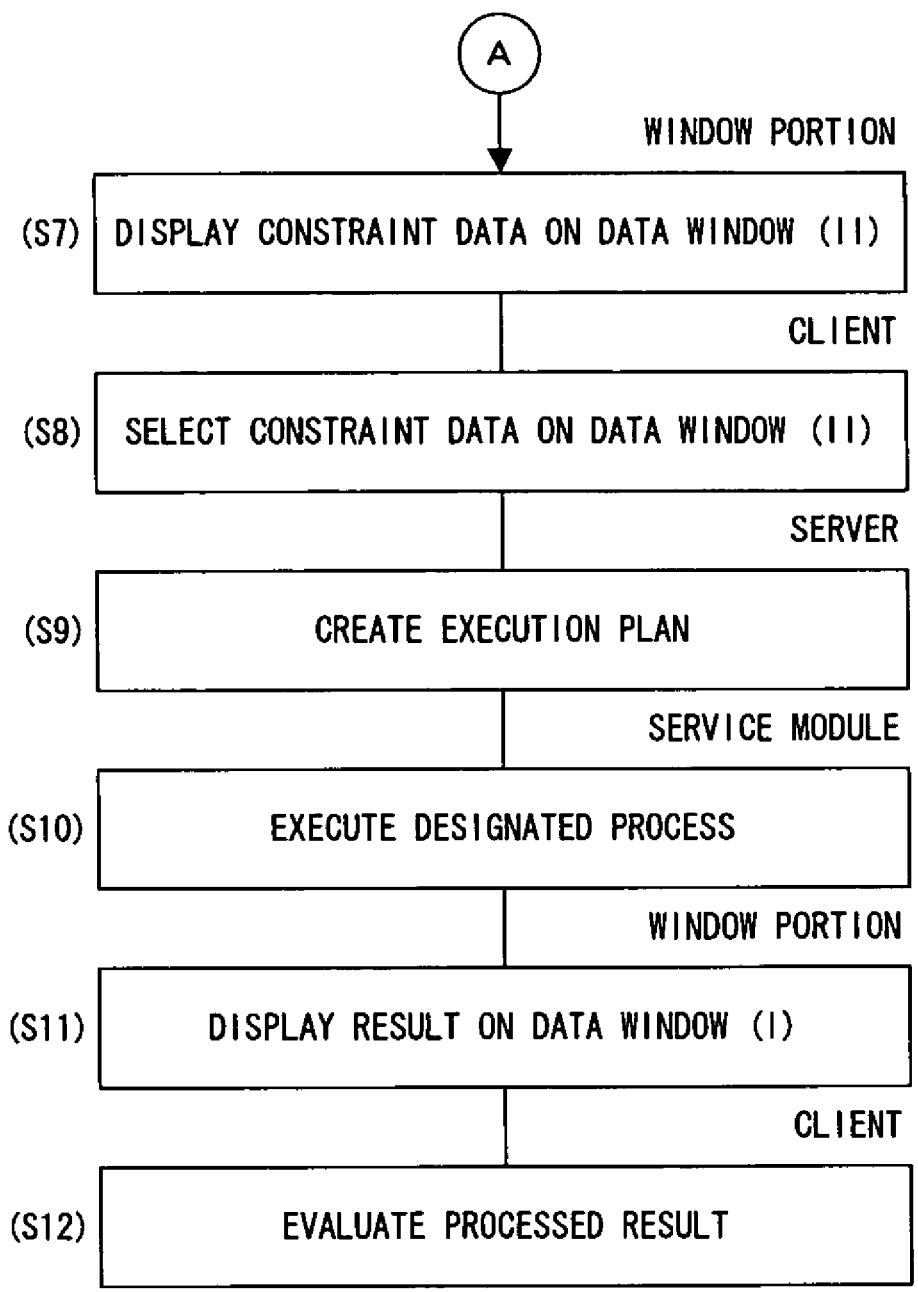
FIG. 10 is a second part of FIG. 9.

FIGS. 9 and 10 are a first part and a second part of a flow chart of a data process using an object network, respectively. When the process is started in FIG. 9, at step S1, a relevant object network is called by the server 53 shown in FIG. 7. When a process of the color picture creating-painting process field 72c is performed, an object network shown in FIG. 4A is called. The called object network is stored in a work area of the WELL kernel 63 by the graph structure editor 67 at step S2. At step S3, the WELL kernel 63 activates the window manager 64 and the display manager 65. The object network is displayed on the operation window 61a under the control of the communication manager 56.

At step S4, the user designates a part (for example, a branch) of the object network displayed at step S3, and the client 51 issues a command to the communication manager 56 of the system. The designated result is identified by the communication manager 56. At step S5, the server 53 calls a destination node (namely, a template corresponding to a noun object at the edge of the branch) under the control of the WELL kernel 63. At step S6, the service modules 57 prepares an area corresponding to the template.

Next, at step S7 shown in FIG. 10, constraint data corresponding to the template is extracted on the common platform 52 side and displayed on the data window (II) 62b. On the other hand, at step S8, the client 51 selects particular constraint data displayed on the data window (II) 62b. The selected result is identified by the communication manager 56 and sent to the server 53 with an intervention of the WELL kernel 63. Thereafter, at step S9, an execution plan is created.

Corresponding to the created execution plan, at step S10, the service module 67 executes the process designated by the user (for example, the line drawing and painting process). At step S11, the result is displayed on the data window (I) 62a. At step S12, the client 51 evaluates the processed result and issues the next command.

Figure 11:
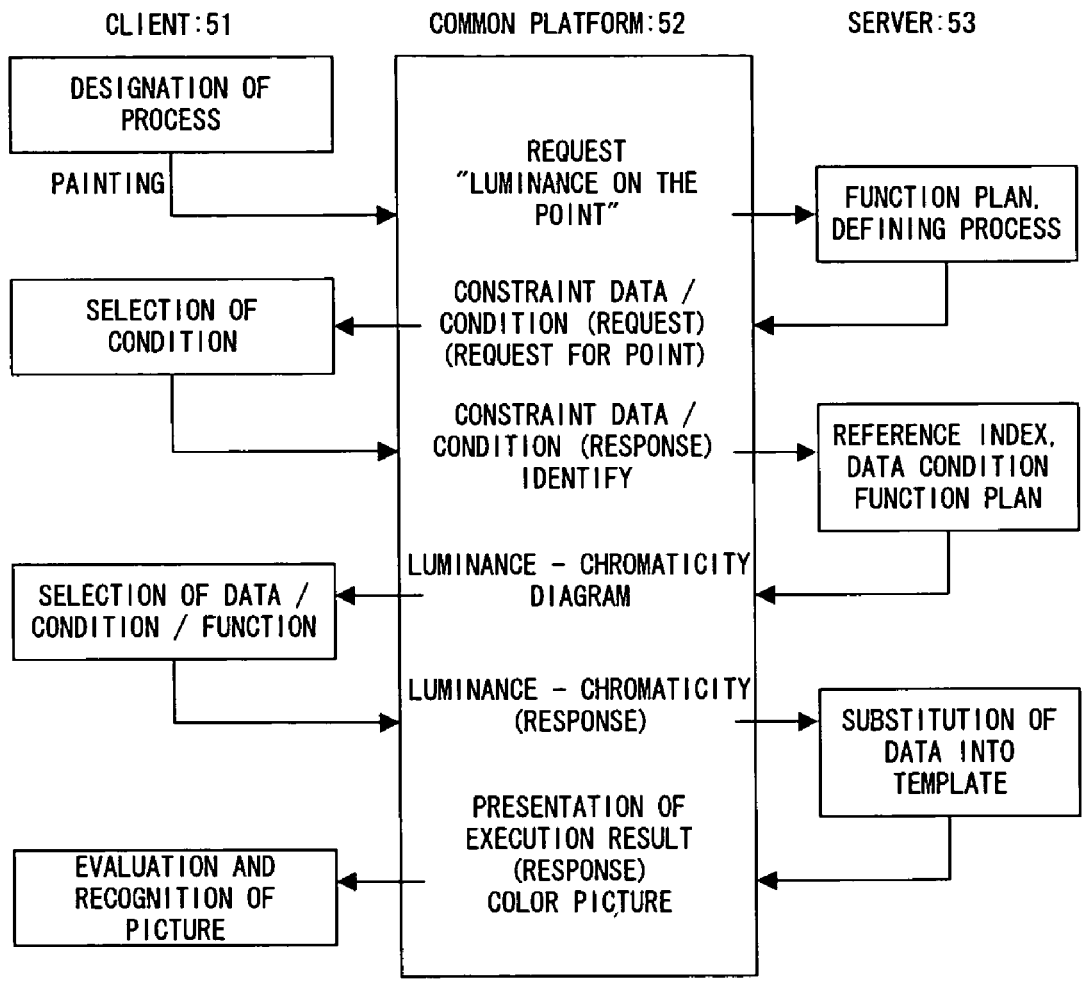
FIG. 11 is a schematic diagram showing the color picture creating and painting processes.

FIG. 11 shows the color picture creating and painting process performed by an information processing apparatus having a common platform. In the example, a "luminance on the point" creating process for designating a luminance to a point on the attribute network as the right portion of the object network shown in FIG. 4A will be described.

When the client 51 supplies a "luminance on the point" creating request as a process command to the server 53 through the common platform 52, the server 53 requests the client 51 for information representing at which point the luminance is designated as constraint data/condition necessary for planning an execution function. The client 51 identifies a point as a condition selection. The server 53 recognizes the point by referring to the index of the template through the common platform 52 and requests the client 51 to select the luminance data, which should apply to the point, as a data necessary for planning an execution function.

The request is supplied as a luminance-chromaticity diagram to the client 51 side. The client 51 side supplies the luminance-chromaticity data, which should apply to the designated point on the luminance-chromaticity diagram as data/condition/function selection to the server 53 side. The server 53 side substitutes the luminance-chromaticity data to the template, executes the process, and presents a color picture as the executed result to the client 51 side through the common platform 52. The client 51 side recognizes the color picture, evaluates the executed result, and designates the next process.

FIG. 12 is an example of a template used in a process performed on the server 53 side. The template corresponds to a noun object "point" shown in FIGS. 4A and 4B. The template contains the coordinates X and Y of the point on the display screen, an index designated on the system side rather than the coordinates, and attribute data (such as luminance and chromaticity) for the point.

FIG. 13 is an example of a template corresponding to a noun object "line segment" shown in FIG. 4A. The line segment template contains luminance and chromaticity vectors of major points No. 1, No. 2, . . . , and No. n that compose a line segment and pointers designating other points in respective attribute data storage areas. By these pointers, the templates shown in FIG. 13 on the whole define a template corresponding to one line segment.

Figure 14:
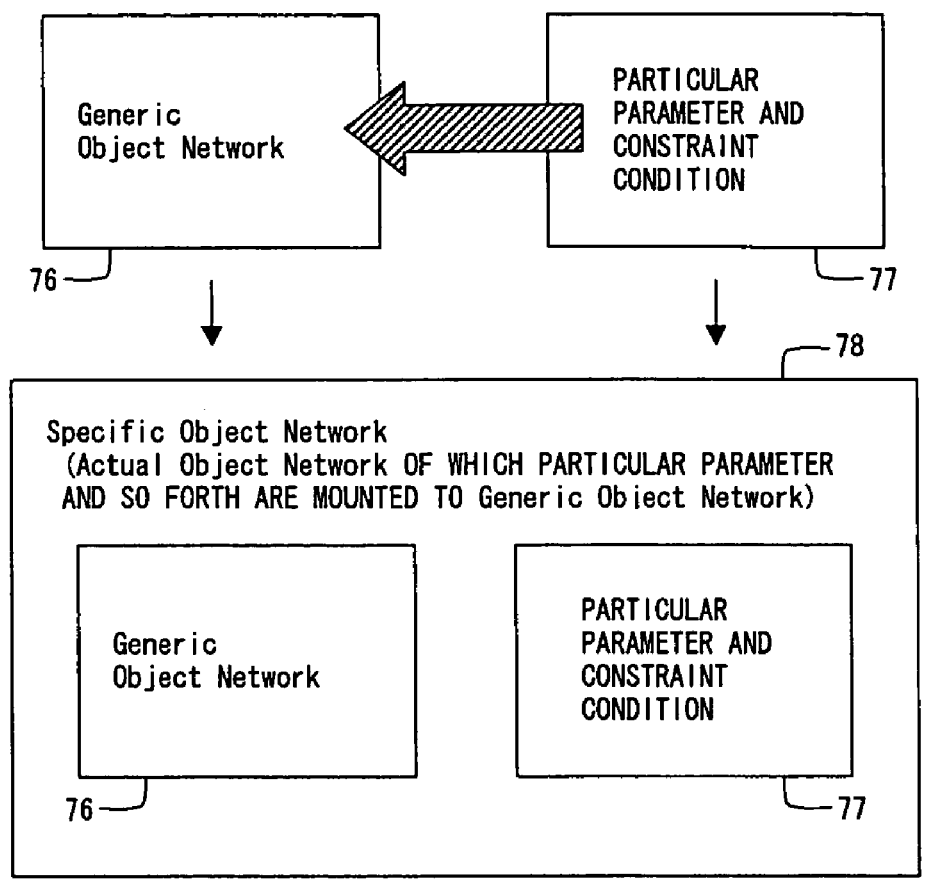
FIG. 14 is a schematic diagram for explaining a method for creating a specific object network with a conventional generic object network.

FIG. 14 is a schematic diagram for explaining a method for creating a specific object network as a specific object network for performing a particular process with a generic object network. For example, as with a mathematical formula of which a variable is generalized, a generic object network 76 of which a parameter and a constraint condition are generalized is used. When a parameter and constraint condition 77 for performing a particular process is mounted to the generic object network 76, a specific object network 78 for performing a particular process is created.

FIG. 15 is a block diagram showing the structure of an information processing apparatus having an agent. In comparison with the structure shown in FIG. 7, an agent control server 80 is disposed between the client 51 and a specific role server 81 corresponding to the server 53 shown in FIG. 7. In FIG. 15, the agent control server 80 performs a role such as a travel agent between the client 51 and the specific role server 81 that executes a specific process.

A display process 82 and a dependent display process 83 are display processes for displaying required data between the client 51 and the agent control server 80 and between the agent control server 80 and the specific role server 81. Between the client 51 and the agent control server 80, a service is requested and a response thereof is performed using the display process 82.

The agent control server 80 prepares a service plan corresponding to a command issued by the client 51, searches a server that executes the role (namely, the specific role server 81), creates a service role assignment plan, and requests the specific role server 81 to execute the role function through the dependent display process 83.

The specific role server 81 performs a process for the assigned service execution plan and presents the processed result to the agent control server 80 through the dependent display process 83. The agent control server 80 checks for the service result and presents the result to the client 51 through the display process 82.

The display process 82 and the dependent display process 83 shown in FIG. 15 are accomplished as a common platform described with reference to FIG. 7. In addition, it can be considered that the agent control server 80 is accomplished as one of the service modules 57.

Figure 16:
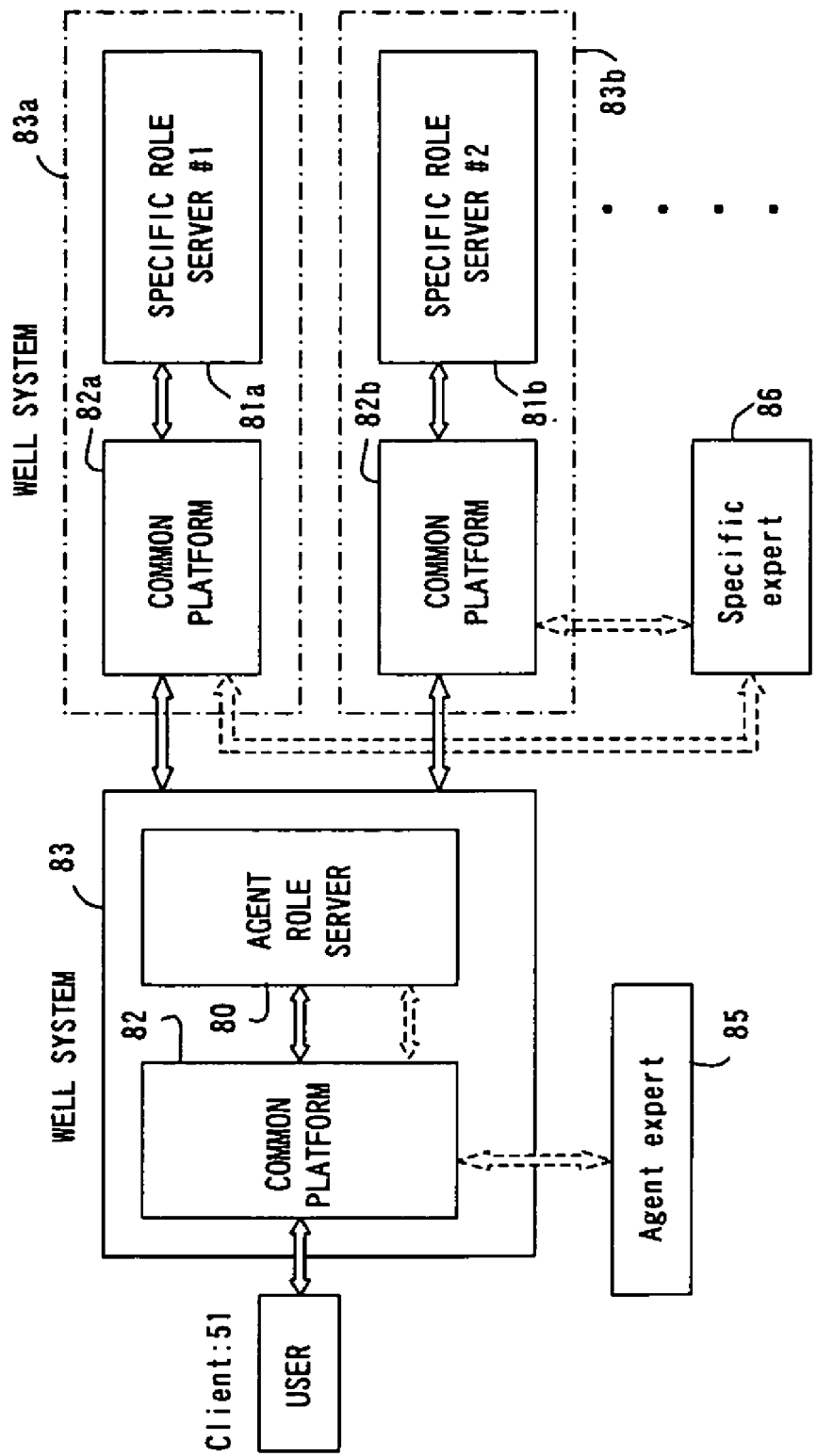
FIG. 16 is a block diagram showing the structure of an information processing apparatus in consideration of a presence of an expert.

FIG. 16 is a block diagram showing the structure of an information processing apparatus in consideration of the presence of an expert. In FIG. 16, unlike with the example shown in FIG. 15, a plurality of specific role servers 81a, 81b, . . . , and so forth are disposed. Each specific role server independently executes an assigned service. The agent control server 80 integrates the executed results of the specific role servers and executes a process corresponding to a command issued from the client 51. The agent control server 80 and the display process 82 compose a WELL system 83. In addition, for example, the specific role server 81a and the common platform 82a compose a WELL system 83a.

In FIG. 16, an agent expert 85 assists an information exchange between the client 51 and the agent control server 80. Likewise, a specific expert 86 assists an information exchange between the agent control server 80 and the plurality of specific role servers 81a, 81b, . . . , and so forth.

Although the client 51 is a human as a user, the agent expert 85 and the specific expert 86 are not limited to humans. Instead, the agent expert 85 and the specific expert 86 can be accomplished by processing units having intelligent functions.

In FIG. 16, the client 51 requests the agent control server 80 to solve a particular problem. To do that, the agent expert 85 structures a generic object network corresponding to a process executed by the agent control server 80 as an expert and create specific object network having particular parameters and constraint conditions so as to assist the agent control server 80 to plan a service. The agent expert 85, generally, creates a plurality of specific object networks.

Likewise, the specific expert 86 designs an object network and a relevant template for accomplishing a service assigned to each specific role server corresponding to a service plan created by the agent control server 80 so as to assist the process of the specific role server.

Next, a role function and an interactive function of an information processing apparatus using an object network and a common platform will be described. FIG. 17 is a schematic diagram for explaining the definition of "role". As shown in FIG. 17, a role 90 is defined as a structure of an object network. The role 90 functions as a unit of an execution process. A name is designated to a "role". With a designated name, a "role" is referenced inside and outside the system.

The relation among a plurality of object networks in one "role" is defined as a relation expression of attribute values of objects corresponding to regulations defined in the objects that compose each of the object networks. A "role" may be composed of only one object network.

In the information processing apparatus according to the present invention, when a plurality of "roles" are executed, to satisfy overall command issued by the user, the "roles" should be cooperatively operated. To do that, it is necessary to enhance the interactive function among the "roles" and provide a free communication mode. In addition, to satisfy a request issued by the user, it is necessary to provide an effective interactive function between the user (who can be considered as one supporting role) and a system that provides a service. As was described above, the interface function between the user and the system is accomplished by the common platform.

In such a data processing apparatus, between the user and the system or among a plurality of "roles", as an effective interactive function, an event driving function and a data driving function are used.

As an event driving function, the client requests the system to implement a noun object of a common platform. On the system side, a server that receives a request from the common platform returns the executed result as a response to the client side.

As a data driving function, when a value of a particular attribute of a template corresponding to a noun object currently handled in the system is undefined, the system requests the client side to designate the attribute value. At that time, a data window shows that the attribute value is undefined. With the data window, the client side is requested to define the attribute value.

Figure 19:
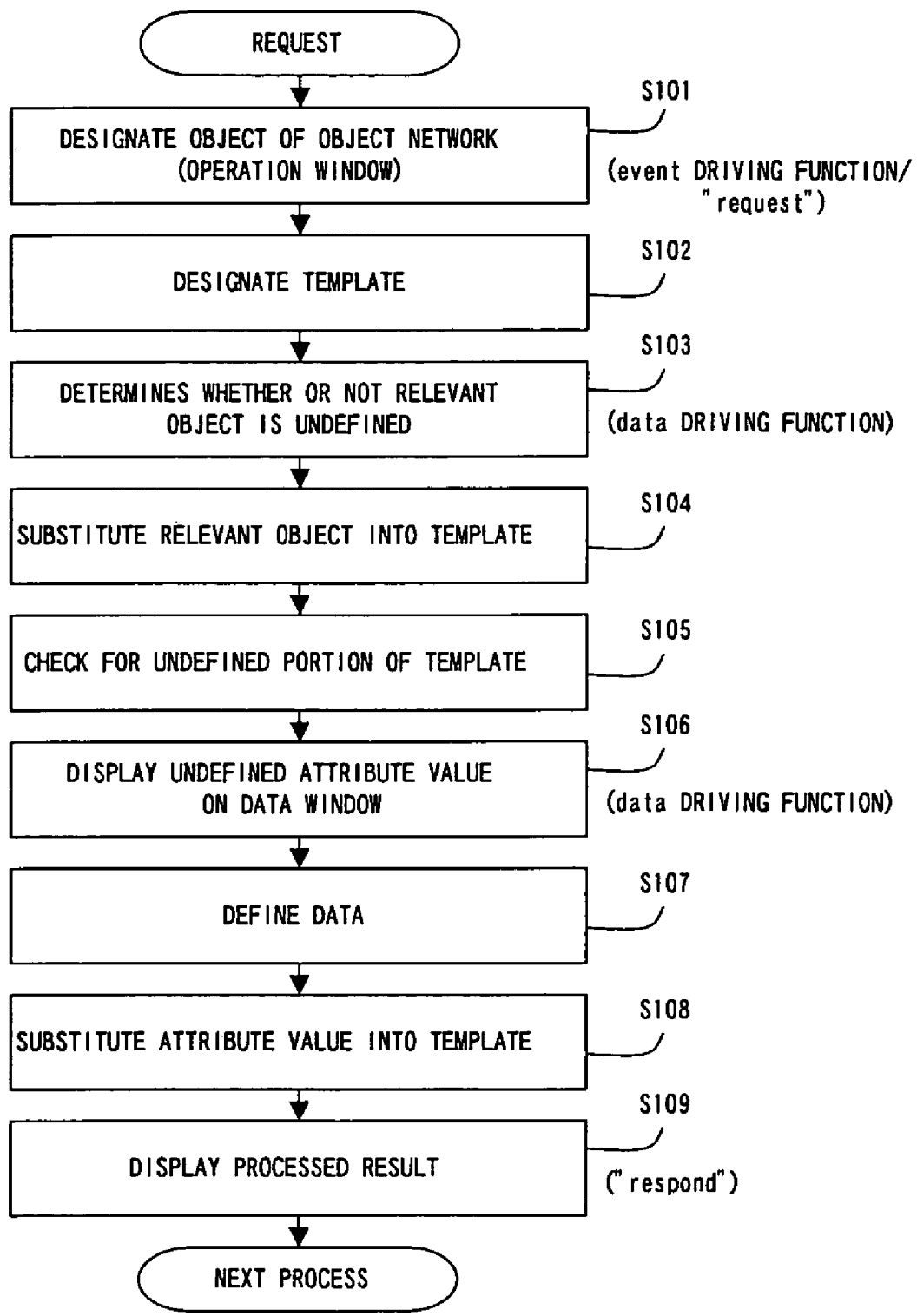
FIG. 19 is a flow chart showing a process for an interactive function.

FIG. 18 is a schematic diagram for explaining the operation performed in the WELL system of the interactive function corresponding to such event driving function and data driving function. FIG. 19 is a flow chart showing the process of the interactive function corresponding to the event driving function and the data driving function shown in FIG. 18. Next, with reference to FIGS. 18 and 19, processes corresponding to an event driving function and a data driving function will be described.

At step S101 shown in FIG. 19, the client (for example, the user) issues a request of one object of an object network displayed on an operation window 100 of a common platform shown in FIG. 18 to the system. Such a request is equivalent to an event driving function (request). Corresponding to the user's request, a template corresponding to the object is designated at step S102.

When the specific name of the object of the designated template is undefined, a kernel 103 of the WELL system determines that the name is undefined. At step S103, the system requests the client to designate a relevant object as a data driving function. As was described in FIG. 14, that situation is equivalent to the case that the name of an object of a specific object network corresponding to an object that composes a generic object network is undefined.

The client designates a relevant object on a data window 101. At step S104, the designated object is substituted into the template. The kernel 103 determines whether or not there is an attribute value that is undefined in the template at step S105. When there is an attribute value that is undefined, the flow advances to step S106. At step S106, the system requests the client to input the undefined attribute value as a data driving function on the data window 101.

The client defines the undefined attribute value on the data window 101. The defined attribute value is received on the system side at step S107. At step S108, the attribute value is substituted into the template. The WELL system executes the process using the template into which the attribute value has been substituted. At step S109, the processed result is displayed on the data window 101. As a result, the process (response) corresponding to the request of the client is completed.

With such an interactive function using an event driving function and a data driving function, an effective and user-friendly interface can be accomplished between the user and the system. Between a plurality of "roles" (for example, between an agent role server and a specific role server), a communication function for assisting a corporative operation between role functions can be accomplished. When the interactive function is accomplished by the kernel of the WELL system, a software architecture considering various systems (in particular, a personal computer system) can be accomplished.

When a plurality of "roles" are cooperatively operated, it is preferred to provide an interactive function between a main role for executing a role function as a main body and an assisting role for providing a service function for assisting the main role corresponding to common data. The main role is operated in a particular environment corresponding to the main role. Environment data concerned with the environment is usually must be monitored. When the assist role shares the environment data with the main role and it is notified of a change of the environment data as an interrupt, the main role can be operated corresponding to the change of the environment.

Figure 20:
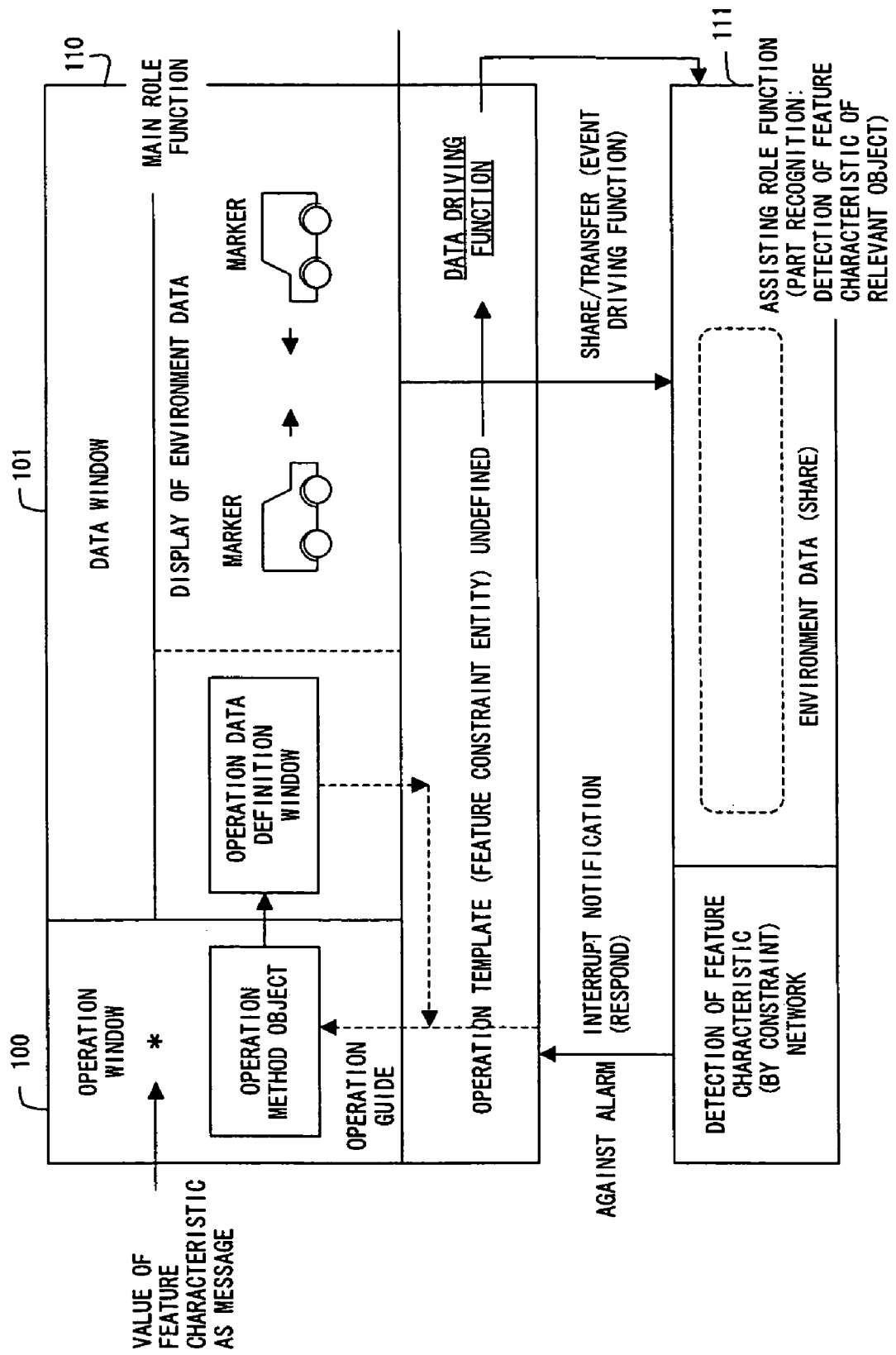
FIG. 20 is a schematic diagram for explaining an interactive function between a main role function and an assisting role function.

FIG. 20 is a schematic diagram for explaining an interactive function between a main role function and an assisting role function corresponding to environment data. In FIG. 20, a semi-automatic driving operation of two cars is considered. Each car that is equipped with a system is drove in a course of which the cars may collide.

A main role 110 is assigned to a first car. The main role 110 has an object of an operating method of a semi-automatic driving operation. The object is displayed on the operation window 100 of the common platform. In addition, environment data is displayed on the data window 101.

When the displayed environment data varies, it is transferred as an event driving function to an assisting role 111. The assisting role 111 detects a feature characteristic of the environment data. The feature characteristic is detected by a relevant object network (feature characteristic detecting object network) of the assisting role 111.

When a feature characteristic of which the two cars have approached as they will inevitably collide is detected, the assisting role 111 notifies the main role 100 of the detected feature characteristic as an interrupt (response). Corresponding to the interrupt, the main role 100 designates a motion template for the operation method object corresponding to the interrupt.

When the motion template contains undefined data (for instance, for the cars moved in what direction and for what distance), setting of the undefined data is requested as a data driving function. When the semi-automatic driving operation is not performed, the user (namely, driver) is requested to designate the undefined data. However, in the semi-automatic driving operation, for example the assisting role 111 is requested to designate the undefined data. The assisting role 111 detects required feature characteristic from the environment data and provides the requested data corresponding to the detected result. When the provided data is substituted into the template, the main role 100 starts the interactive function with the user so as to cause him or her to drive the car using the operation method object as an operation guide.

To smoothly perform a corporative operation among a plurality of role functions, it is necessary to allow a main role function that executes a particular role to perform a one-to-many broadcast for dependent role functions that execute roles in association with the particular role.

FIG. 21 is a schematic diagram for explaining a one-to-many broadcast from a main role function to dependent role functions. In FIG. 21, it is assumed that a main role 120 and a plurality of dependent roles 123 cooperatively operate as one system. The main role 120 performs the one-to-many broadcast to the plurality of dependent roles 123 so as to control the operations of the dependent roles 123. Thus, an assisting role 121 broadcasts a signal containing feature constraint data to assigning roles 122 on the basis of as an event driving function of the main role 120. The assigning roles 122 receive the broadcast and extract the name of the role function of the broadcast source and constraint data.

Each of the dependent roles 123 has a template containing an undefined portion. The dependent role 123 receives constraint data from a relevant assigning role 122 as an interrupt corresponding to a data driving function. The dependent role 123 executes a dependent role function against the main role 120 corresponding to the constraint data.

Figure 22:
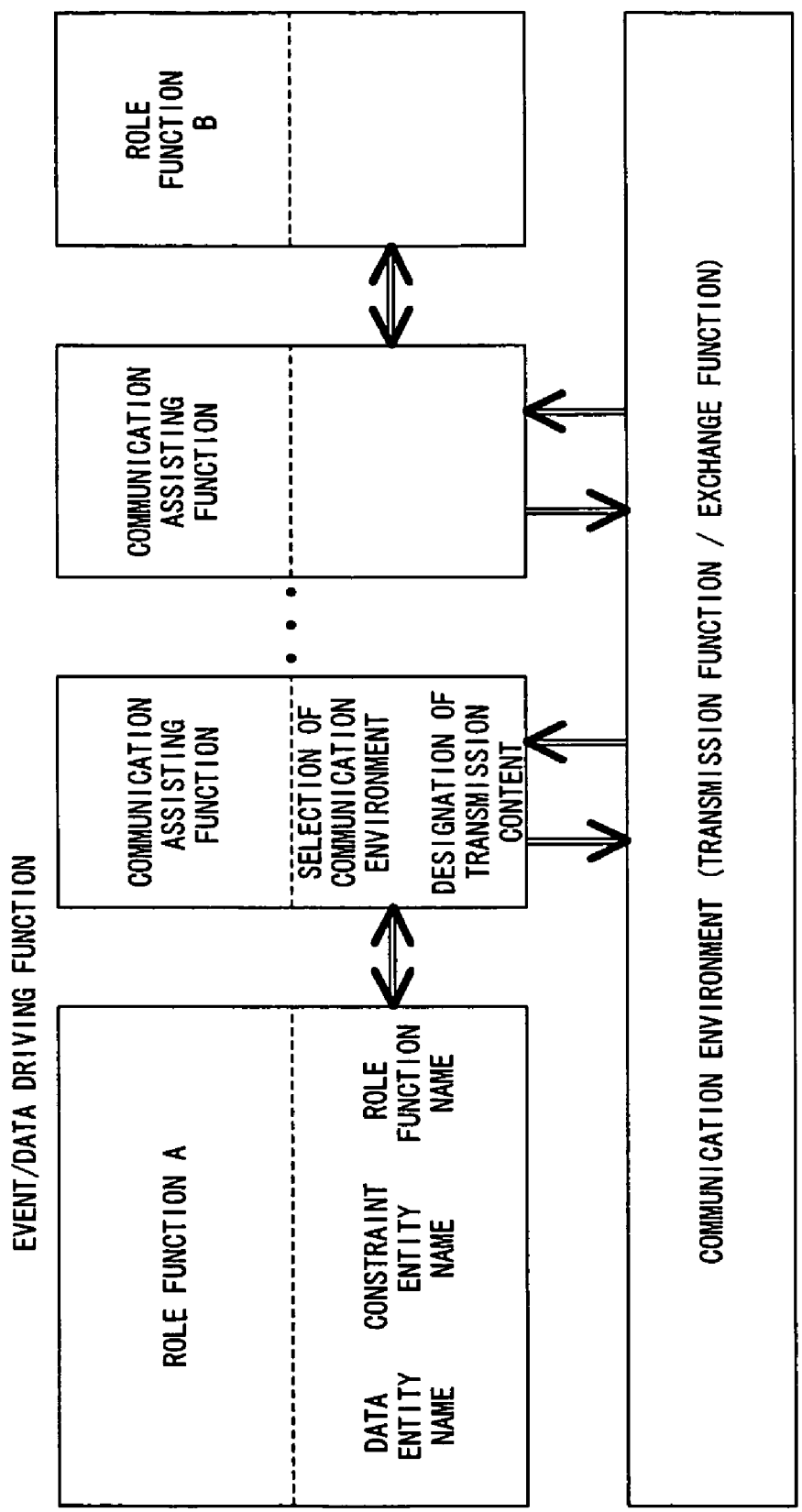
FIG. 22 is a schematic diagram for explaining a communication between role functions.

FIG. 22 is a schematic diagram for explaining communications among role functions. In FIG. 22, a role function A, a role function B, and a plurality of other role functions (not shown) can be communicated through a communication environment. A communication assisting function is provided among the role functions A and B and the communication environment. The communications among the role functions A and B and the communication environment are executed by an interactive function on the basis of as an event driving function and a data driving function.

For example, the role function A designates the role function B as the name of a target role function and transmits the content of a data entity name and a constraint entity name to the role function B through the communication assisting function so as to control the execution process of the role function B. The communication assisting function selects the communication environment and designates the content to be transmitted. A desired role function as a target role function can be freely selected from a plurality of role functions.

After the object network and the common platform have been described, an information process for accomplishing an intension will be described.

An "intention" in the present invention is not a relatively small command such as a setting of a point on a screen or a creation of a point sequence shown in FIG. 4, but a relatively large intension such as an intension of a user (driver) who performs a semi-automatic driving operation without a collision.

"Intentions" can be roughly categorized as common intensions, different intensions, and independent intensions. Common intensions are common in both clients of two systems (for example, drivers of cars who perform semi-automatic driving operations without a collision).

Different intentions are intentions of which a flying bird wants to find and catch swimming fish, whereas the fish wants to well escape from the bird. As another example of different intentions, in the relation of a gorilla and an owl, the gorilla plays with the owl and learns from the play, whereas the owl learns how to escape from the gorilla. In such a case, it can be considered that they have different intentions. However, the strategy of the gorilla is composed of a goal intention of which it does not intend to catch and kill the owl, but stops just before its hand reaches the owl. The goal intention is accomplished in such a manner that an assisting role function of the gorilla detects the maximum level of the reaction of the owl as a feature constraint.

Unlike with the common intentions and the different intentions, an independent intention is an intention that a human has when he or she with a particular purpose regardless of an intention of a user of another system (for example, another human) For example, an independent intention is an intention that a human has when he or she draws a picture or integrates multimedia information and creates a moving picture.

Figure 23:
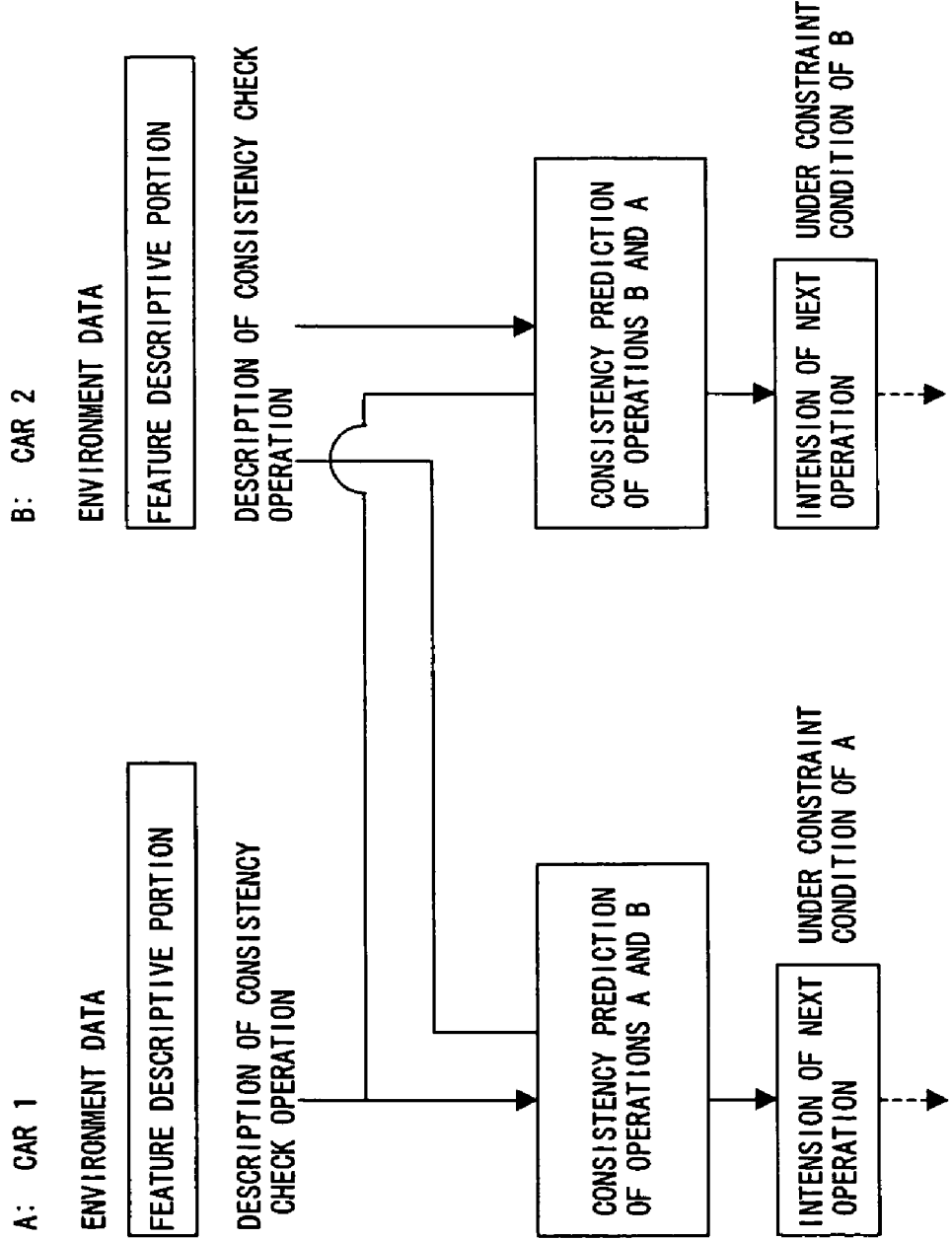
FIG. 23 is a schematic diagram for explaining a consistency predicting process corresponding to common intentions.

FIG. 23 is a schematic diagram for explaining a consistency predicting process in the case that for example users A and B have common intensions of which they want to perform semi-automatic driving operations without a collision. In FIG. 23, the users A and B perform operation predictions of respective cars corresponding to feature descriptive results of the environment data and execute consistency operations for preventing a collision defined in the constraint conditions as their next operations.

Figure 24:
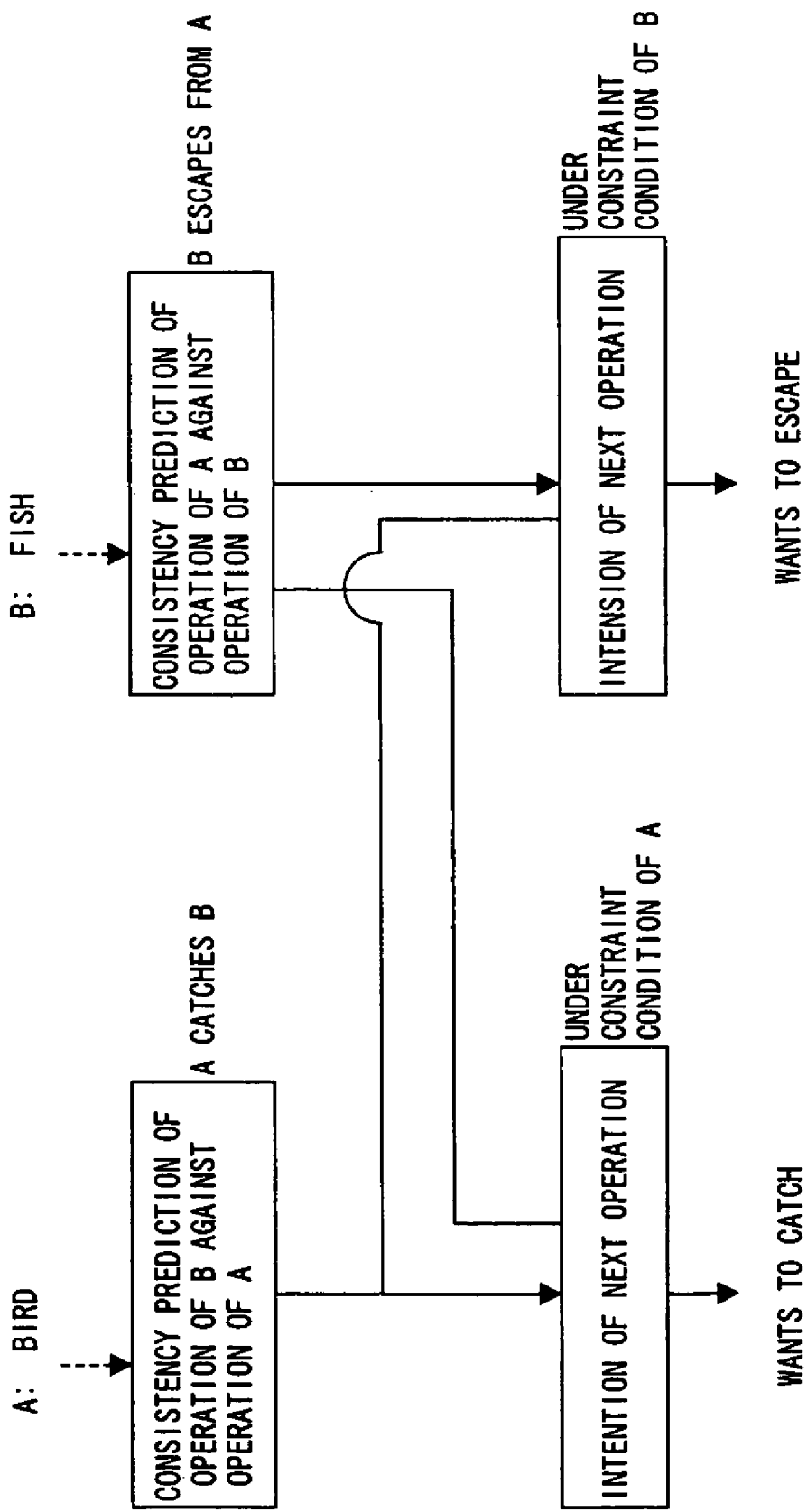
FIG. 24 is a schematic diagram for explaining a consistency-non-consistency predicting process corresponding to different intentions.

FIG. 24 is a schematic diagram for explaining consistency/non-consistency predictions in the case of different intensions of for example a bird and fish. In FIG. 24, the bird tries to catch the fish, whereas the fish tries to escape from the bird. To do that, the bird predicts the route of the fish, whereas the fish predicts the approaching route of the bird so as to cause the predictions to fail. However, in such a case, their next operations are executed under their constraint conditions. The bird performs the next operation with an intention for catching the fish, whereas the fish performs the next operation with an intention for escaping from the bird.

Figure 25:
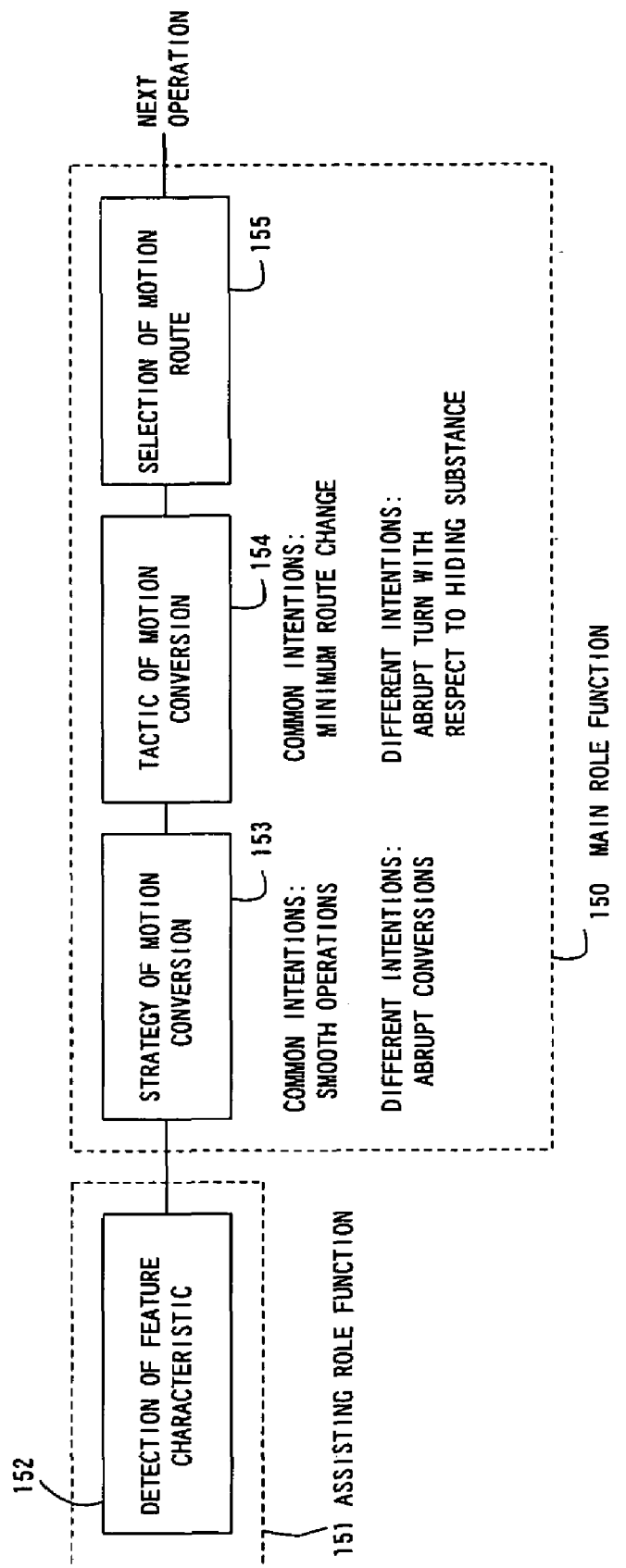
FIG. 25 is a schematic diagram for explaining a motion conversion corresponding to strategies and tactics corresponding to common intentions and different intentions.

In the information process for accomplishing intentions, to avoid a collision of two cars, it is very important to determine strategies and tactics for performing the next operations corresponding to the detected results of feature characteristics such as road conditions (namely, under the constraint conditions). FIG. 25 is a schematic diagram for explaining a motion conversion as a next operation due to strategies and tactics of common intentions for avoiding a collision of cars and of different intentions of a bird and fish.

In FIG. 25, a main role function 150 for performing a main role determines the next operation corresponding to strategies and tactics. An assisting role function 151 for performing an assisting role detects a feature characteristic such as environment data. The assisting role function 151 performs a feature characteristic detection 152 (such as road conditions and speed of the opposite car). The result is supplied to the main role function 150. The main role function 150 first determines a motion conversion strategy 153. In the case of common intentions for avoiding a collision of two cars, the motion conversion strategy 153 is to keep operation as smooth as possible on the motion conversion. In the case of different intentions of which a bird tries to catch fish, to cause their predictions to fail, as strategies, an abrupt motion conversion is used.

Thereafter, the main role function 150 determines a motion conversion tactic 154. In the case of common intentions, the tactic is to minimize a change of the route so as to maximally reduce a shock applied to passengers. In the case of different intensions, the tactic is to perform a sharp turning operation with respect to a hiding substance (for example, a rock) so as to escape the fish from hiding. Corresponding to the tactic, a motion route selection 155 is performed. As a result, the next operation is determined.

Figure 26:
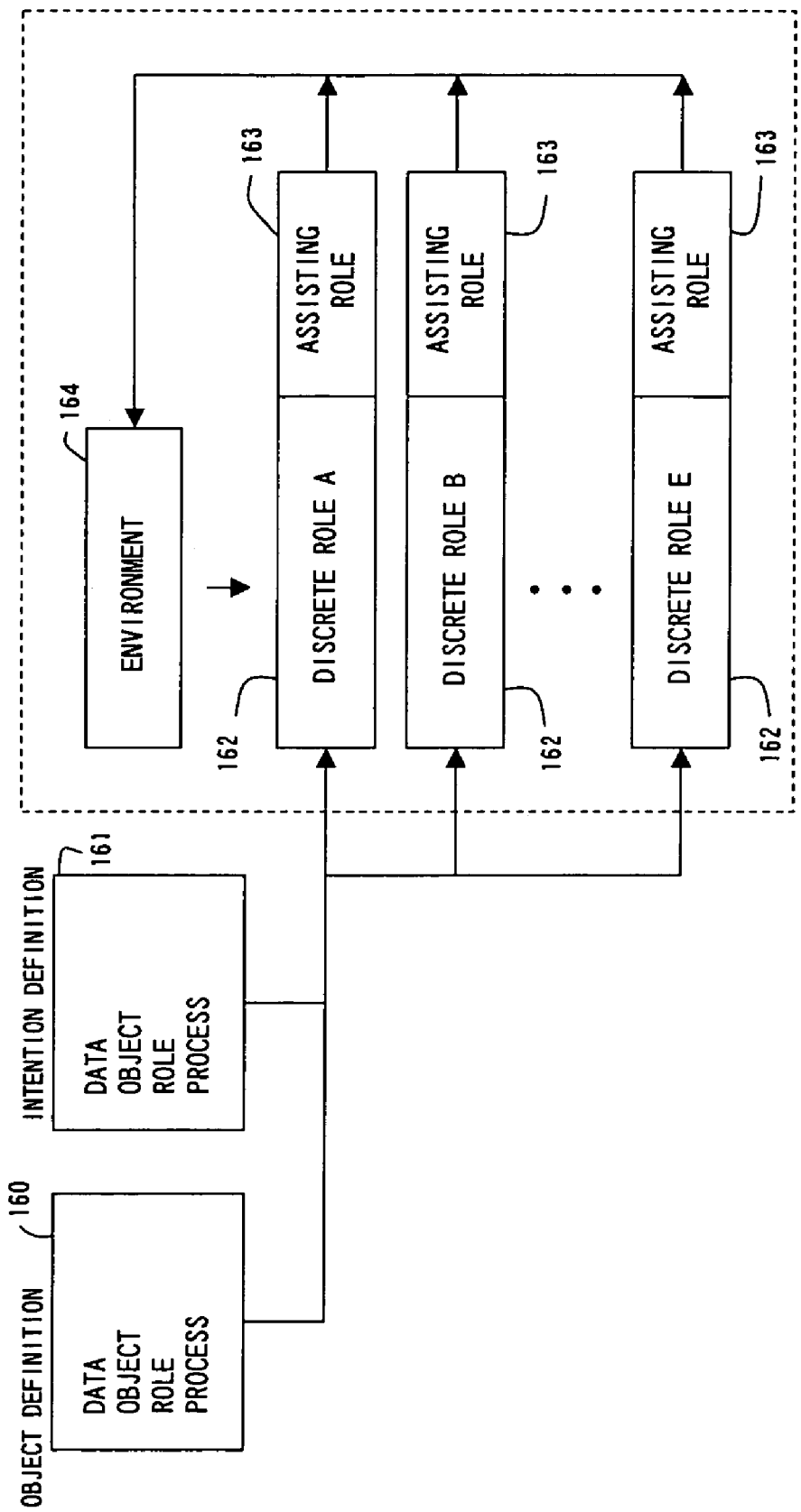
FIG. 26 is a block diagram showing an outline of the overall structure of an intention accomplishing information processing apparatus.

FIG. 26 is a block diagram showing an outline of the overall structure of an information processing system for accomplishing an intention. In FIG. 26, an object definition 160 and an intention definition 161 are designated. The object definition 160 is for example two cars that runs in opposite directions on one road (facing one another). The content of the intention definition 161 is a semi-automatic driving operation without a collision of two cars. Those definitions are designated using an object model (composed of a data model, a noun object, a verb object, or an object network in the format of a template), a role model (as a set of a plurality of object networks as described with reference to FIG. 17), or a process model (representing many roles that are cooperatively performed and integrated).

Corresponding to the contents of the object definition 160 and the intention definition 161, a plurality of discrete roles 162 and assisting roles 163 for assisting the discrete roles 162 execute a process for accomplishing an intention. Each of the assisting roles 163 observes an environment 164, detects a feature characteristic, and supplies the detected feature characteristic as constraint data to the relevant discrete role 162.

FIG. 27 is a schematic diagram for explaining an intention defining process. As a first step of the defining process, an objective area name and an attribute structure thereof are defined. In the example of the above-described two cars, the facing traffic is an objective area. The attribute structure of the objective area is data of a priority road, a one-lane road, or a two-lane road. When the objective area is defined, a generic intention corresponding to a generic object network is converted into a specific intention corresponding to a specific object network.

Thereafter, as the characteristic structure of the intention, it is defined as an independent intention, a common intention, or a different intention. As an operation available structure for the intention, an operation available range of a brake, a steering, and so forth is defined for avoiding a collision of cars. As a target (object function) for the intention, for example a collision protection or the like is defined. As a definition preparing process for assisting in the stage, a template for the operation available structure is designated.

Next, as the definition of an assisting structure for accomplishing an intention, the specifications of a part recognizing function for extracting the feature of environment data for the object (for example, there is a curve on the road) are determined.

Finally, a strategy and a tactic are defined. The strategy is a generic term for an operation for accomplishing an intention. As the strategy, constraints of an environment and physical operations, an operation for accomplishing a goal, priority constraints, or the like are defined. The tactic is the realization of the generality of an operation as a strategy. When a command of a user's operation is received due to data drive, the generality operation is converted into concreteness (realization).

Next, the hierarchical structure of an object according to the embodiment will be described. In the embodiment, the hierarchical structure of objects is composed of four models that are a data model, an object model, a role model, and a process model. Corresponding to the hierarchical structure, a service is planed by an expert. Of course, such a service is performed by a request of for example a user. However, it is assumed that the user does not know the attributes of the service.

The attribute structure of a data model as the lowest hierarchical level of the hierarchical structure is planed as a template as shown in FIG. 12. The data model is input to the kernel of the WELL system. The input format of the data model is a data list format. In the executing process of the kernel, it designates a process request corresponding to an event driving function to a work area for executing the service. In addition, the kernel designates a cell position of which data should be defined in the template corresponding to a data driving function.

The object model is categorized as a format model, a feature model, and an object network model. The format model is a model of which a pattern of a noun object or a verb object is represented formally. The object model is for example "point" shown in FIG. 4.

As a noun model, a generic noun of which a common noun, a proper noun, and a generic noun are aggregated and abstracted can be used. Normally, in an object network, a common noun is used as a name. An expert represents a list structure of the template of the data model and stores the list structure to the WELL kernel. In the stage, a common noun has the attribute of the indefinite pronoun "a". When the user designates a common noun as an event driving function, the data definition preparing operation is executed. When the system performs a data driving function (for example, when the user performs a data defining operation), the data is converted into a proper noun having the attribute of the definite pronoun "the".

A verb object as a format model has a format paired with a noun object. For example, the relation between a subject and a predicate is obtained. The verb service execution preparing operation and the service executing operation are performed in the executing process of the object network.

FIG. 28 is a schematic diagram for explaining a user's process for an object network. In FIG. 28, a concerned party as for example a user designates the name of an object network 202 as an event driving function 201. Thereafter, the concerned party designates the name of a noun object 204 of the object network 202 as an event driving function 203.

The system checks for data consistency of the designated noun object 204. When there is undefined data, the system requests the concerned party to define data as a data driving function 205.

When the concerned party (for example, a user) defines undefined data, and designates the name of a verb object 207 as an event driving function 206, a start command for the object as a point is supplied to the system. The system checks for the operation consistency corresponding to the command and performs a service driving operation 208 for executing a service of a reference model (that will be described later) against the concerned party that executes the service as an event driving function. Thus, the concerned party performs the executing operation for the service.

Thereafter, the concerned party (as for example a user) designates the name of a noun object as the next destination as an event driving function 209 and performs the process of the next stage.

The feature model of the object model is a model that represents a feature corresponding to the attribute value of a noun object such as "color point" that composes for example a drawing object network and that contains a constraint condition corresponding to an environment.

When the WELL kernel requests another server (for example, a specific role server) to execute a service corresponding to the position defining the content of a consistency constraint entity of the template structure of the object as a event driving function, the server requests the WELL kernel for data defining a feature model as a data driving function. This process is equivalent to a communication among a plurality of servers. This process is one duty of the WELL kernel.

Next, the object network is stored in a graph structure of which the name of a noun object as a template of a data model is treated as a node and the name of a verb object is treated as a branch to a work area managed by the WELL kernel and displayed on the common platform. Thus, an expert should represent a noun object and a verb object as a format model or a feature model in the format of the specifications and prepare them in a graph structure. Thus, the expert requires a graph structure editor for describing those objects in a graph structure and displaying them on the common platform as a tool.

When an object is an abstractive name, an object network for realizing the abstractive characteristic and a data set to be supplied thereto are required. To do that, a mechanism corresponding to a process model that will be described later is required. The object network model has a header that represents the name of the network. With the name, the object network model can be referenced. With a function for indexing a noun object and a verb object as structural elements, the object network model can be referenced.

A third model that composes the hierarchical structure of an object is a role model. The role model corresponds to a role function described in FIGS. 20 to 22. The role model is a model with which the concerned party represents the content to be executed in the environment as a set of a plurality of object networks.

Thus, a role model has the name as a role. With the name, the role model can be referenced. In addition, a role model can contain a consistency constraint entity name. By indexing the entity names, a role model can be referenced. Roles themselves have a hierarchical structure. Thus, roles can be successively referenced.

The concept of a role represents the content of a fact that each concerned party should execute. Thus, a role associates with the environment of a concerned party. As a result, corresponding to a change of the environment, the content of the execution process changes. In other words, the structure of the object network should be adaptively changed corresponding to the environment.

To do that, a consistency constraint entity is used. The content of the consistency constraint entity is described as the content of a cell of a template defined as a data model corresponding to a noun object and a verb object of an object network. As shown in FIG. 28, the content is defined as an attribute entity for a data definition preparing operation of a noun object and an attribute entity for a verb service execution preparing operation of a verb object in the object network. In the driving methods corresponding to the operation names, the content is processed by a concerned party (for example, a user).

Figure 29:
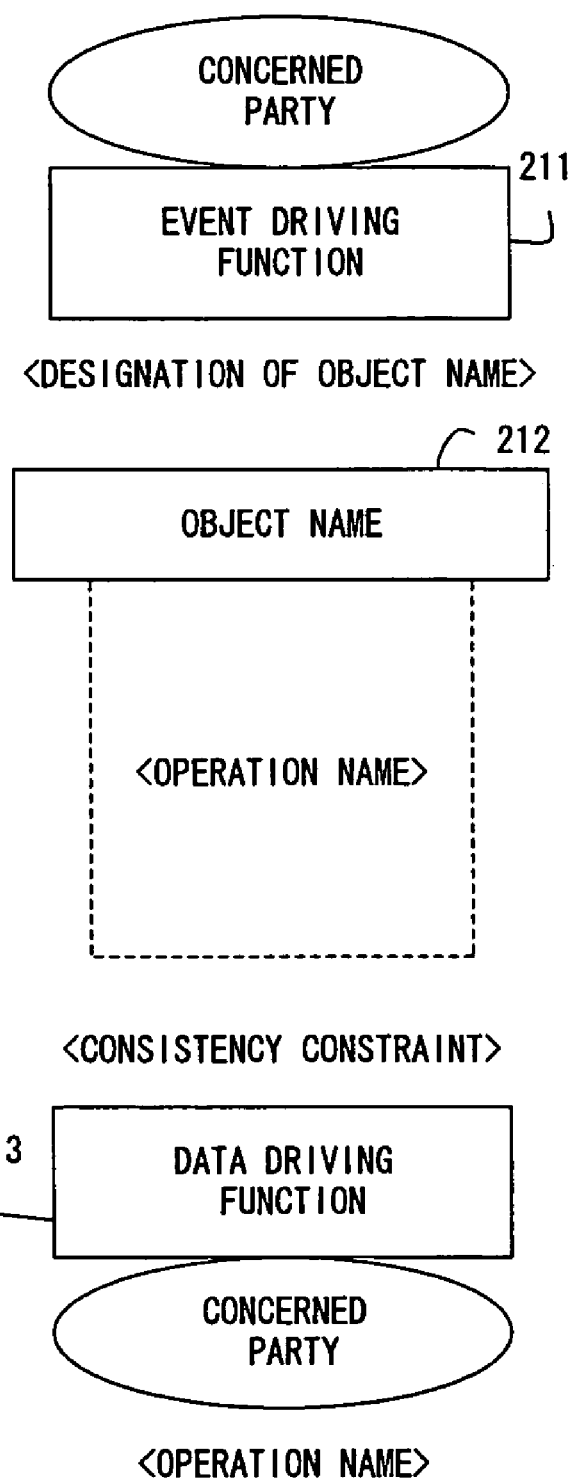
FIG. 29 is a schematic diagram for explaining the relation between a concerned party and a driving system corresponding to a consistency constraint.

FIG. 29 is a schematic diagram for explaining the relation between a concerned party and a driving system corresponding to such a consistency constraint. In FIG. 29, the concerned party designates the name of for example a noun object as an object name and requests the WELL system to execute the designated noun object as an event driving function 211. The WELL kernel performs the operation relating the operation name to the subject described in the template corresponding to an object of a designated object name 212. Thus, the kernel verifies the consistency constraint condition. Corresponding to the verified result, the WELL system requests the concerned party to perform the operation of the operation name as a data driving function 213 through the common platform.

A consistency constraint entity that is defined by an expert and that is contained in an object is associated with a consistency constraint entity of another object as a processed result of an assisting role function that performs a service of a recognizing operation about a constraint feature entity of environment data by a service of a communication function shown in FIG. 22. The consistency constraint entity is used for an cooperative operation with an object network that executes the process.

Figure 31:
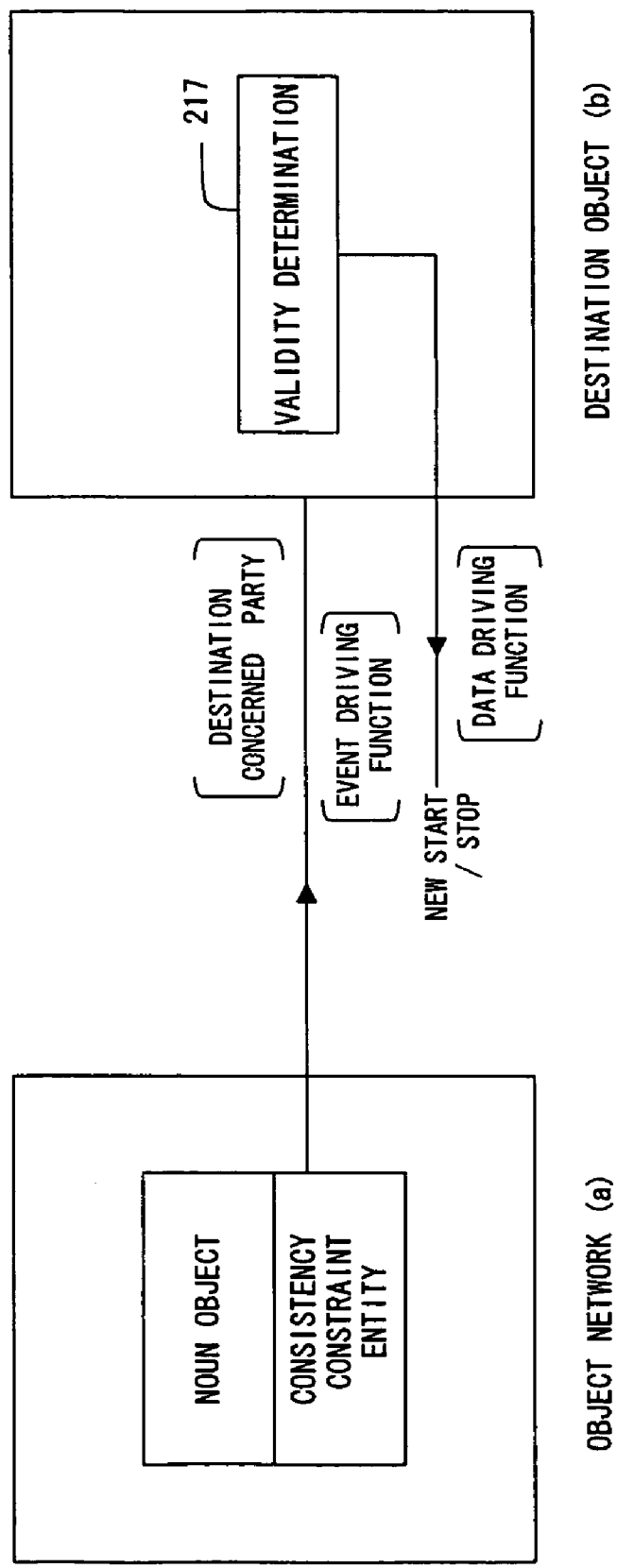
FIG. 31 is a schematic diagram for explaining a validity determining operation of an consistency constraint entity.

FIGS. 30 to 32 are schematic diagrams for explaining related operations of individual object networks of such a role function. In FIG. 30, an object network (a) issues a request to an object network (b) for performing a data definition preparing operation for defining undefined data in a template as a data driving function. In the case, the object network (b) defines an assisting role function as a concerned party (as a connection service provider) that provides a service of the content of data necessary for a consistency constraint entity 216 added to a noun object 215 of the object network (a) that is currently processed. Corresponding to the request, the object network (b) executes the data defining operation. This operation is equivalent to the case that another concerned party is requested for data as a data driving function.

FIG. 31 is a schematic diagram for explaining a validity evaluating operation of a consistency constraint entity. When the content of data of the consistency constraint entity defined in FIG. 30 contains information necessary for transferring the control to a destination object as another object network (b) in a role function, the validity should have been determined on the destination object (b) side.

Thus, the object network (a) requests a concerned party (namely, the destination object network (b)) to determine the validity as an event driving function. The destination object network (b) side executes a validity determination 217 with a destination object network (described later), the name of a destination noun object, and the content of the validity predicate. As the determined result, when new data should be defined as an intention of the destination concerned party, the start/stop of the new operation is requested as a data driving function for obtaining necessary data. Thus, corresponding to a change of the environment condition, the role function can be dynamically changed.

FIG. 32 is a schematic diagram for explaining time related controlling operations of a plurality of object networks of a role function. As a role function, time related controlling operations such as a synchronizing process, a parallel process, a continuous process, a stop process, and a resume process may be required among a plurality of object networks. Thus, corresponding to the content of a consistency constraint entity 219 defined in a verb object 218, a time related control request for a destination concerned party is issued to another object network (b) that requires for example a synchronous process. As a result, the object network (b) side controls the time related controlling operation.

A fourth model of the hierarchical structure of an object is a process model. The process model is a model of which a plurality of roles are cooperatively executed as one process so as to integrally execute each role. The dynamic process is accomplished by two driving functions that are an event driving function and a data driving function.

To accomplish a service represented by a process model, various roles are cooperatively processed between a client and a server or using a communication between roles. Tools for accomplishing such a communication are an event driving function and a data driving function.

A process model starts or stops a process corresponding to a dynamic change of a system environment. In a process model, a process name is defined to each process. Processes are hierarchically structured so that child processes can be successively referenced.

Next, the definitions of the specifications of a data model, an object model, a role model, and a process model having the above-described hierarchical structure will be described. The definitions of the specifications of a data model, an object model, and a role model are statically declared.

Figure 33:
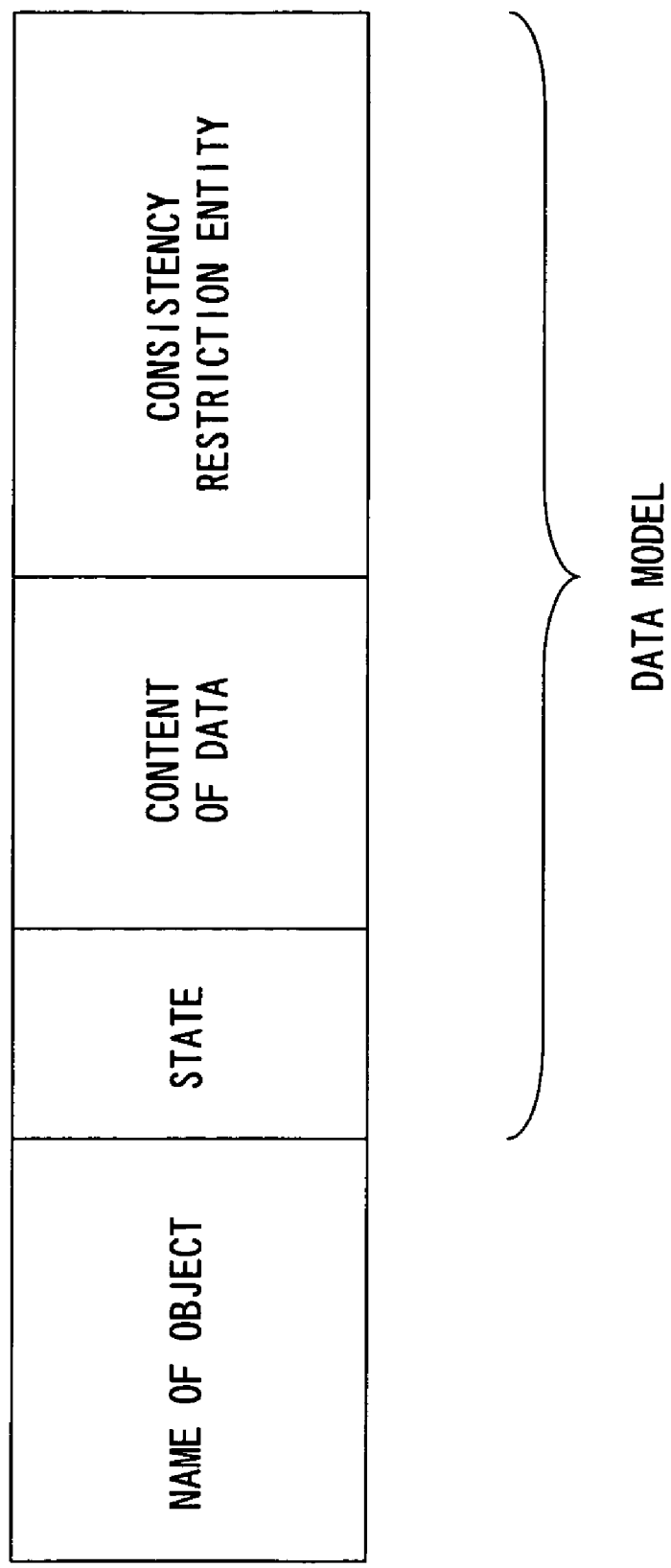
FIG. 33 is a schematic diagram for explaining the contents of cells of a template of an object.

As was described above, an object network is defined with a graph structure composed of a noun object as a node and a verb object as a branch. FIG. 33 is a schematic diagram for explaining a template of an object. The template has four cells that define a name of an object, a state, content of data, and a consistency constraint entity. In regard to a generic object, a link in the hierarchical structure is formed through a name of an object as specific parameter, and is used as the "content of data".

A noun object contains specific primitive data (such as a numeric value and a symbol) and an abstractive name (such as a name of an object as a specific parameter).

The most specific "content of data" of a verb object is a function name. The function name should be referenced as an executable algorithm.

As with a noun object, with respect to a function, there is a converting process for converting an abstractive function into a specific function so as to treat the structure of the function as data. Generally, with an intervention of an agent control server, the specific role server implements a function so that it can be converted. Alternatively, a function is converted so that it can be executed as an event driving function.

When a process is planed, the execution thereof is performed by a plurality of role functions corresponding to a consistency constraint entity defined in a verb object. As was described with reference to FIG. 32, at that point, a controlling operation corresponding to a time related constraint such as a continuous process, a synchronous process, a stop process, a resume process, or the like is executed.

Figure 34:
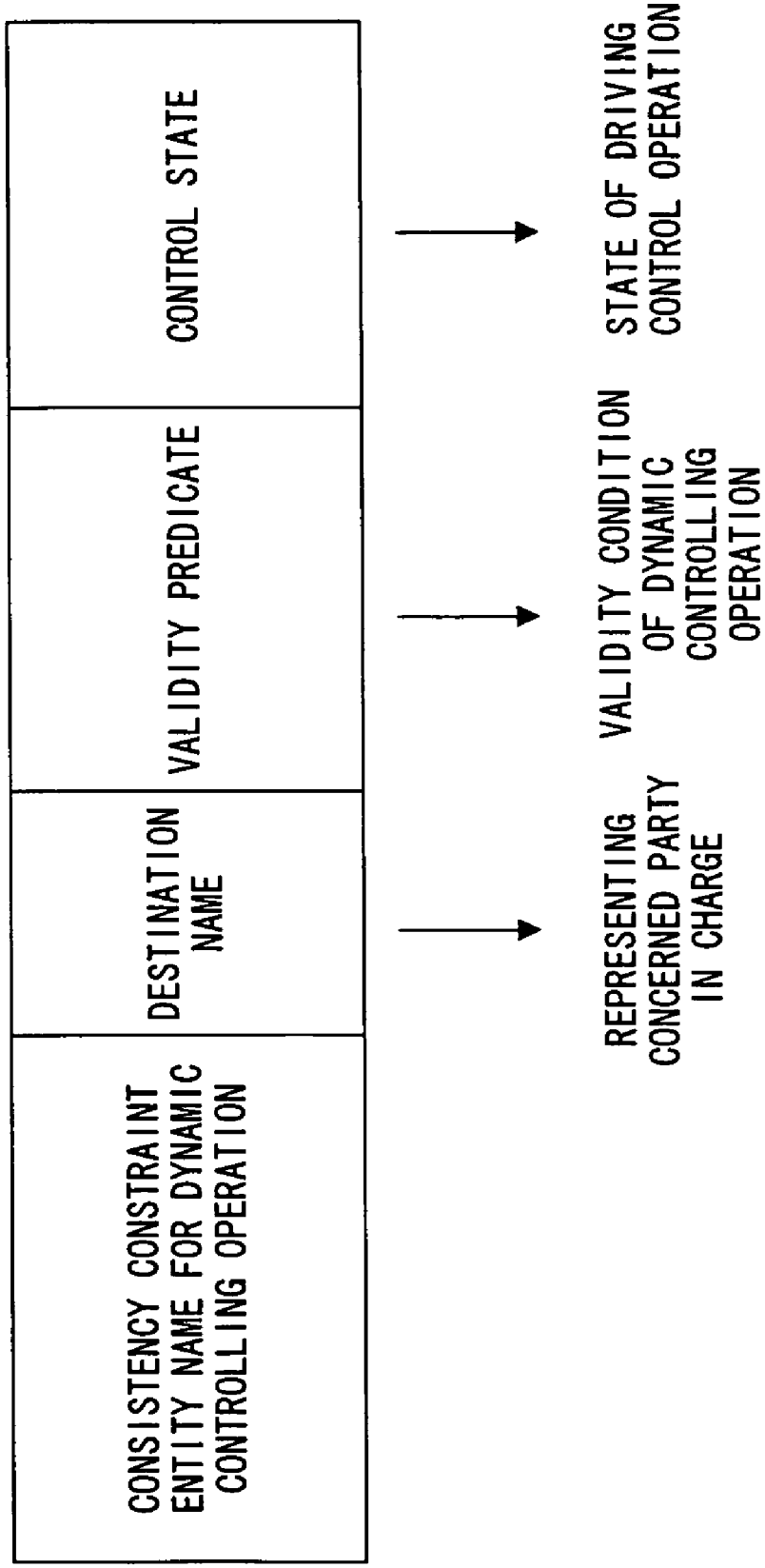
FIG. 34 is a schematic diagram showing the content of a template for dynamically controlling a verb object.

FIG. 34 shows the content of a template for dynamically controlling a verb object. The template contains cells defining the consistency constraint entity shown in FIG. 33. In FIG. 34, a destination name represents a concerned party. A validity predicate pairs with a noun object as a subject word and represents a validity condition of a synchronous control of a verb object that is dynamically selected. A control state controls an execution probability of a service of a concerned party against a process request thereto corresponding to the current state thereof.

As was described above, the hierarchical structure of an object is composed of four models that are a data model, an object model, a role model, and a process model. The specifications of functions of a data model, an object model, and a role model are statically defined. A dynamic function is described with a process model that is mainly a verb object.

In the above-described format, a dynamic change of an object is designated by a user's operation. In other words, the basic flow of the process is designated in such a manner that the operation of a system as an event driving function and a data driving function is represented by an intention of a user or a concerned party. From this point of view, according to the embodiment, a reference model corresponding to an operation of an object network is defined. As a result, the reference model closely relates to a designing method of a conventional system architecture.

As was described above, in a user's process of an object network, when the user requests a particular execution process service, an event driving function is performed. On the other hand, when a particular process is performed, if a parameter of a template is undefined or there is inconsistency, the system requests a user or a relevant concerned party for a data value. Such a function is referred to as data driving function.

Data requested for the data driving function is substituted into the position of for example an undefined cell. Such an operation is executed as a data defining operation. As a function paired with A a data driving function for a noun object, the similar function is provided in a verb object. A service executing operation (namely, a function process) is requested for a concerned party that executes the service.

With an event driving function and a data driving function, a reference driving function as a process of a reference model is defined. The reference driving function requests the system for a service executed by for example a reference model as an event driving function. Generally, an object network name, a role function name, a process name, and so forth are structured as a generic or specific object network. In other words, a reference model defines a basic driving method for any structure.

FIG. 35 is a schematic diagram for explaining a service using a reference model. A reference driving function designates the name of a structure. A model for accomplishing a basic operation that converts general data to specific data as a basic service shown in FIG. 35 is a reference model.

A first basic service entity is a concerned party request service of which an execution request for a function of an object having a name designated by a concerned party is performed to the system. The first basic service entity is equivalent to an event driving function.

A second basic service entity is a system request service. When the content of a template is undefined, in this service, the system requests a relevant concerned party to define the content of a cell of undefined data. This service is equivalent to a data driving function.

A third basic service entity is a control process service. This service is a function relating to a process model of which the drive, stop, synchronization, or the like of itself or another object network is controlled corresponding to the execution of a process for the object network.

A fourth basic service entity is a consistence process service. In this service, it is determined whether or not data given in the current object environment satisfies the characteristic of an object defined as a consistency feature in a consistency constraint entity, and corresponding to the determined result, a valid controlling process is selected, and joined with a process control so that links with a controlling process that has sequential relations of inputs and outputs as an operation sequence for the process are satisfied.

A fifth basic service entity is a searching service of searching an object having a name designed by for example a concerned party.

A sixth basic service entity is a data-intensive service of which selective feature amounts of role functions of a plurality of concerned parties are put together as a database.

A seventh basic service entity is a communication service. This service is a service for the content of a communication template of a communication as a broadcast or an individually addressed communication, shown in FIG. 21, FIG. 22.

An eighth basic service entity is a parameter determination evaluating service as a simulation service that is an adapting service (that will be described later).

For such services, specific processes as sequences are described.

A reference model is independent from and orthogonal to the hierarchical structure of an object composed of a data model, an object model, a role model, and a process model. The reference model accomplishes a service shown in FIG. 35 for a system containing data and a common execution process model in association with an event driving function and a data driving function.

Figure 36:
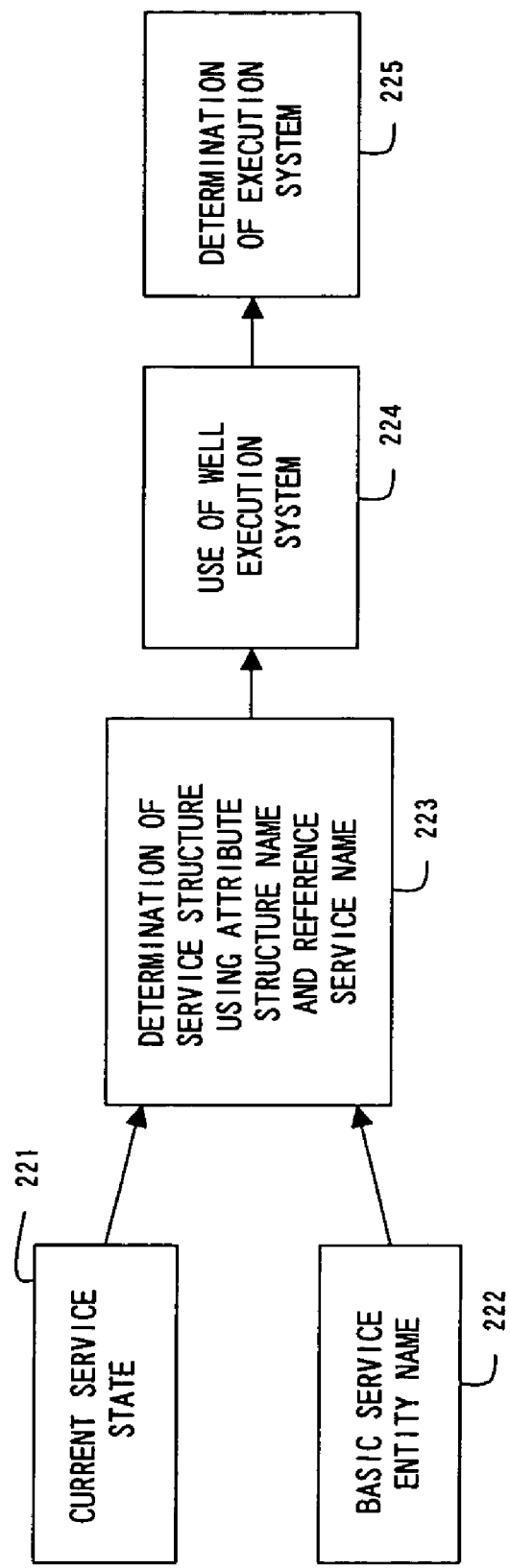
FIG. 36 is a schematic diagram for explaining a method for accomplishing a reference model in the WELL system.

FIG. 36 is a schematic diagram for explaining a method for accomplishing a reference model in the WELL system. In FIG. 36, corresponding to a current service state 211 and a basic service entity name 222 of a reference model, an attribute structure and a reference service name are obtained. Corresponding to the attribute structure and the reference service name, a service structure is determined (223). Using an execution processing system of the WELL system (224), an executing system is determined (225). As a result, a reference model is accomplished. Thus, the existing WELL system can be effectively used and structured as software.

To accomplish the basic service entities described with reference to FIG. 35 as a reference driving function, an expert plans a specific processing system as an application and accomplishes the structure of a generic/specific object network. As a result, a user can effectively use the structure.

To actually use the basic service entities, it is necessary to provide a template having an attribute structure of a service entity name, a service name list, a template structure (corresponding to the content of the service), control parameters (representing start, stop, and synchronization as consistency constraint entities), a selective feature name (a link to a recognition role of environment data), and a consistency constraint entity name (data as a process).

Next, an adaptation of a role model and a process model to an operational environment will be described. As was described above, a role model represents that individual operations defined as role functions corresponding to the environment are represented as a object network. Corresponding to a change of the environment including data of an operation state of another concerned party, the operations should be changed. In other words, corresponding to a change of the environment, individual operation parameter should be changed or the operations should be changed so as to adapt the operations of the role functions to the change of the environment.

As was described above, the operation state of the role model is statically defined. The role model is adapted corresponding to the form constraints. When a picture of which two substances collide is generated, the form constraints are for example the relative speed of two substances, the collision angle thereof, the sizes thereof, and the hardness thereof.

To dynamically adapt the operations, a process model and a time related constraint are used. There are two methods for dynamically adapting the process model. As a first method, operation parameters of a template are successively varied as control parameters of verb objects. As a second method, using time related consistency constraint entities, an object network is switched so as to change the operating method.

Thus, as dynamically adapting methods, there are a successively varying method and a switching method. In the planning stage, it is necessary to sufficiently check for the relation between the operations and the environment and simulate the operations. Thus, as basic service entities, a reference model has parameter evaluation entities of a simulation service described with reference to FIG. 35. When the system is designed, it is important to execute a reference driving function using the model.

FIG. 37 is a schematic diagram for explaining an adapting service. To perform a static adaptation, tactic/strategy parameters for accomplishing for example an intention may be changed. To perform a dynamic adaptation, a tactic/strategy network structure, the duty of a concerned party, the formation of a team of a concerned party, and an intention may be changed.

When corporative intentions and different intentions of a plurality of concerned parties are accomplished, it is very important to evaluate the results of role functions and the strategies and tactics of processes of the concerned parties from the view point of the general environment including the related concerned parties. Thus, the model is divided into a role function (as static specifications) and a dynamic process function.

In particular, when different intentions of concerned parties are complicated, to accomplish the intentions, it may be necessary to change the tactics, strategies that are higher than the tactics, and the resultant tactics. Thus, with a static adaptation of which parameters are changed and a dynamic adaptation of which the strategies are fully reviewed, the network structure should be drastically changed.

As a drastically changing method, concerned parties may be changed. In other words, in addition to the role functions may be reviewed, the intention system as a team of the concerned party group may be changed. Thus, as an adapting service shown in FIG. 37, a communication service and a simulation service are important.

In FIG. 37, a system request service contained in a structure service shown in FIG. 35 is separated as a service corresponding to a static adaptation from a structure service corresponding to a dynamic adaptation. In the system request service, the static adaptation portion describes a partial change of the object network as a static change of the structure.

To dynamically change the structure, a consistency process service for causing the change of the strategy/tactic of the object network to be consistency with the intension and purpose is performed. The structure service is a service for changing the structure of concerned parties such as a change of the formation of a team.

Next, the exporting of software of the extensible WELL system will be described. From a view point of a software development, it is preferred to standardize the exporting of a software system corresponding to various OS environments. Although the WELL system was initially accomplished on the Unix, the WELL system has been tried to be exported to Windows NT and Windows 98 (both are registered trademarks of Microsoft Corporation). It is known that by converting functions, window system, bit-map format, and so forth on the Unix, the WELL system may be exported to such OS environments.

In such a case, the exporting operation is based on individual OSs. In the WELL system, with information of the common platform as a particular interface, an interface is structured between a client and a server. With data on the common platform, the client and the server can know the content to be executed. In addition, based on the common platform, a function to be executed, a window management, a server system management, and an executing process are accomplished with services shown in FIG. 35 as a reference driving function corresponding to the reference model.

When the software is exported to another OS environment corresponding to the concept and structure of the extensible WELL system, the concept of the reference model is important from the view point for accomplishing the hierarchical structure of an object (composed of a data model, an object model, a role model, and a process model) and the basic service entities.

As was described above with reference to FIG. 7, in the extensible WELL system, as an interface with a client, the common platform 52 has the operation window 61*a*, the command window 61*b*, and the message window 61*c* for operations of the client. In addition, the common platform 52 has the data window 62 for displaying the content of a data object as a process result and for operations of the client as a process object. As a result, a multi-window system is structured.

In addition to service entities for the reference model, a service for a common platform is performed in the system. The service is hidden from the user. To do that, the controlling system 55 shown in FIG. 7 has the window manager 64, the display manager 65, and the function executing manager 66.

FIG. 38 shows the relation between those managers and the communication manager. The communication manager is present in an upper hierarchical level of a function (execution) manager, a window manager, and a display manager. The communication manager transmits data information to other managers. The communication manager and the function manager are implemented as functions of the C language in the extensible WELL system. As the window manager, a commercially available program designated for the X window is used. The window manager causes the data format to be consistent through the communication manager and controls the display manager using the bit map format.

As was described above, the WELL system allows the client to visually perform operations on the common platform. Application software in any field is represented as an object network. Up to an intension can be described in the extensible WELL language. The structure of the object network is represented on the common platform. An executing process is performed by a user as a concerned party.

Figure 39:
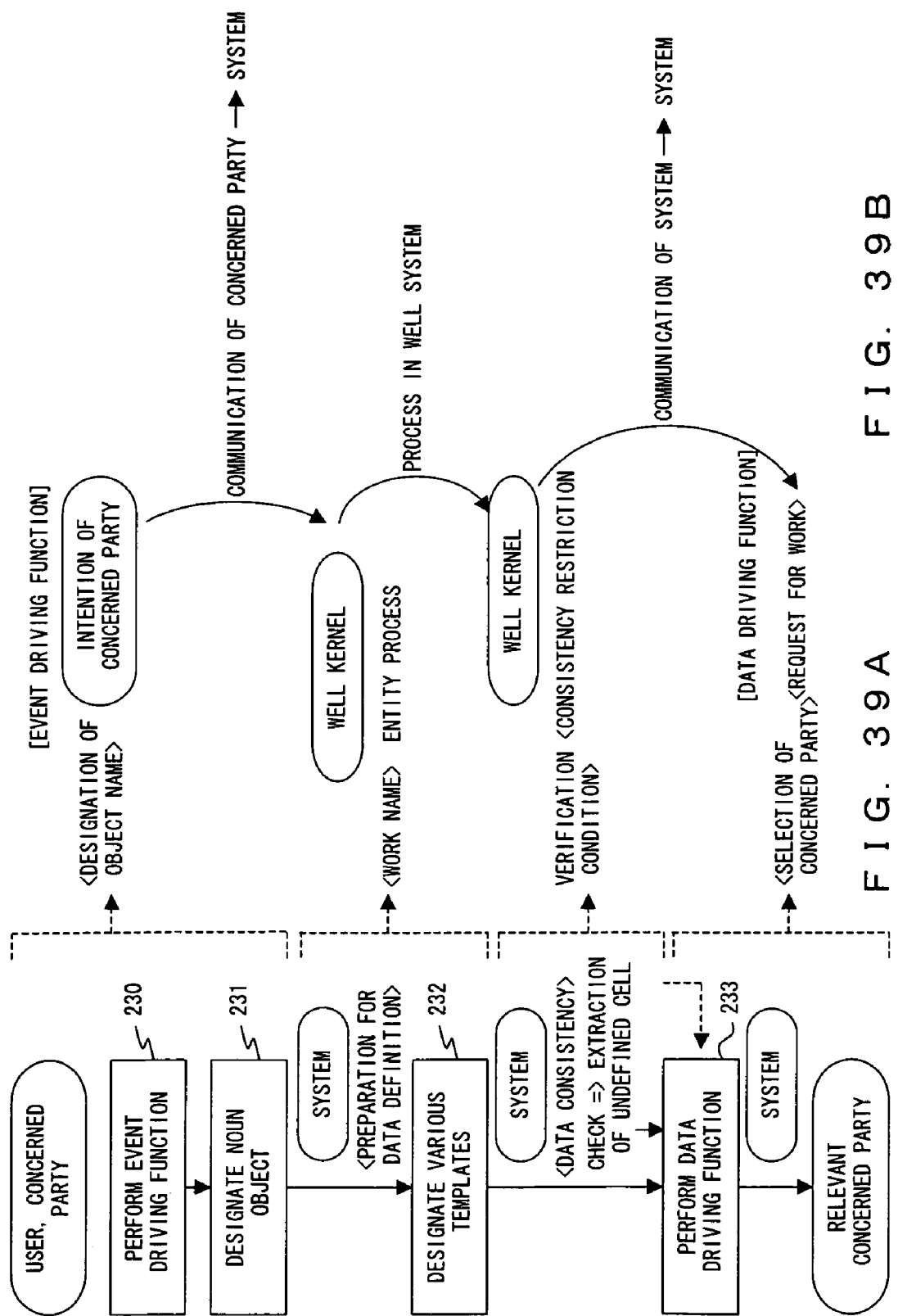
FIGS. 39A and 39B are schematic diagrams for explaining an interacting process with a user and a system control.

FIG. 39A is a flow chart showing an interacting process with a user in the WELL system. FIG. 39B is a schematic diagram for explaining a system controlling operation in the interacting process. In FIG. 39A, when a user designates a noun object 231 as an event driving function 230, the system side designates various templates 232 necessary for preparing data. The program for the templates are written in for example the C language. The templates each have cells for entities and attributes. The system checks for the consistency of the data. When there is an undefined cell, the system requests the relevant concerned party to define the undefined data as a data driving function 233.

An event driving function and a data driving function execute basic assisting roles between the concerned party and the system. Those functions are accomplished by the WELL kernel. As an interactive function between the concerned party and the system, operations as a request and response are performed by the OS.

Figure 40:
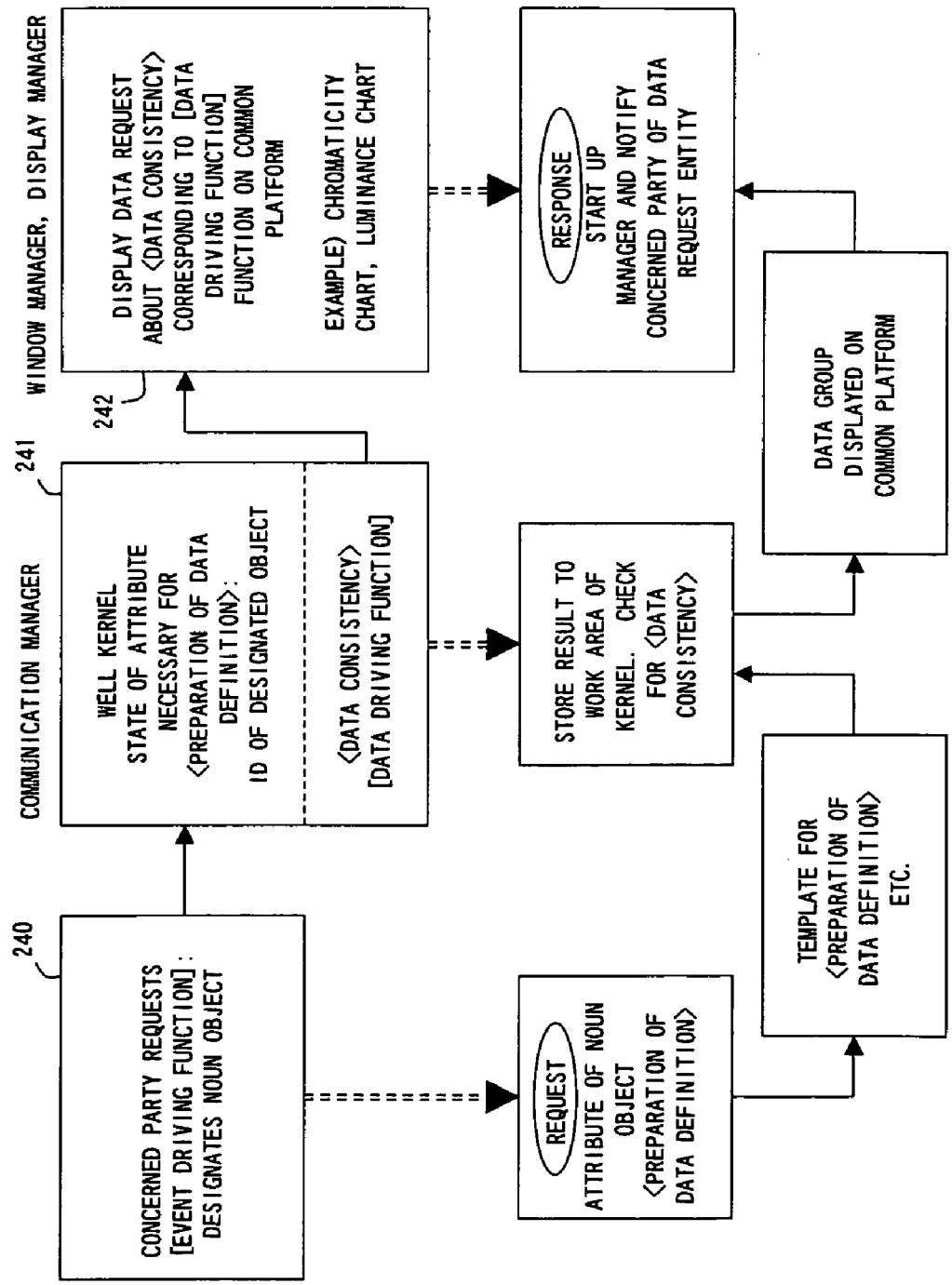
FIG. 40 is a schematic diagram for explaining a method for accomplishing an event driving function and data driving function using a request and a respond.

FIG. 40 is a schematic diagram for explaining an event driving function and a data driving function using a request and a response. In FIG. 40, when a concerned party (for example, a user) designates 240 a noun object on the common platform, the communication manager executes an event driving service. The event driving function is a request for a work request for the WELL kernel. Corresponding to the request, the function manager executes the work.

To perform the work, various templates necessary for data definitions are prepared. The WELL kernel checks for the consistency of the data. When undefined data is detected, the communication manager 241 transmits a message requesting a data defining operation to the concerned party as a data driving service. The window manager and the display manager 242 cause the data request to be displayed on the common platform.

The processes for the event driving function and the data driving function can be accomplished by more primitive request and response as shown in the lower portion of FIG. 40.

As was described above, the extensible WELL language is a field descriptive language. In the extensible WELL language, various processes such as a multimedia contents creating process as a simple process and an intention accomplishing process as an advanced process can be executed using an object network. Thus, when software is exported to another OS environment, a target area of a desired process is described in the extensible WELL language so that it can be executed by a computer system using any OS.

Thus, a software exporting operation for accomplishing assisting roles by the communication manager such as an event driving function and a data driving function on the WELL system with basic operations such as a request and a response is required. It is preferred to accomplish an interacting function between a client and a system on a common platform.

As was described above, in the Unix, the window manager and the display manager are normally X windows. In the Windows NT and Windows 98, the window manager and the display manager can be satisfactorily accomplished by those contained in the systems. When a communication manager (namely, a program equivalent to an event driving function or a data driving function) and a program of a function manager is described in for example the C language, C++ language, or the JAVA language, the communication manager can be directly used.

Figure 41:
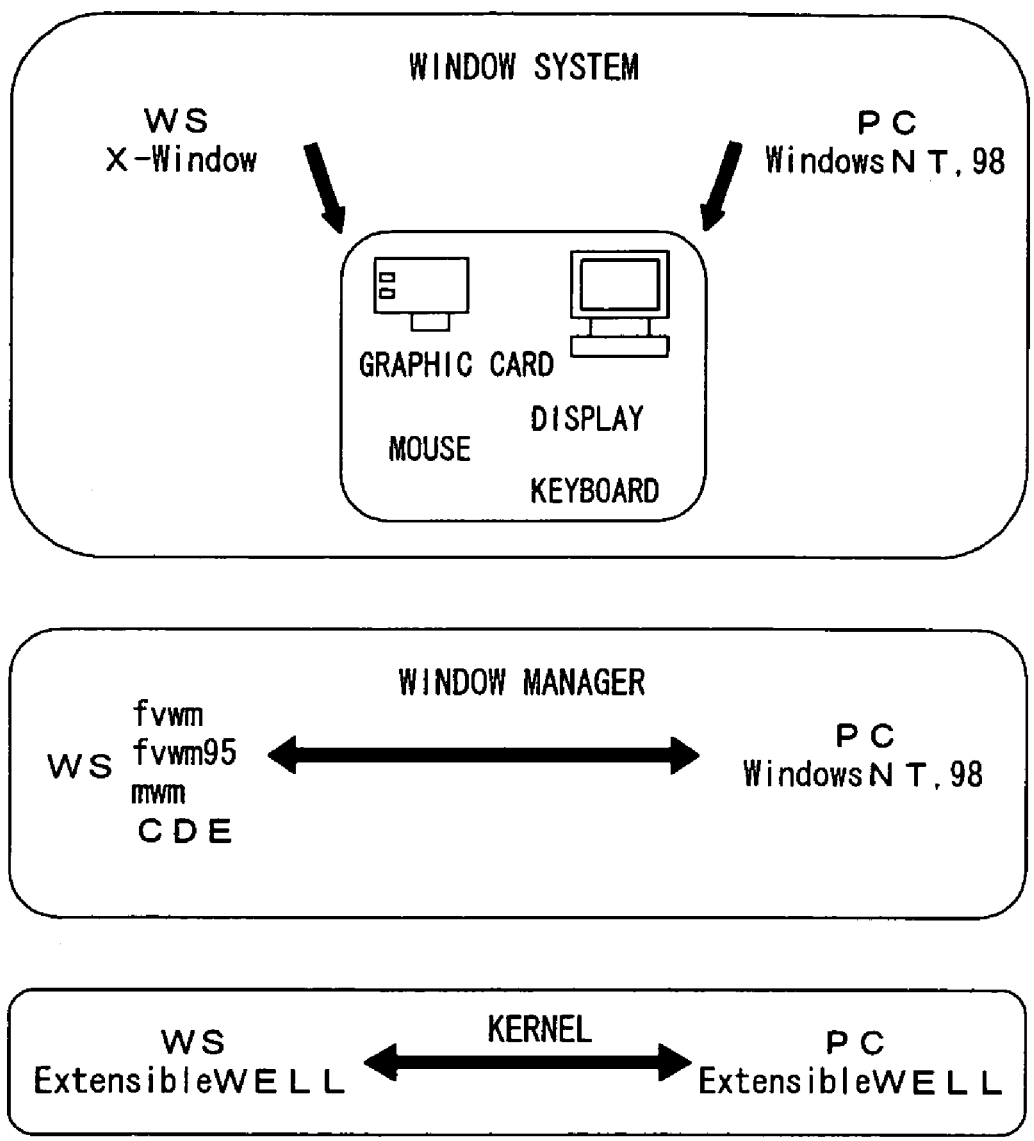
FIG. 41 is a schematic diagram for explaining a software portion that should be modified depending on hardware.

In other words, when software is exported to a different OS environment, by correcting only a portion describing the hardware, the software can be exported. FIG. 41 is a schematic diagram for explaining a portion that depends on hardware. In the extensible WELL system, portions that have problems dealing with video information and audio information in, include the kernel, for example a multimedia contents creating process, portions that depend on the OS (environment of the window manager and the display manager) and hardware(hardware for picture display, audio replay), therefore those portions are corrected and the software can be easily exported.

Next, the exporting process of the WELL system will be further described with reference to FIGS. 42 and 43. As was described above, a user's process for an object network is described as shown in FIG. 28. First of all, an object is called as an event driving function. Corresponding to a process for a specific object network, a work name is designated by the display manager.

Figure 42:
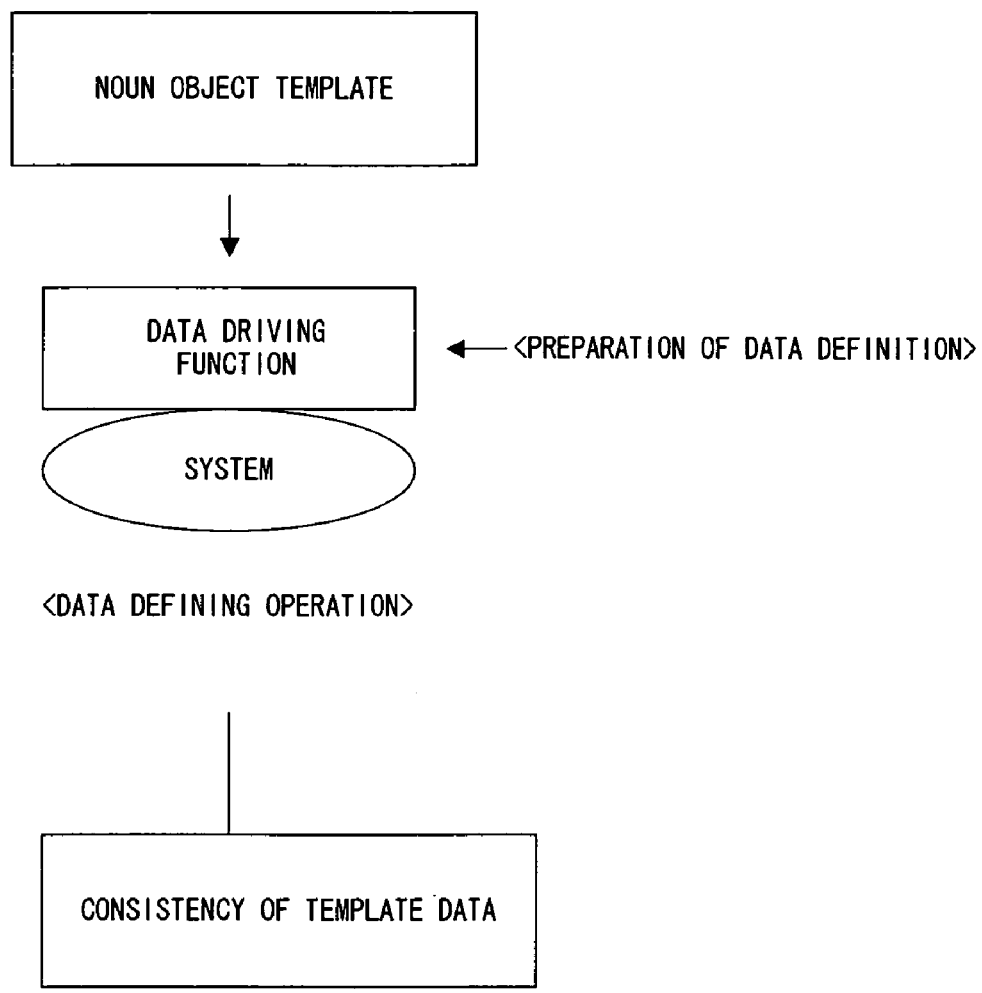
FIG. 42 is a schematic diagram showing a method for accomplishing an object network that performs a user's process in a WELL kernel.

FIG. 42 is a schematic diagram for explaining the representation of the WELL kernel with an object network. The representation corresponds to a user's process for a noun object. Templates for a data definition preparation and data consistency of the noun object are displayed on the multi-window. A concerned party is designated on the multi-window. A data defining operation is performed as a data driving function.

In other words, FIG. 42 shows a method for accomplishing an object network that performs a user's process for a noun object shown in FIG. 28 with the kernel of the WELL system. In this example, data of the work name of the noun object shown in FIG. 28 is substituted into a data template of the WELL kernel. The flow of the user's process shown in FIG. 28 is planed by an expert and described as a graph structure.

FIG. 42 shows a method for generically describing an object to be exported and a network thereof. Regarding a specific object network as an application, when parameters required for concrete a generic object network are given, a process flow as a application desired by a user is provided. In FIG. 42, a window manager, a display manager, and a function manager are exported. Using a generic object network on the exported side, a specific object network is accomplished. As a result, the exporting process for the WELL system is completed.

When the WELL system is exported, the structure of the object network of the WELL kernel is represented by a graph structure editor. A communication manager that performs a user's process shown in FIG. 28 is accomplished in a language used on the exported side.

Figure 43:
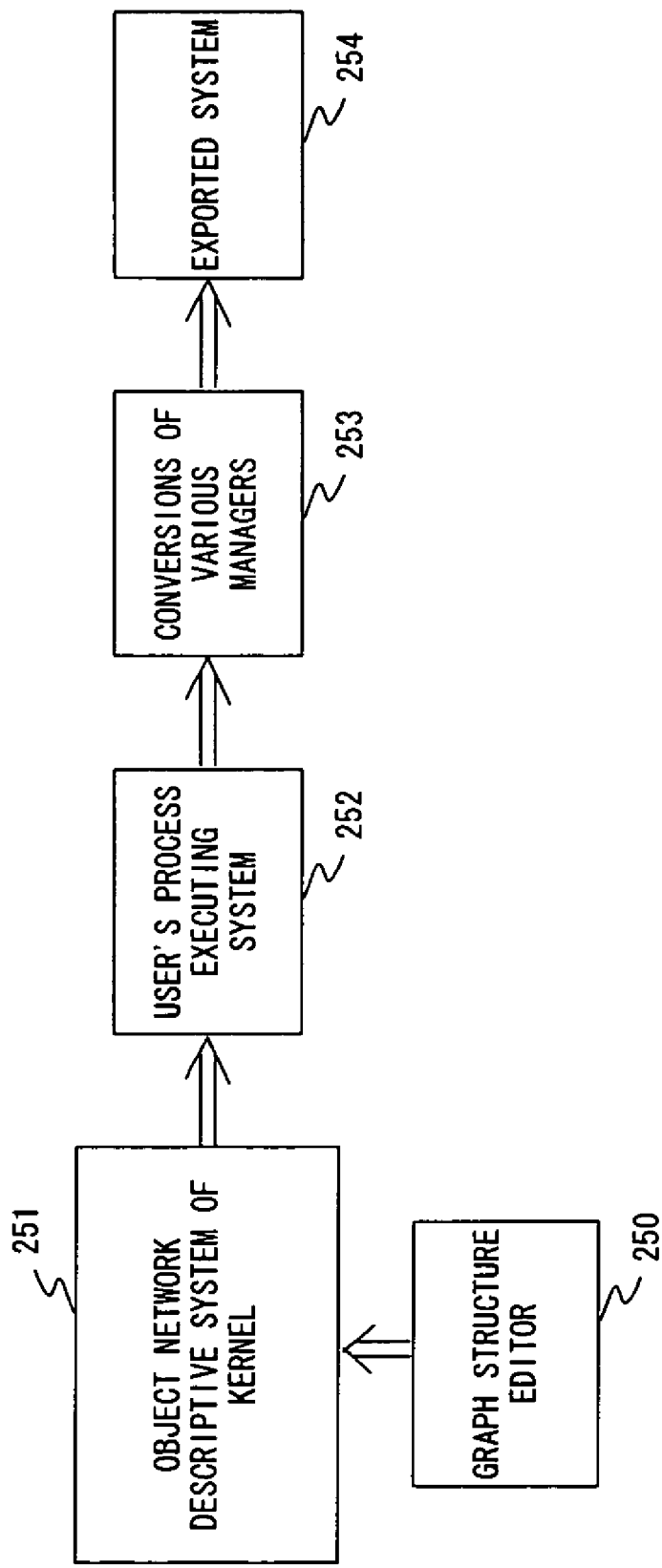
FIG. 43 is a schematic diagram for explaining an exporting work of the WELL system.

In FIG. 43, using a graph structure editor 250, an object network descriptive system 251 of a kernel portion shown in FIG. 42 is created. In addition, a user's process executing system 252 shown in FIG. 28 is created. Conversions of various managers 253 are performed. As a result, an exported system 254 is obtained.

Figure 44:
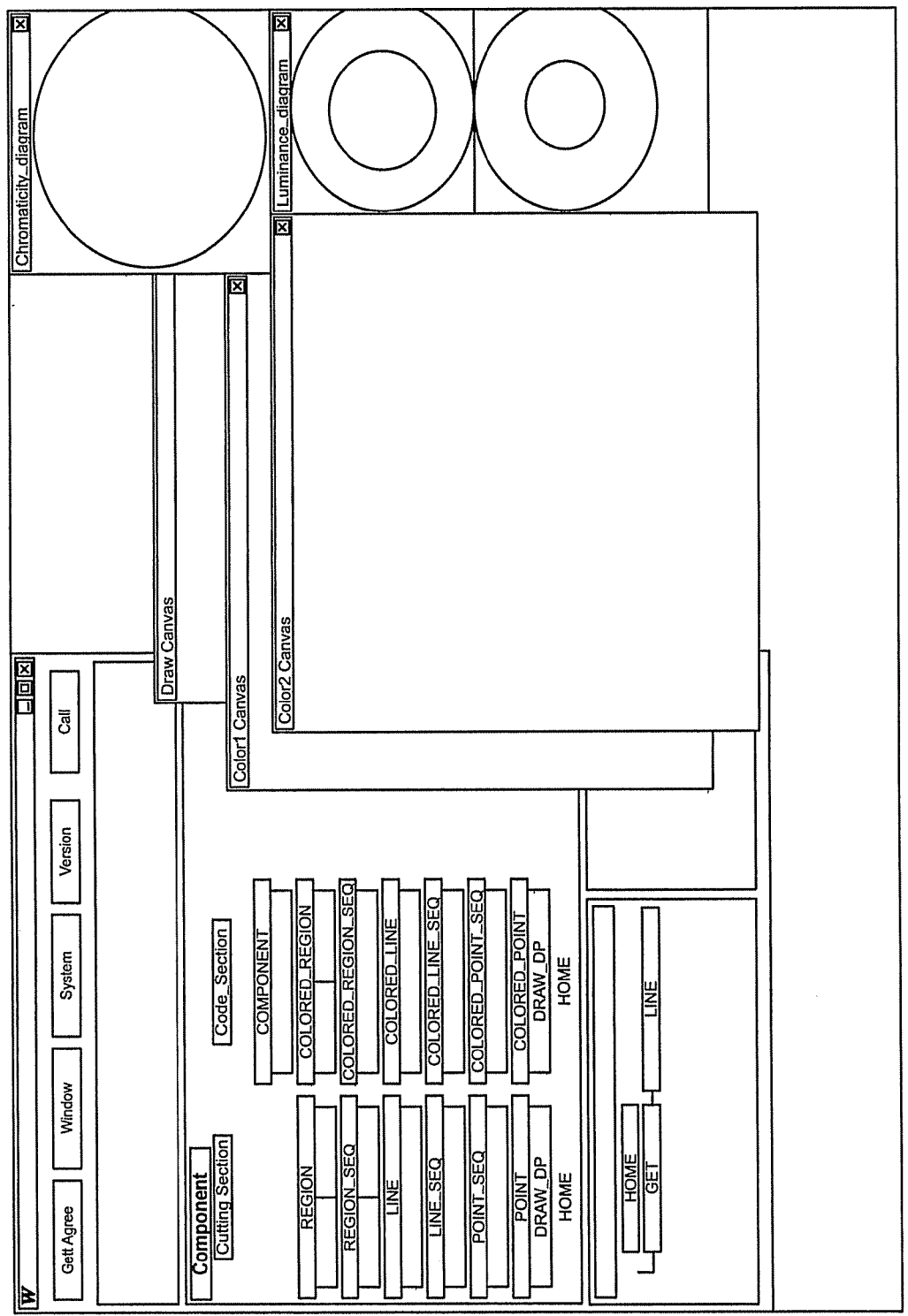
FIG. 44 is a schematic diagram showing an example of a common platform in an Windows NT environment.

FIG. 44 is an example of a common platform on the Windows NT environment accomplished in such a manner.

Next, the relation between an object structure of the WELL system and a system structure such as an LSI and an application of the WELL system to a system design will be described.

Generally, it is important for the user to intuitionally understand the chronological relation between a user's operation sequence against a system and a resultant output sequence. To do that, when the relation is dynamically represented as a keyword sequence, the user can understand an outlined operation of the system. In the WELL system, the state of the template and the consistency constraint entity of the object function as keywords.

Such keywords are represented as a language of an objective world. When picture contents are created, object names as keywords are words such as a point, a point sequence, a line segment, and an area. In addition, words as attributes such as luminance and chromaticity are defined. The continuity of those attribute values are given as consistency conditions. A set of such keywords is important for the user to intuitionally understand an application.

When an expert designs a system structure, the relation of keywords that are objects is defined as an object network with a graph structure editor. A system planed as a graph structure is represented with the WELL system having a graph structure editor. Thus, as a basic tool used by the expert, the WELL system can be used. In addition, the user can execute a application using the WELL system. As a result, it is clear that the WELL system has an important role to build a system structure.

Thus, in the system structure, it is considered that a keyword of the system is equivalent to a noun object of the WELL system. As a data model of the WELL system, templates are defined for individual noun objects and verb objects. A template of a noun object represents a data path structure of a node as a keyword. A template of a verb object defines an operation for a converting process for a data path represented in a template structure of a noun object.

Figure 45:
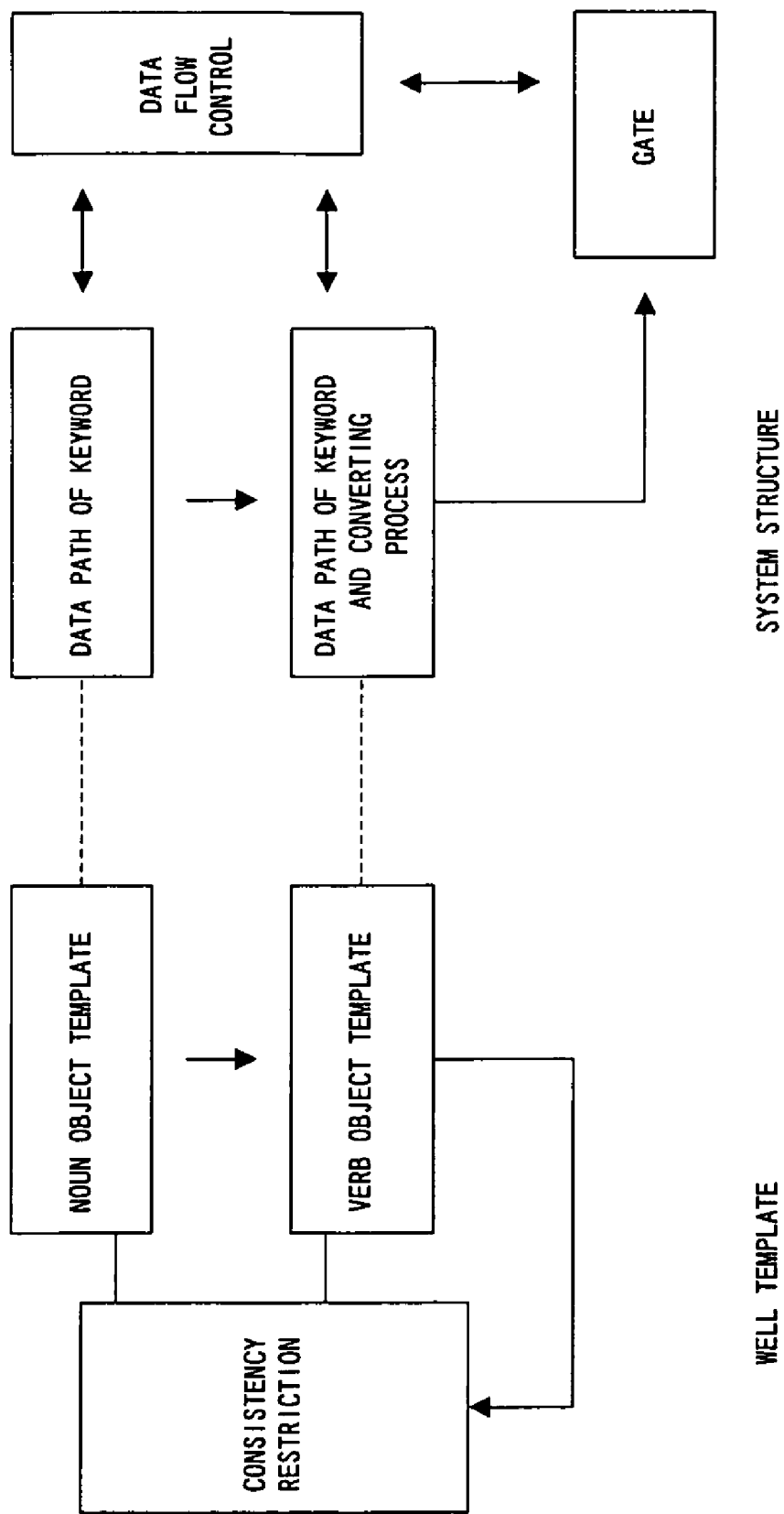
FIG. 45 is a schematic diagram showing the basic relation between a WELL template and a system structure.

FIG. 45 is a schematic diagram for explaining the relation among a noun object template, a verb object template, and a system structure used in the WELL system. In FIG. 45, it is important to correlate consistency constraint entities that describe important functions of a role model and a process model with a dynamically changing function of a data path of the system structure. The data flow is controlled corresponding to a form constraint condition of related data and a system clock. The consistency constraint entity is defined as a control attribute necessary for controlling a noun object and a verb object. A gate that controls a data flow should be disposed corresponding to a consistency constraint entity.

To accomplish the adaptation of the operation shown in FIG. 37 on the system structure side, the system structure has a gate function corresponding to a consistency constraint entity. In such an integral system description, to convert generic parameters into specific parameters, a user interface that allows the user to successively input data should be considered.

As described above, the logical specifications of the system structure of the WELL system are described with keywords. In addition, by a service defined with a reference model, the content of a system structure can be obtained. To accomplish a system structure as an LSI pattern, with objects that are keywords, a graph structure should be mapped on a pattern so as to integrate semiconductors. To do that, a geometric arrangement of functional blocks represented with nodes that are mainly composed of consistency constraint entities is coarsely determined. A very narrow pattern should be designed in such a manner that lines do not intersect.

The LSI designing process using the WELL system will be further described with reference to FIGS. 46 to 48. FIG. 46 is a block diagram showing the structure of a discrete logical element that composes an LSI. In FIG. 46, a discrete logical element is composed of a gate group and a logical operating device. Data paths are disposed between the gate group and the logical operating device. In addition, input paths and output paths are added to the discrete logical element.

FIG. 47 is a block diagram showing the structure of an integrated device. The integrated device is composed of many discrete logical elements. The individual discrete logical elements are connected by data paths such as input paths and output paths.

The function of such a logical element is accomplished as a function of an object network of which role functions as objects are connected in the WELL system. In the WELL system, as shown in FIG. 45, a particular gate function is designated to a gate corresponding to a consistency constraint. When data does not satisfy a relevant consistency constraint, the object function is prohibited from being executed. Thus, the data flow as the object function is controlled.

Figure 48:
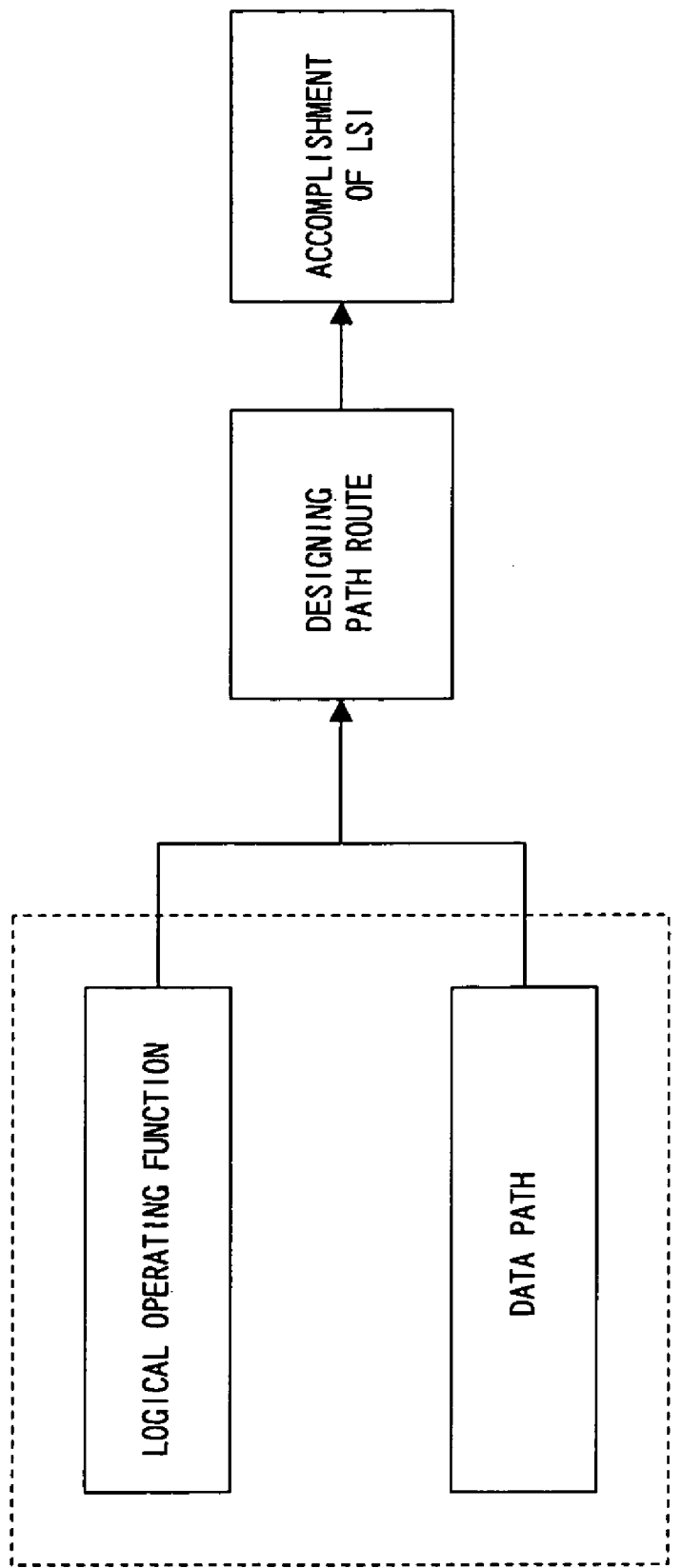
FIG. 48 is a schematic diagram for explaining an LSI designing system using an object structure of the WELL system.

FIG. 48 is a schematic diagram for explaining an LSI designing method corresponding to an object structure. In the description of the WELL system, a noun function and a verb function as objects correspond to keywords. Corresponding to a logical operating function of an LSI and data paths, a path pattern is designed. As a result, an LSI having the designed path pattern is accomplished.

A route of a data path is described as software in the WELL system. To improve the abstractness, a hierarchical structure is used. In addition, a generalizing function is used. A generic parameter is converted into a specific parameter. In an LSI designing process, by giving a parameter to a logical function, hardware can be designed using the WELL system.

FIG. 49 is a block diagram showing an example of the hardware structure of the above-described information processing apparatus.

Referring to FIG. 49, an information processing apparatus 260 comprises a CPU 261, a memory 262, an inputting portion 263, an outputting portion 264, a storing portion 265, a medium driving portion 266, and a network connecting portion 267. Those structural portions are connected to a bus 268. It should be noted that the present invention is not limited to such a structure.

The CPU 261 is a central processing unit that controls the entire information processing apparatus 260.

The memory 262 is a memory such as a RAM that temporarily stores a program or data stored in the storing portion 265 (or a portable storing medium 269) when the program is executed or data is updated. The CPU 261 executes the above-described processes using the program and/or data that is read to the memory 262.

The inputting portion 263 is for example a keyboard, a pointing device, or a touch panel. The inputting portion 263 is a user interface that allows the user to input a command and information.

The outputting portion 264 is for example a display. The outputting portion 264 is a user interface that displays data.

The storing portion 265 is for example a magnetic disc device, an optical disc device, or a magneto-optical disc device that stores a program and/or data that accomplishes various processes and functions of the information processing apparatus.

Alternatively, the program and/or data may be recorded on the portable storing medium 269. In that case, the program and/or data stored on the portable storing medium 269 is read by a medium driving portion 266. The portable storing medium 269 is for example an FD (Floppy Disk) 269a or a CD-ROM 269b. The portable storing medium 269 may be a DVD, an magneto-optical disc, or the like.

Alternatively, the above-described program and/or data may be downloaded from an external device through a network connected to the network connecting portion 267. The present invention may be structured as a storing medium (portable storing medium 269 or the like) storing the above-described program and/or data. Alternatively, the present invention may be structured as a network (transmission medium) that transmits the above-described program and/or data. In addition, the present invention may be structured as a transmission signal transmitted through a transmission medium when the above-described program and/or data is downloaded.

As was described above, in the WELL system as an information processing apparatus having an object network and a common platform, an object has a hierarchical structure composed of a data model, an object model, a role model, and a process model. When a communication manager that controls the execution of a window manager, a display manager, and a function manager of the WELL system is exported, the WELL system can be exported to another system. In other words, software can be exported. When the specifications of the WELL system are described with keywords, the WELL system can be applied to a designing process of a system structure such as an LSI. Thus, according to the present invention, the exportability of WELL system can be practically improved.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. An information processing apparatus, having an object network as a language processing function and a common platform as an interface function with clients, for executing processes using an interface with concerned parties of the process and/or an environment, comprising:
   an object contained within the object network having a hierarchical structure composed of
      a data model representing an attribute structure as a set of templates;
      an object model as a higher model than the data model, where the object model includes a format model representing a pattern of a noun object and a verb object, a feature model rearesenting a feature of the object corresponding to an attribute value of the object and having a constraint condition corresponding to the environment; and an object network model having a graph structure of which the name of the noun object is represented as a node and the name of the verb object is represented as a branch;
   a role model as a higher model than the object model, the role model representing the content of a process to be executed in the environment as a set of a plurality of object models; and
   a process model as the highest model, the process model defining a dynamic process cooperatively executed by a plurality of role models as one process.

2. The information processing apparatus as set forth in claim 1, further comprising:
   a process function kernel portion for executing a controlling process performed with an intervention of a user of the information processing apparatus using the name of a concerned party for the process of the object network and the name of a work performed by the concerned party.

3. The information processing apparatus as set forth in claim 1,
   wherein the specifications of the data model, the object model, and the role model are statically defined, and
   wherein the specifications of the process model are dynamically defined so that the validity of the process performed in the set of the plurality of abject modes is assured corresponding to a consistency constraint entity defined as an attribute of an object.

4. The information processing apparatus as set forth in claim 3, wherein an inconsistent constraint entity corresponding to the process model describes a validity predicate about the validity of the process and a control state for executing the process.

5. The information processing apparatus as set forth in claim 1,
   wherein the hierarchical structure is further composed of:
   a reference model for accomplishing a basic service to be executed in the process of the object network, the reference model being orthogonal to the hierarchical structure of the data model, the object model, the role model, and the process model.

6. The information processing apparatus as set forth in claim 5, wherein the concerned party of the process and the process function kernel portion of the information processing apparatus use a reference driving function so as to accomplish a service of the reference model.

7. The information processing apparatus as set forth in claim 5, wherein the specifications corresponding to a change of the environment are separately described as static adaptation specifications and dynamic adaptation specifications as a service accomplished with the reference model.

8. The information processing apparatus as set forth in claim 1, further comprising:
   a WELL system as software using the object networt and the common platform; and
   software exporting means for exposing the WELL system to another software.

9. The information processing apparatus as set forth in claim 1, further comprising:
   system structure designing means for designing a system structure in such a manner that noun objects and verb objects that compose the object network correlate with data paths as keywords of the system structure.

* * * * *

UNITED STATES PATENT AND TRADEMARK OFFICE
CERTIFICATE OF CORRECTION

| | | |
|---|---|---|
| PATENT NO. | : 7,178,148 B2 | |
| APPLICATION NO. | : 09/804143 | |
| DATED | : February 13, 2007 | |
| INVENTOR(S) | : Hajime Enomoto | |

It is certified that error appears in the above-identified patent and that said Letters Patent is hereby corrected as shown below:

Column 29, Line 42, change "rearesenting" to --representing--.

Column 30, Line 15, change "abject" to --object--.

Column 30, Line 44, change "newort" to --network--.

Signed and Sealed this

Twenty-second Day of May, 2007

JON W. DUDAS
*Director of the United States Patent and Trademark Office*